US009696935B2

United States Patent
Hashimoto et al.

(10) Patent No.: US 9,696,935 B2
(45) Date of Patent: Jul. 4, 2017

(54) STORAGE DEVICE THAT SECURES A BLOCK FOR A STREAM OR NAMESPACE AND SYSTEM HAVING THE STORAGE DEVICE

(71) Applicant: KABUSHIKI KAISHA TOSHIBA, Tokyo (JP)

(72) Inventors: Daisuke Hashimoto, Cupertino, CA (US); Shinichi Kanno, Ota Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 38 days.

(21) Appl. No.: 14/836,391

(22) Filed: Aug. 26, 2015

(65) Prior Publication Data

US 2016/0313943 A1    Oct. 27, 2016

Related U.S. Application Data

(60) Provisional application No. 62/152,372, filed on Apr. 24, 2015.

(51) Int. Cl.
G06F 3/06 (2006.01)
G06F 12/02 (2006.01)
G06F 17/30 (2006.01)

(52) U.S. Cl.
CPC .............. *G06F 3/064* (2013.01); *G06F 3/061* (2013.01); *G06F 3/0608* (2013.01);
(Continued)

(58) Field of Classification Search
CPC ... G06F 3/0608; G06F 3/0652; G06F 12/0253
See application file for complete search history.

(56) References Cited

U.S. PATENT DOCUMENTS 8,631,191 B2    1/2014 Hashimoto
2012/0246388 A1    9/2012 Hashimoto
(Continued)

FOREIGN PATENT DOCUMENTS

WO    2014147865 A1    9/2014

OTHER PUBLICATIONS

Changman Lee et al., F2FS: A New File System for Flash Storage, USENIX FAST 2015, Feb. 18, 2015, 15 pages.
(Continued)

*Primary Examiner* — Hal Schnee
(74) *Attorney, Agent, or Firm* — Patterson & Sheridan, LLP

(57) ABSTRACT

A storage device includes a nonvolatile semiconductor memory device including a plurality of physical blocks and a memory controller. The memory controller is configured to associate one or more physical blocks to each of a plurality of stream IDs, execute a first command containing a first stream ID received from a host, by storing write data included in the write IO in the one or more physical blocks associated with the first stream ID, and execute a second command containing a second stream ID received from the host, by selecting a first physical block that includes valid data and invalid data, transfer the valid data stored in the first physical block to a second physical block, and associate the first physical block from which the valid data has been transferred, with the second stream ID.

18 Claims, 75 Drawing Sheets

(52) U.S. Cl.
CPC .......... *G06F 3/0659* (2013.01); *G06F 3/0688* (2013.01); *G06F 12/0253* (2013.01); *G06F 17/30* (2013.01)

(56) References Cited

U.S. PATENT DOCUMENTS

| | | | |
|---|---|---|---|
| 2013/0117501 A1* | 5/2013 | Yun | G06F 12/0246 711/103 |
| 2013/0166818 A1* | 6/2013 | Sela | G06F 12/0246 711/103 |
| 2015/0089179 A1 | 3/2015 | Kurita et al. | |
| 2016/0062885 A1* | 3/2016 | Ryu | G06F 12/0246 711/103 |
| 2016/0188220 A1* | 6/2016 | Nemoto | G06F 3/0608 711/103 |
| 2016/0253257 A1* | 9/2016 | Kim | G06F 12/0253 |
| 2016/0299689 A1* | 10/2016 | Kim | G06F 3/061 |

OTHER PUBLICATIONS

Jaeho Kim et al., Towards SLO Complying SSDs Through OPS Isolation, USENIX FAST 2015, Feb. 18, 2015, 8 pages.
Fei Yang et al., Multi-streaming RocksDB, NVMW 2015, Mar. 3, 2015, 2 pages.
Storage Intelligence proposal Revision 4a, 14-275r4a, INCITS T10 SBC4, Feb. 18, 2015, 56 pages.
Jeong-Uk Kang et al., The Multi-streamed Solid-State Drive, USENIX hotstorage 2014, Jun. 18, 2014, 5 pages.

* cited by examiner

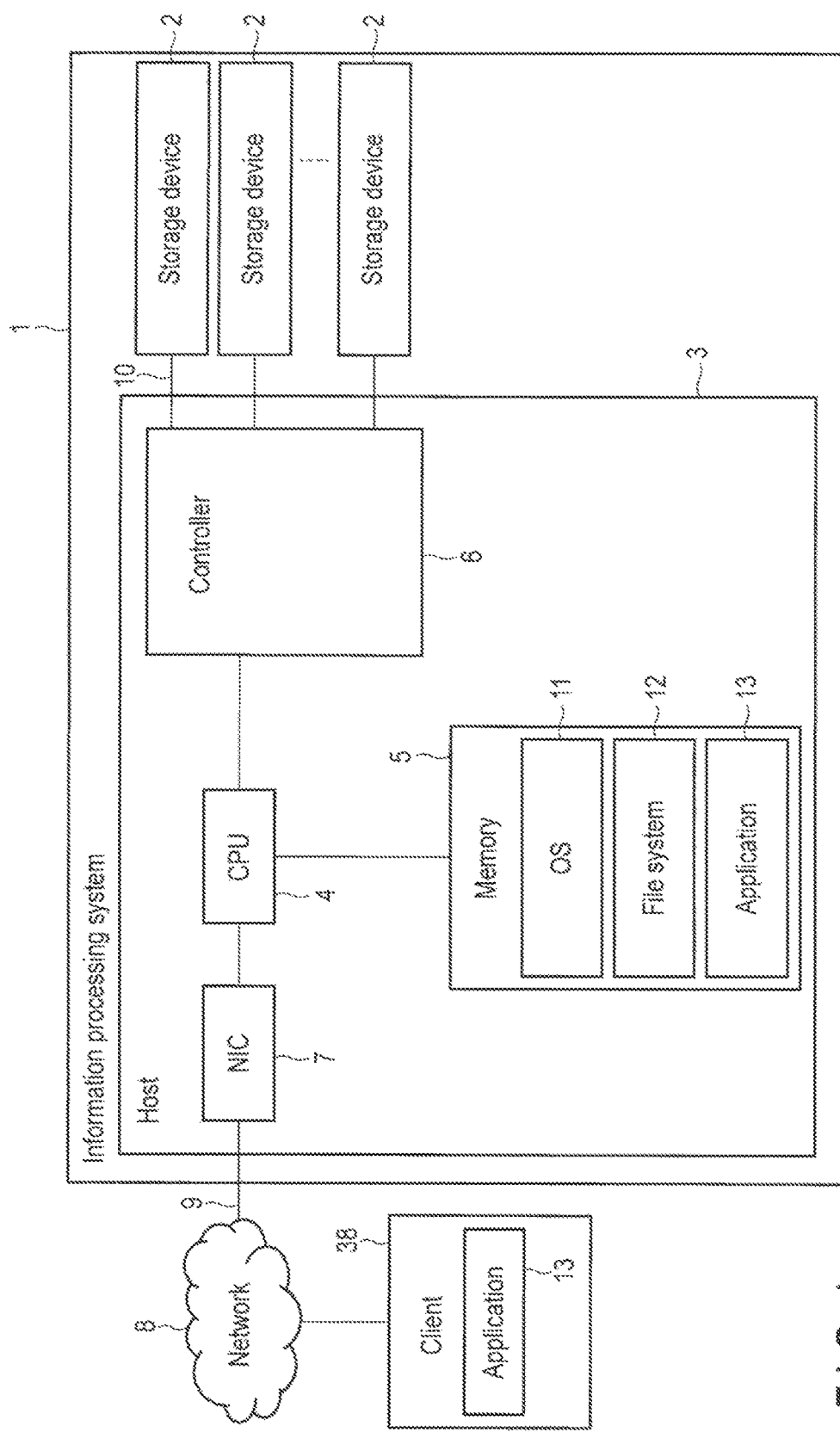
F I G. 1

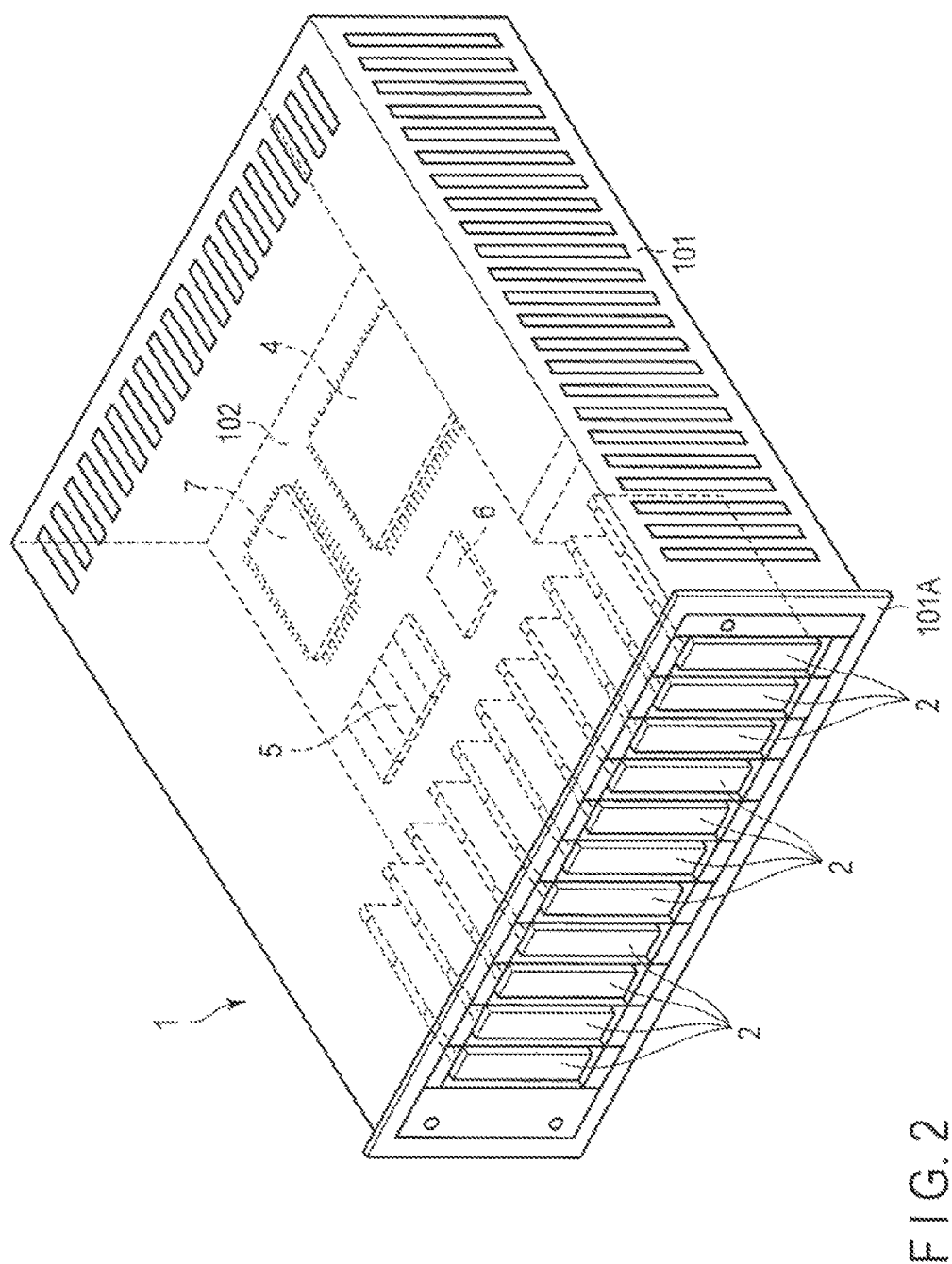
F I G. 2

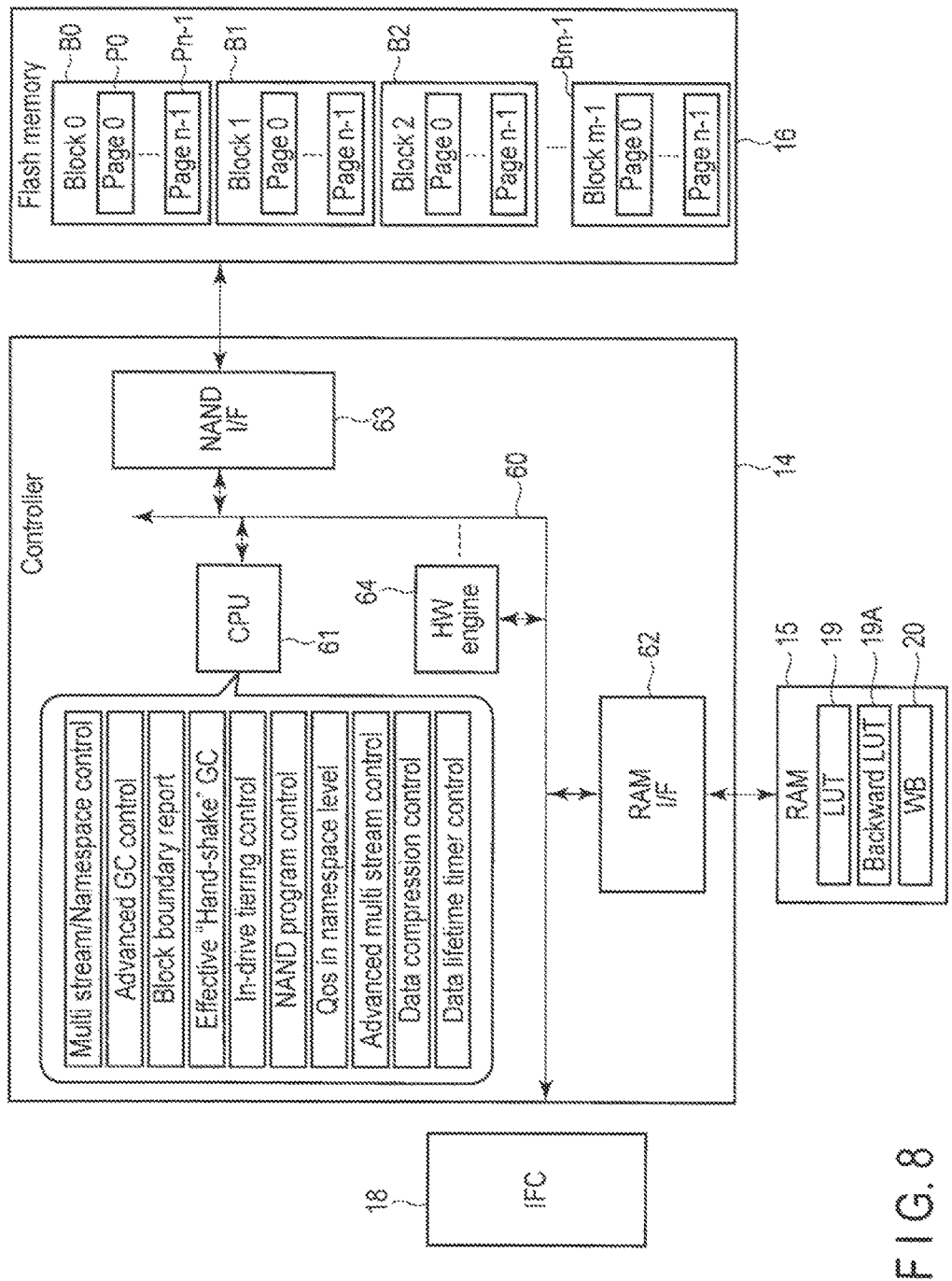
F I G. 8

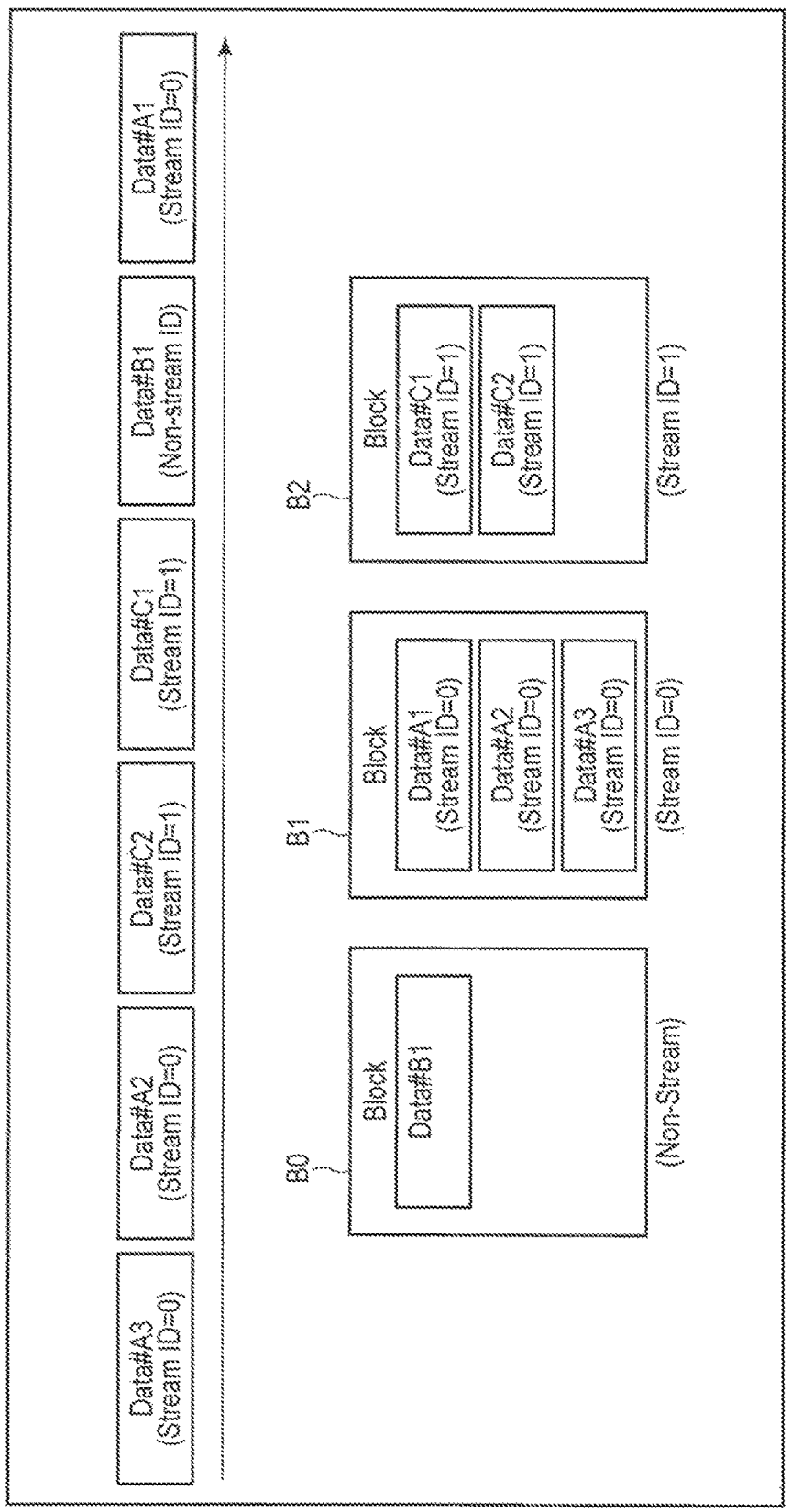
F I G. 9

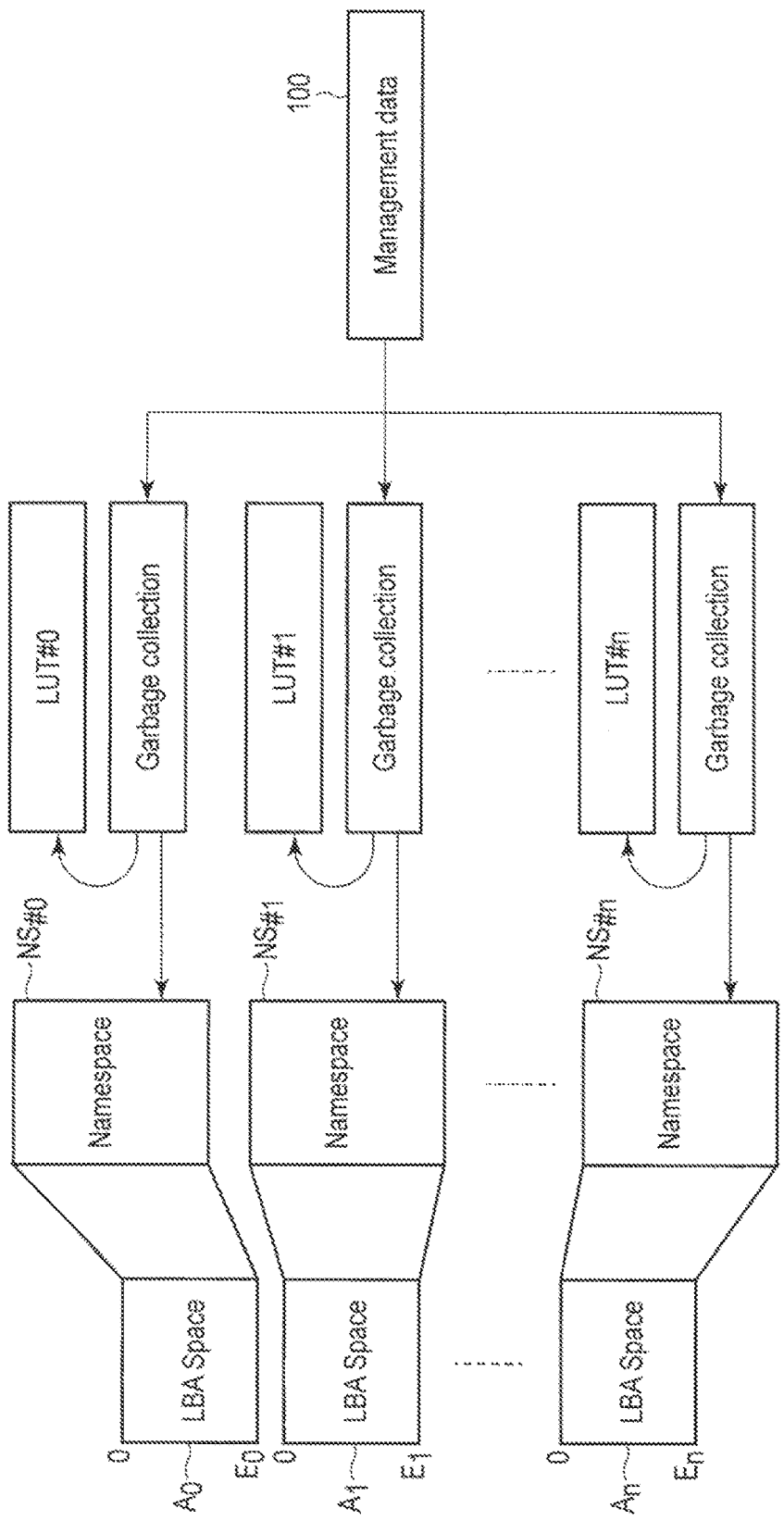
F I G. 10

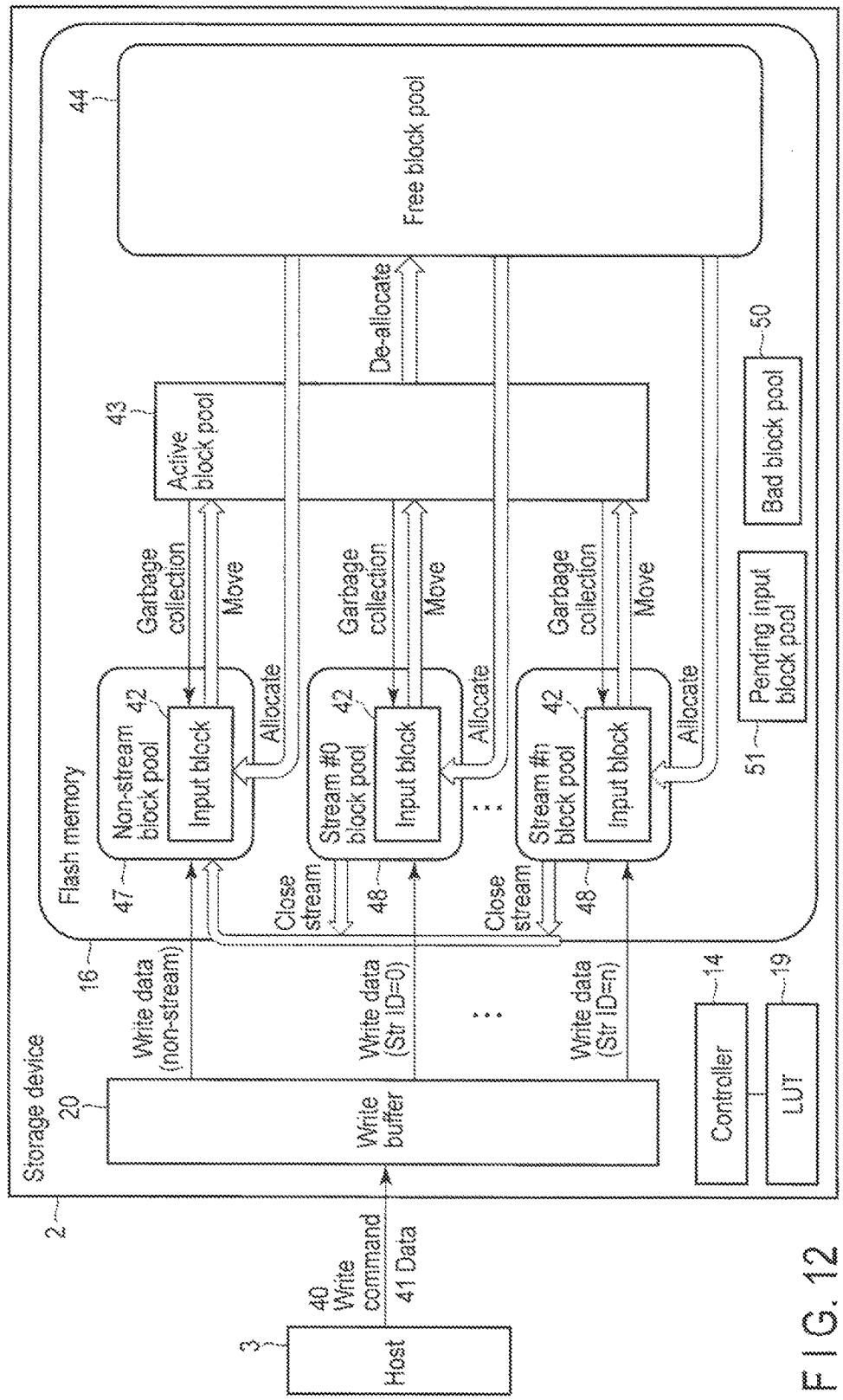
F I G. 12

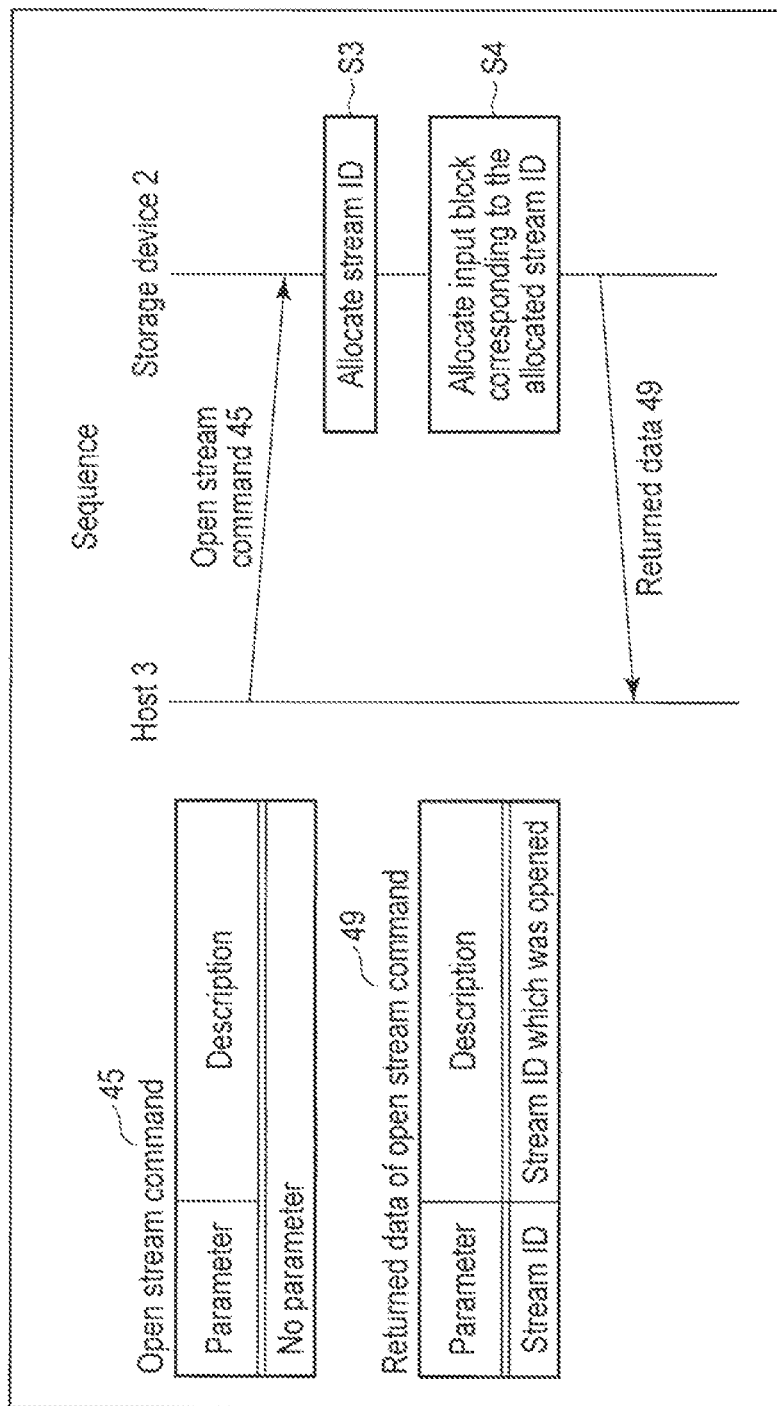
F I G. 13

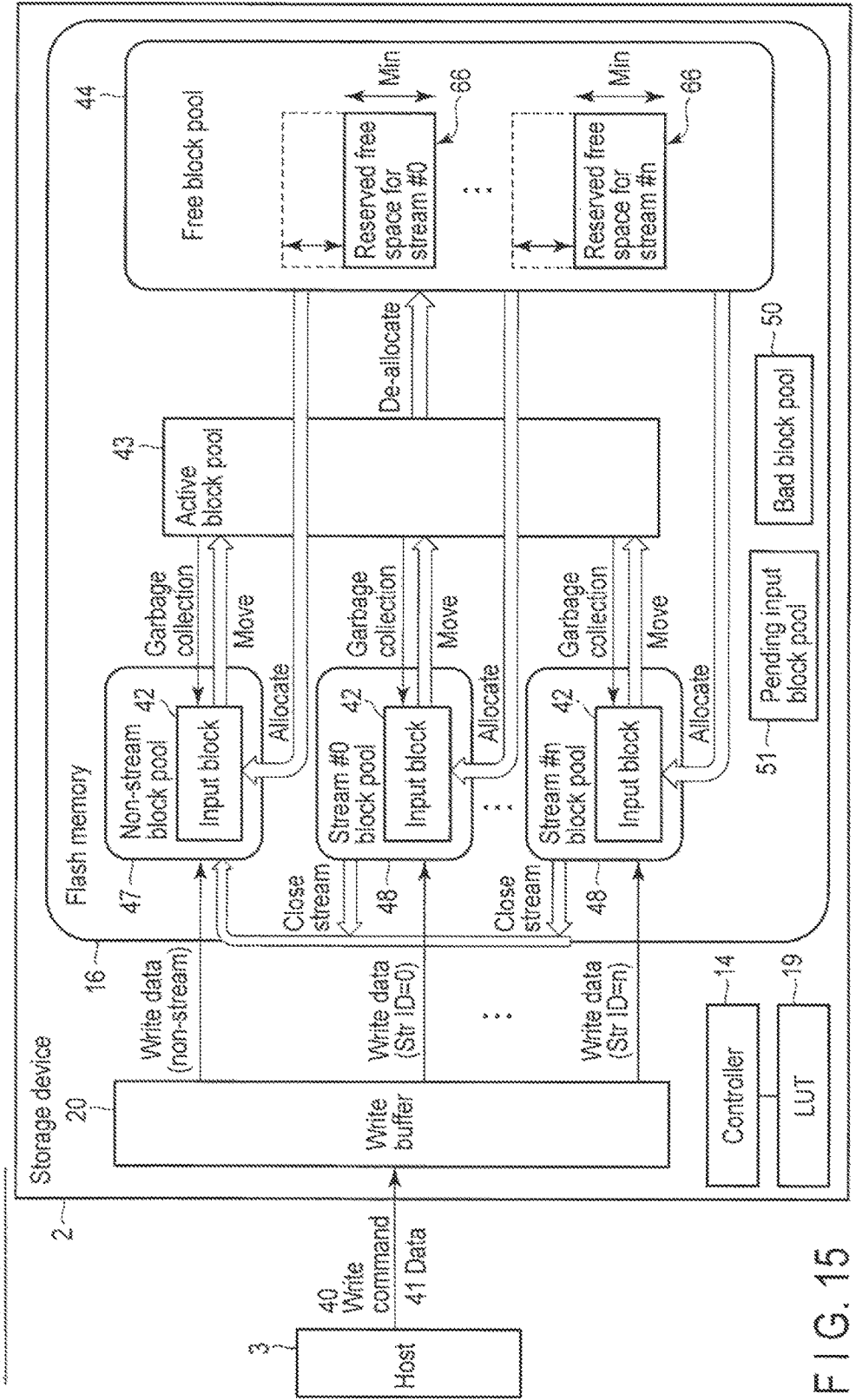
F I G. 15

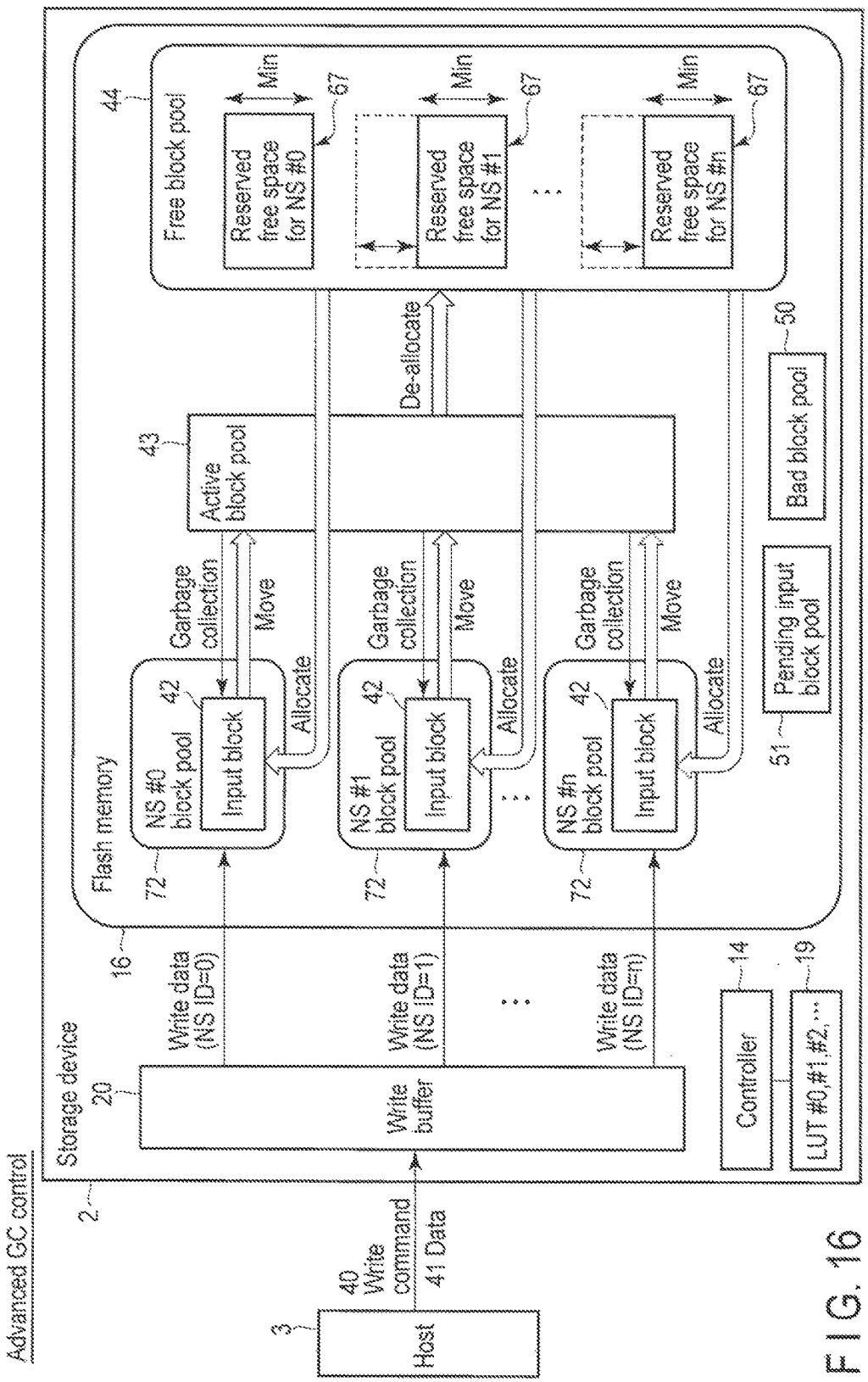
F I G. 16

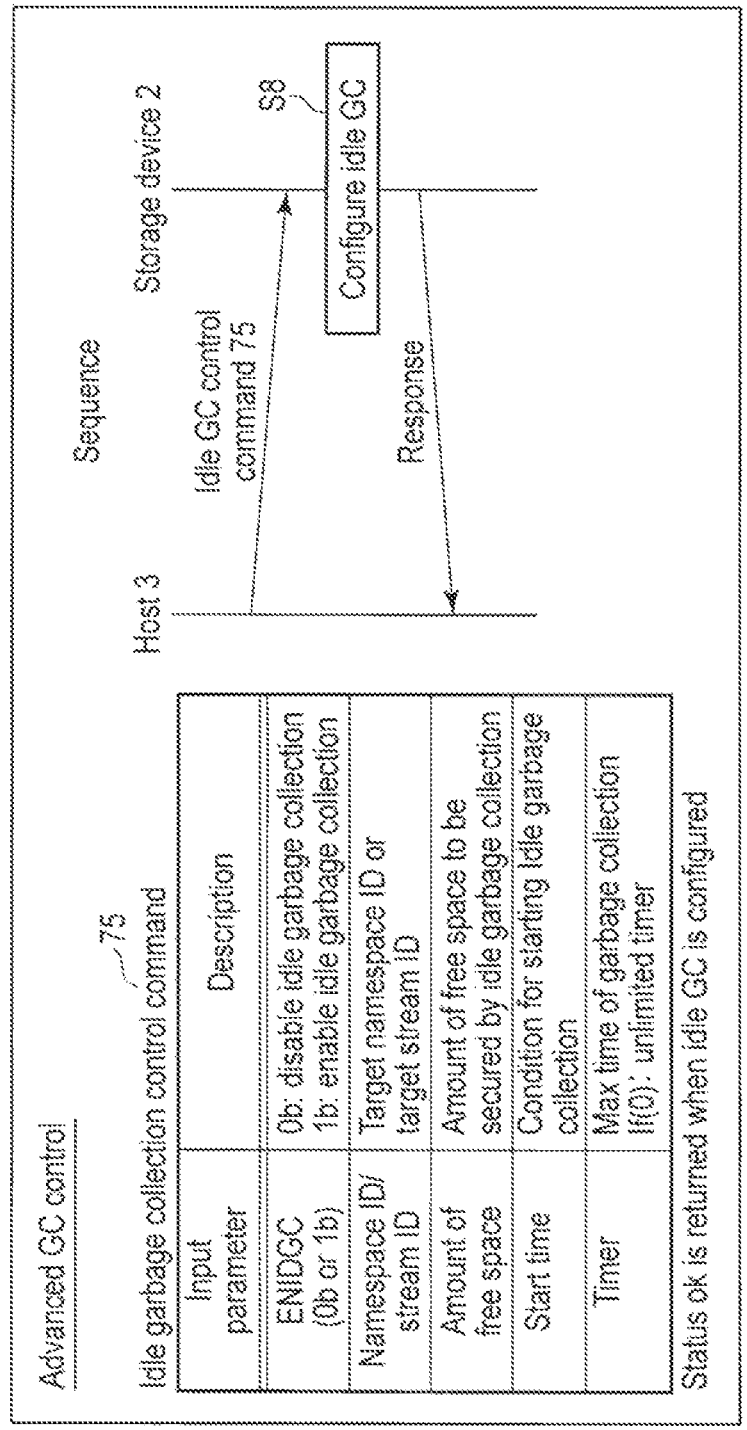
F I G. 18

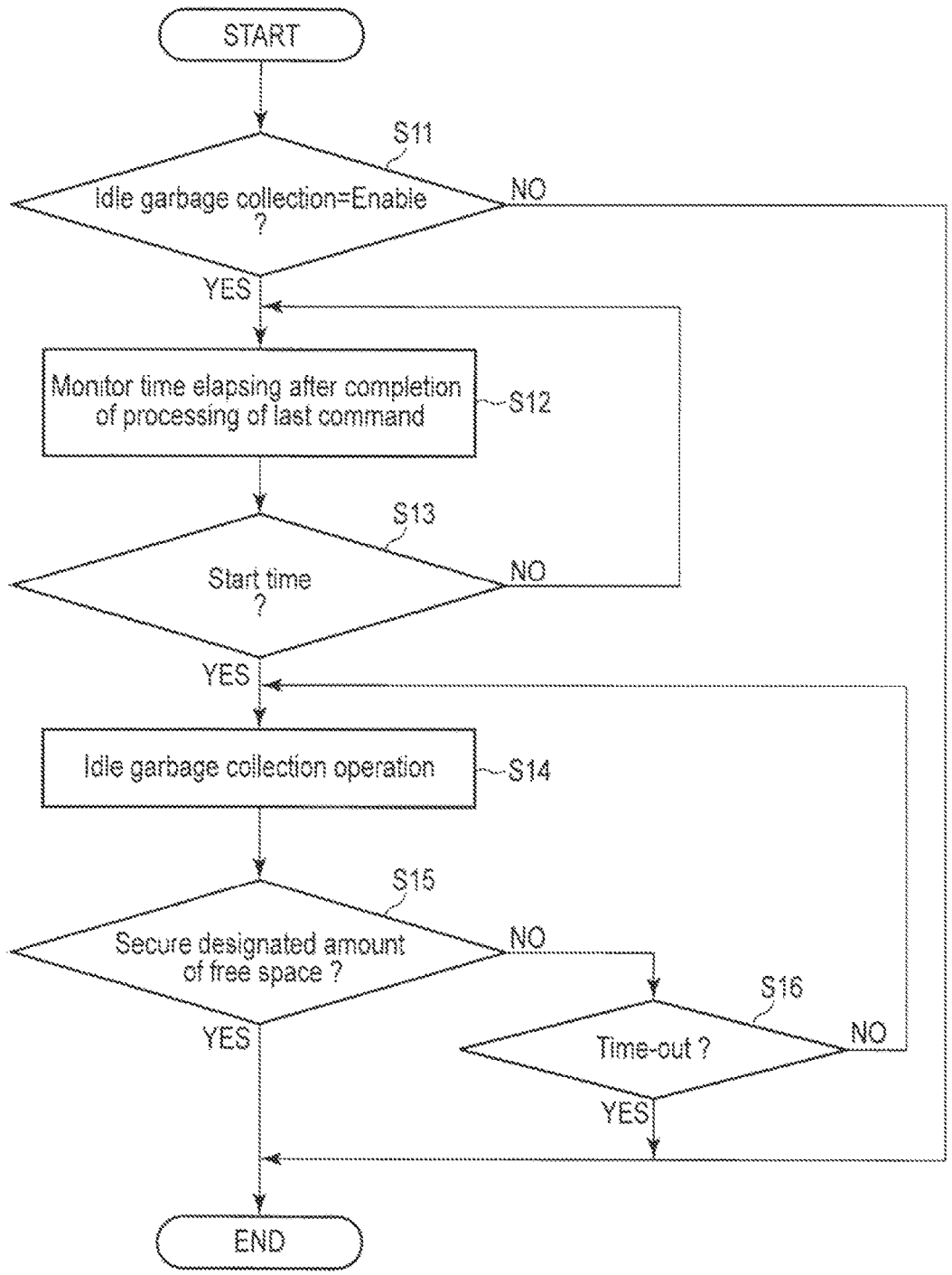
F I G. 19

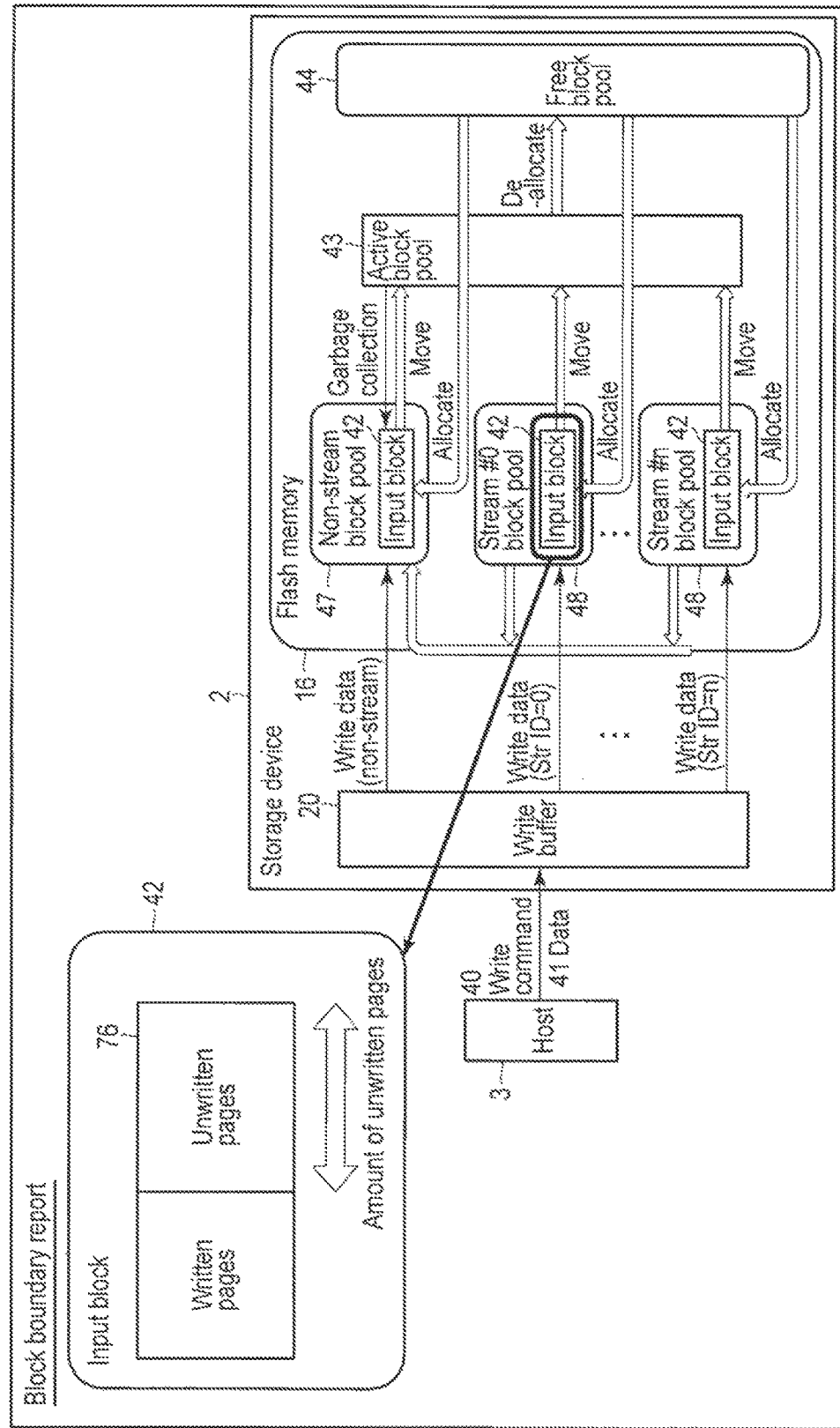
F I G. 20

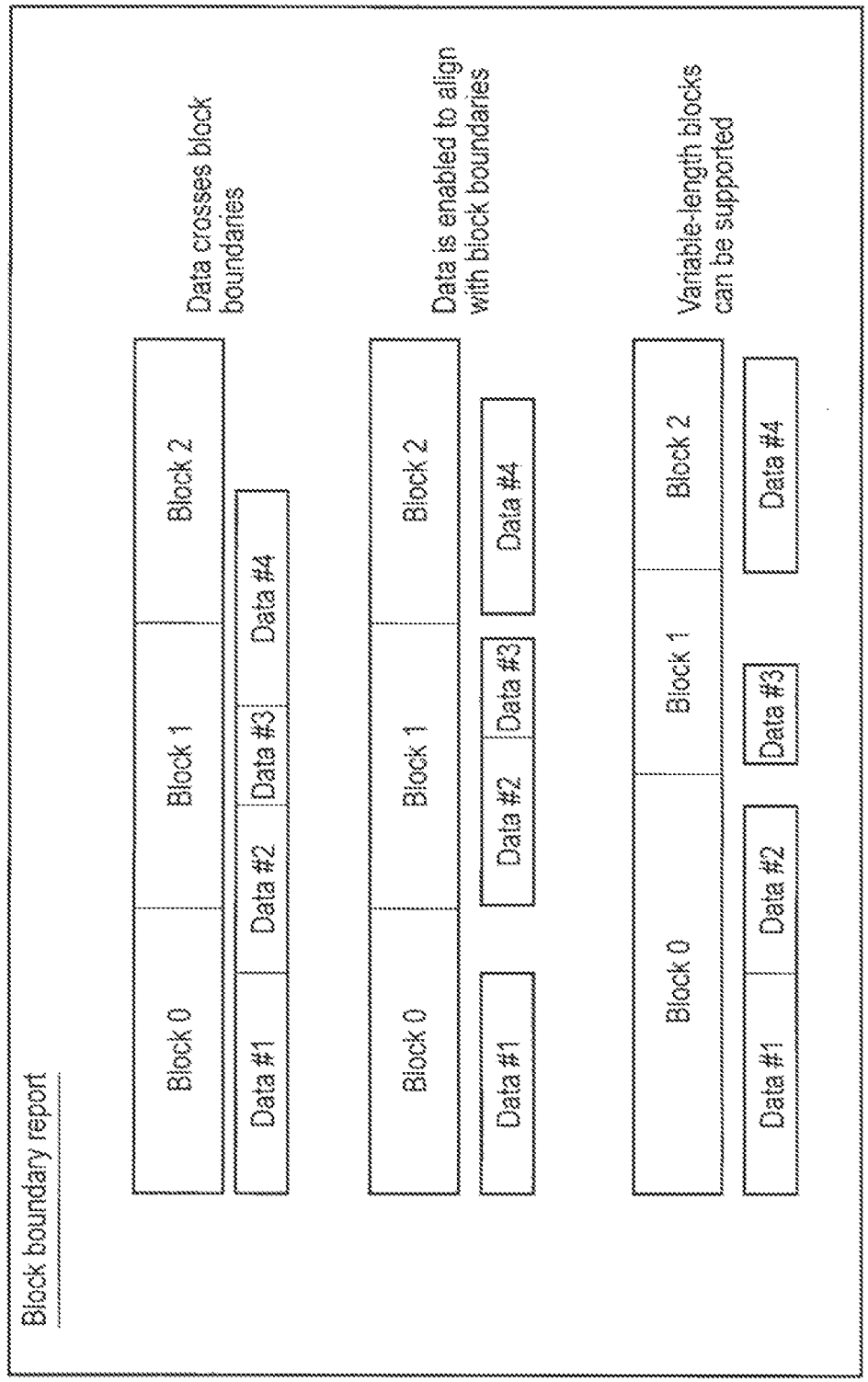
F I G. 22

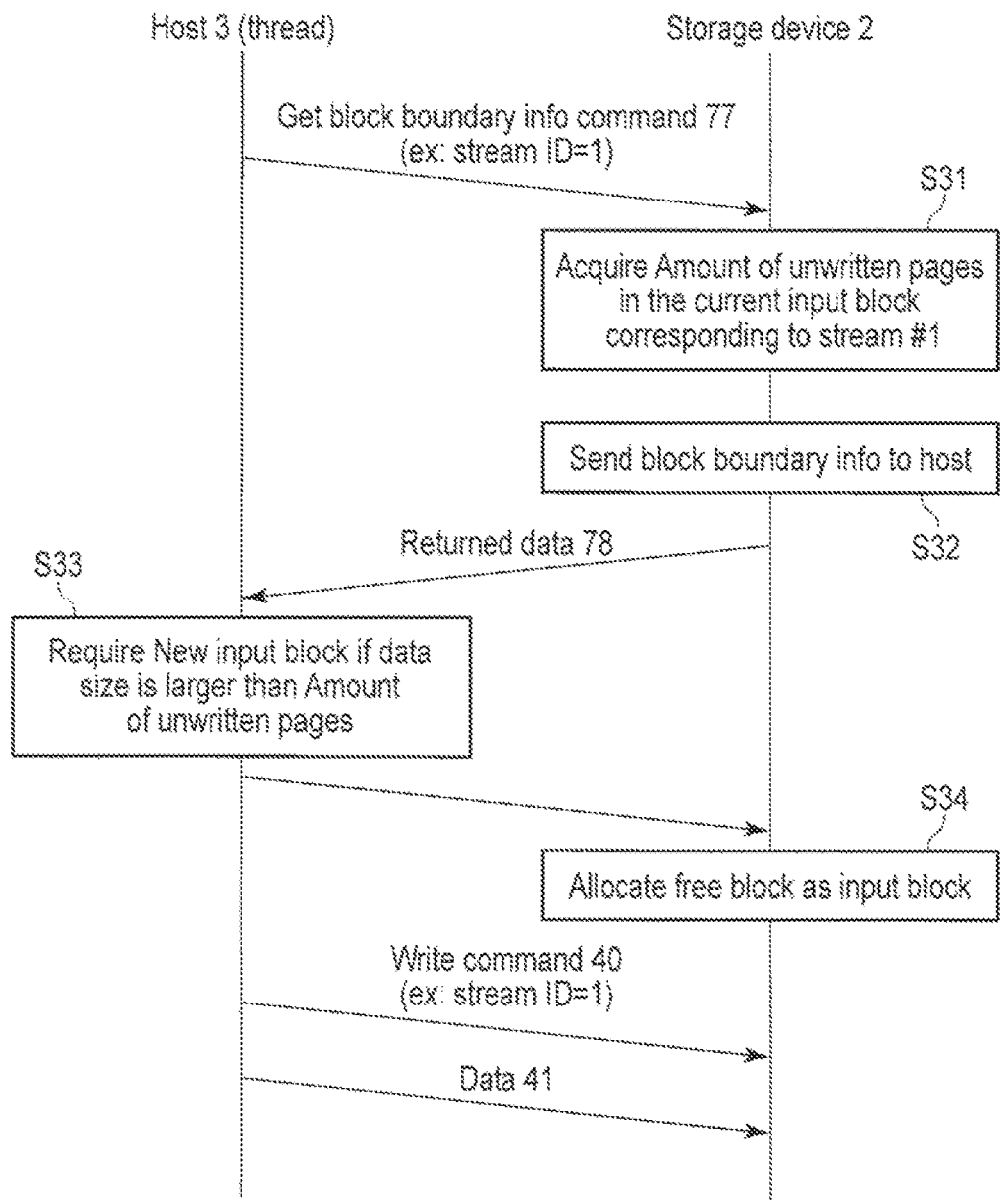
F I G. 23

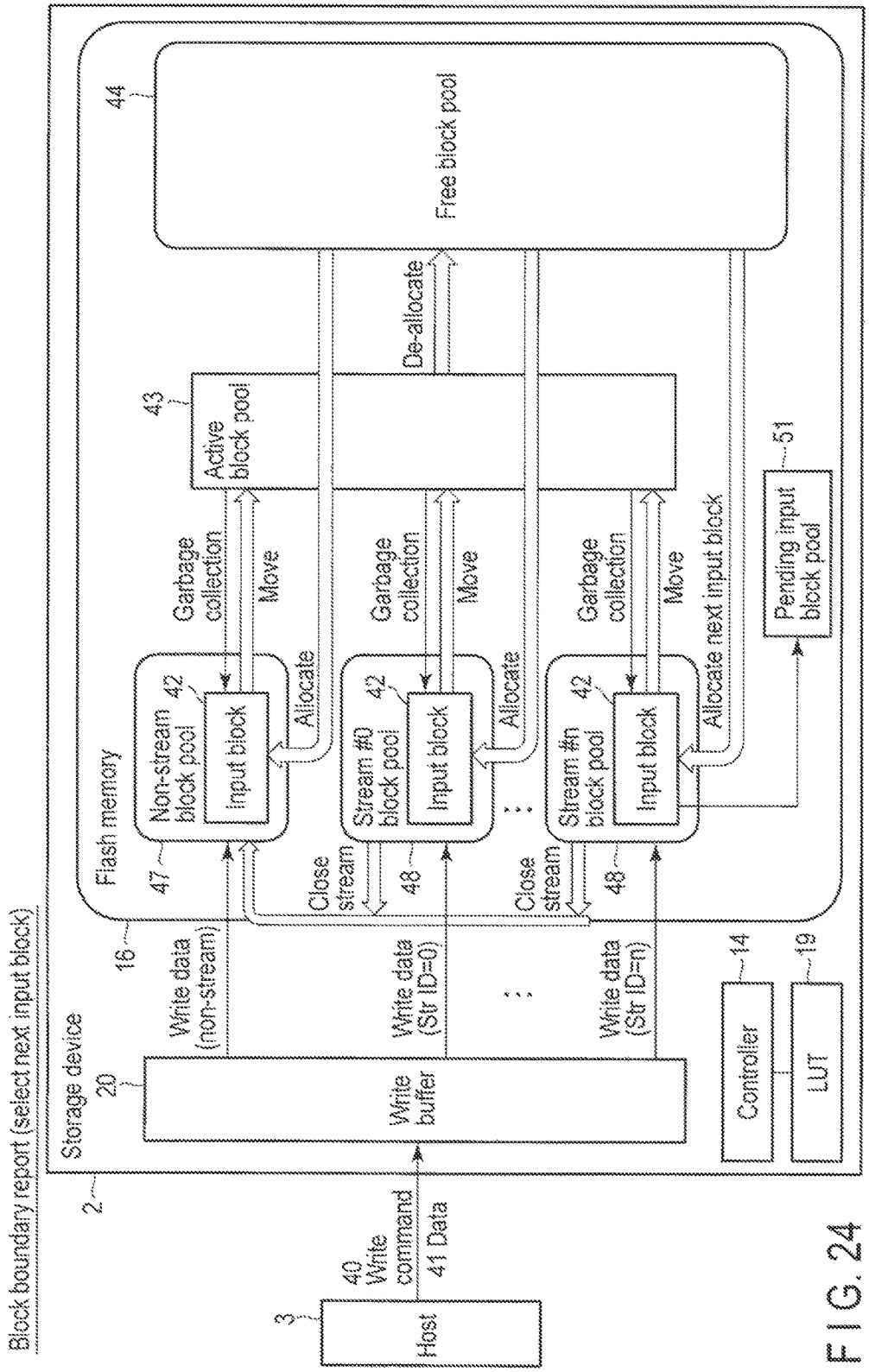
F I G. 24

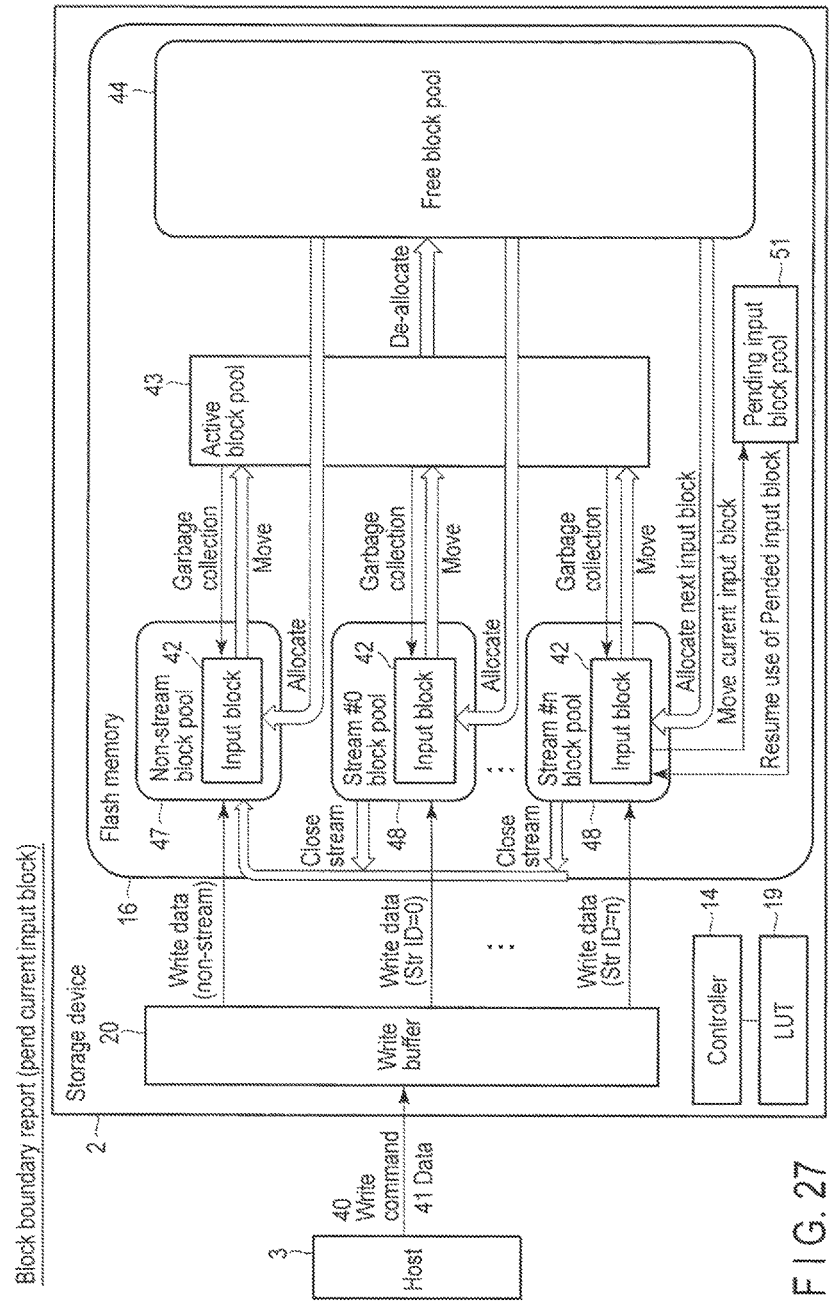
F I G. 27

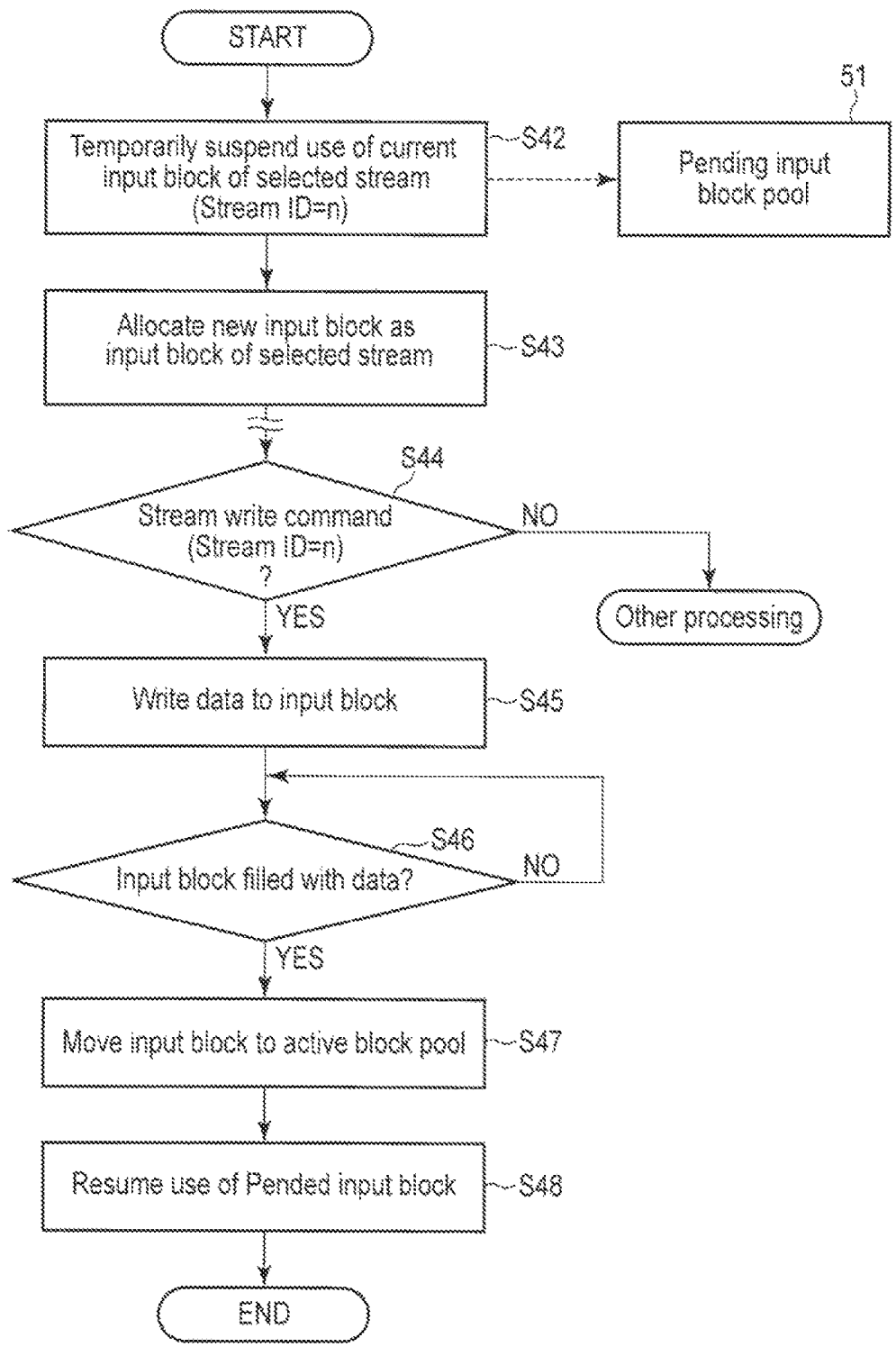
F I G. 29

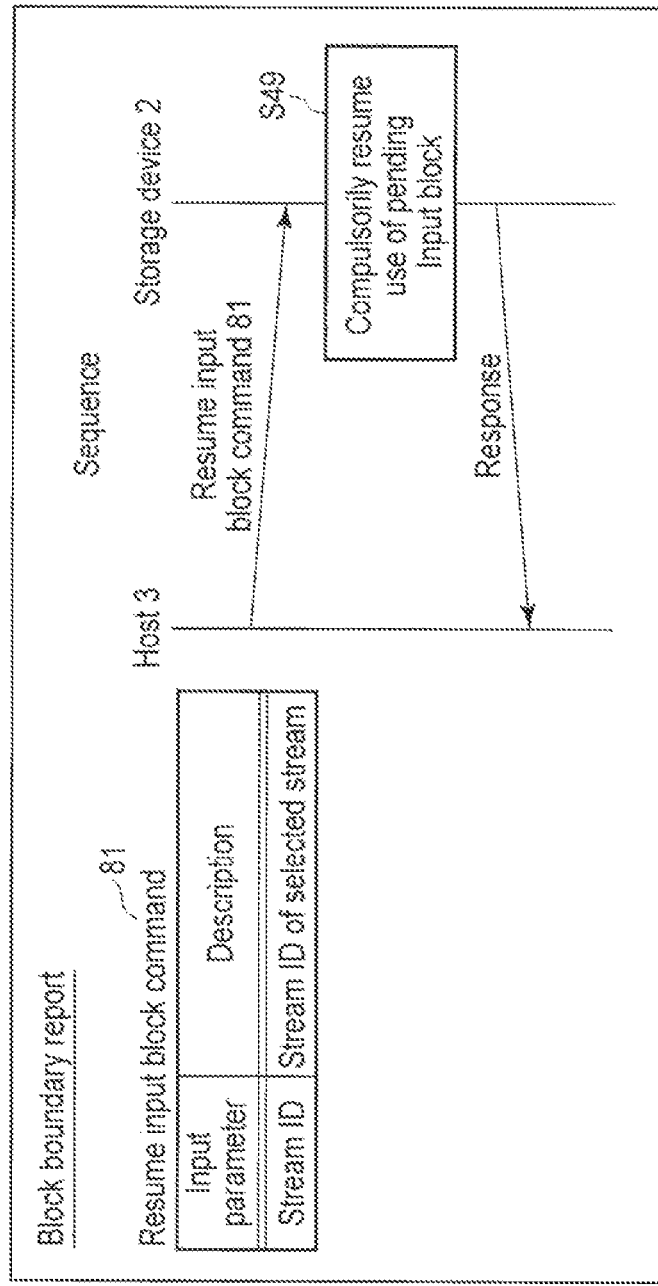
F I G. 30

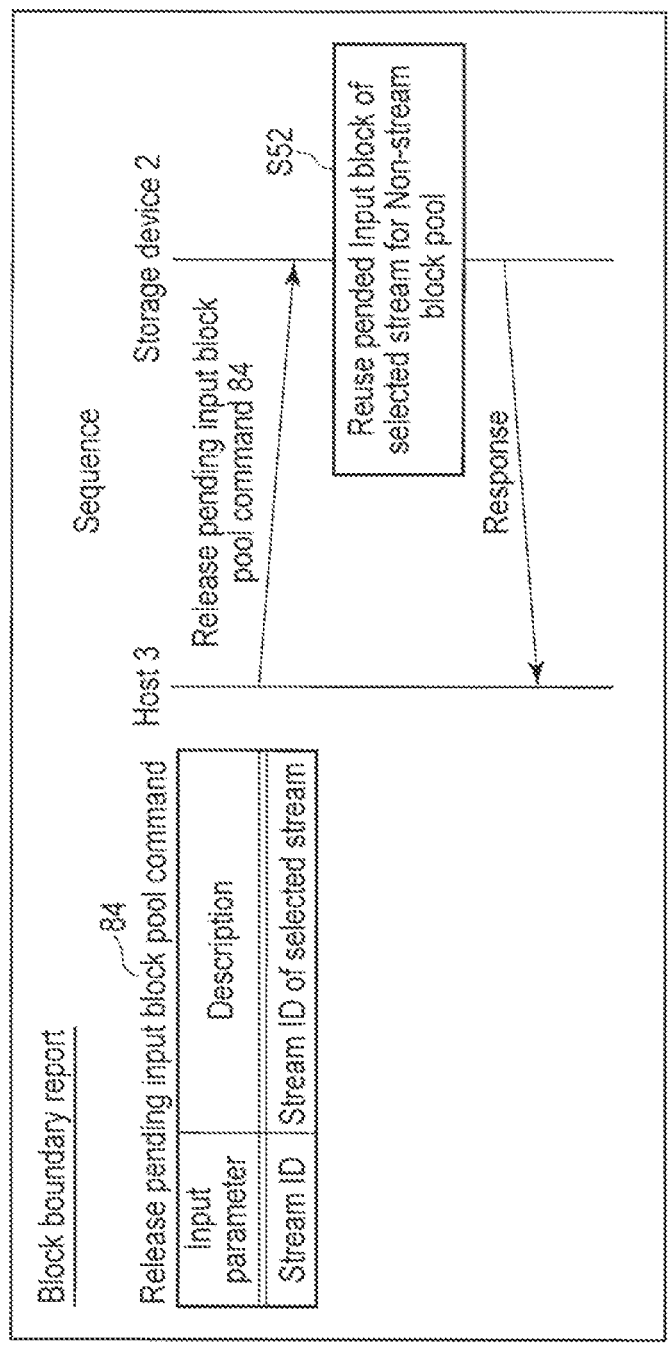
F I G. 32

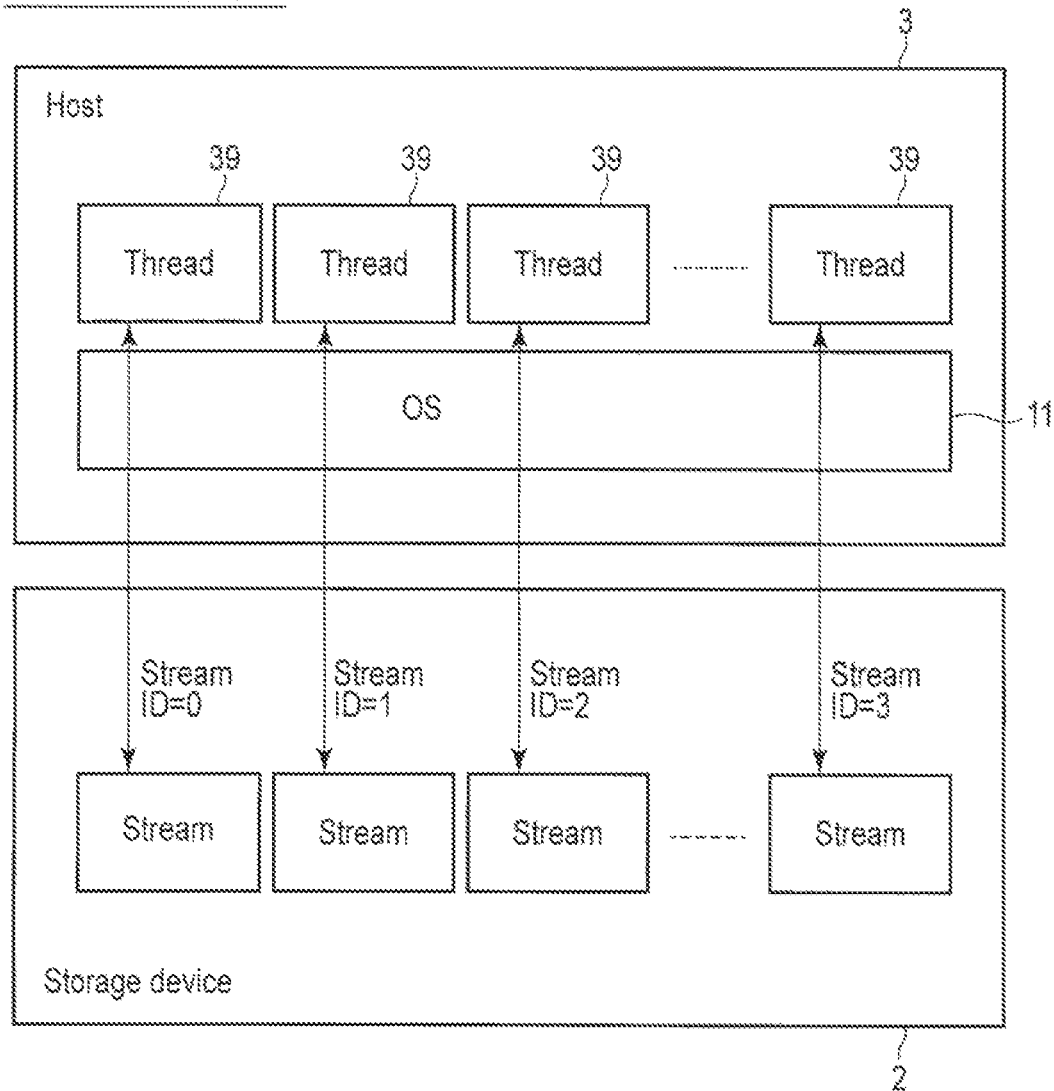
F I G. 33

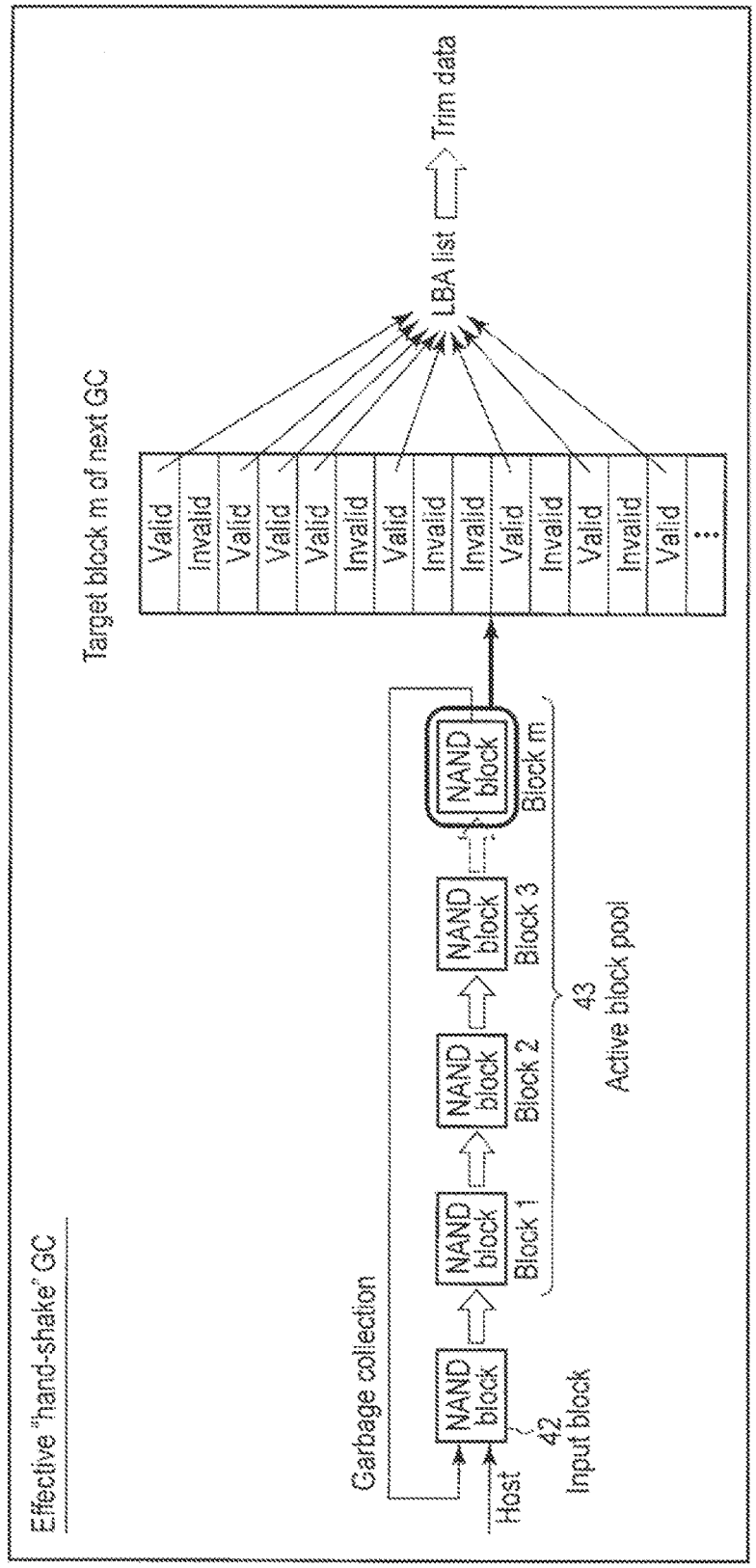
F I G. 37

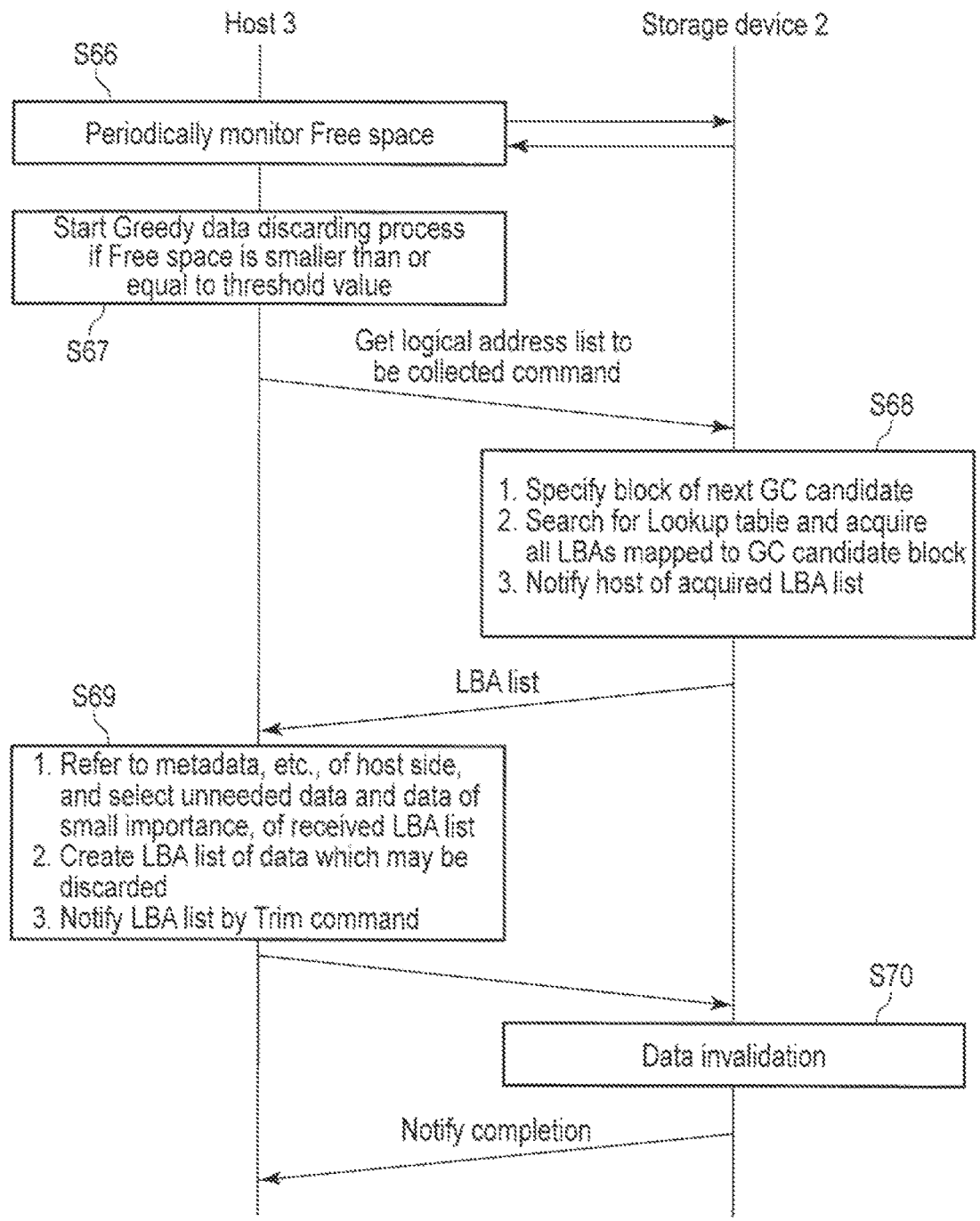
F I G. 39

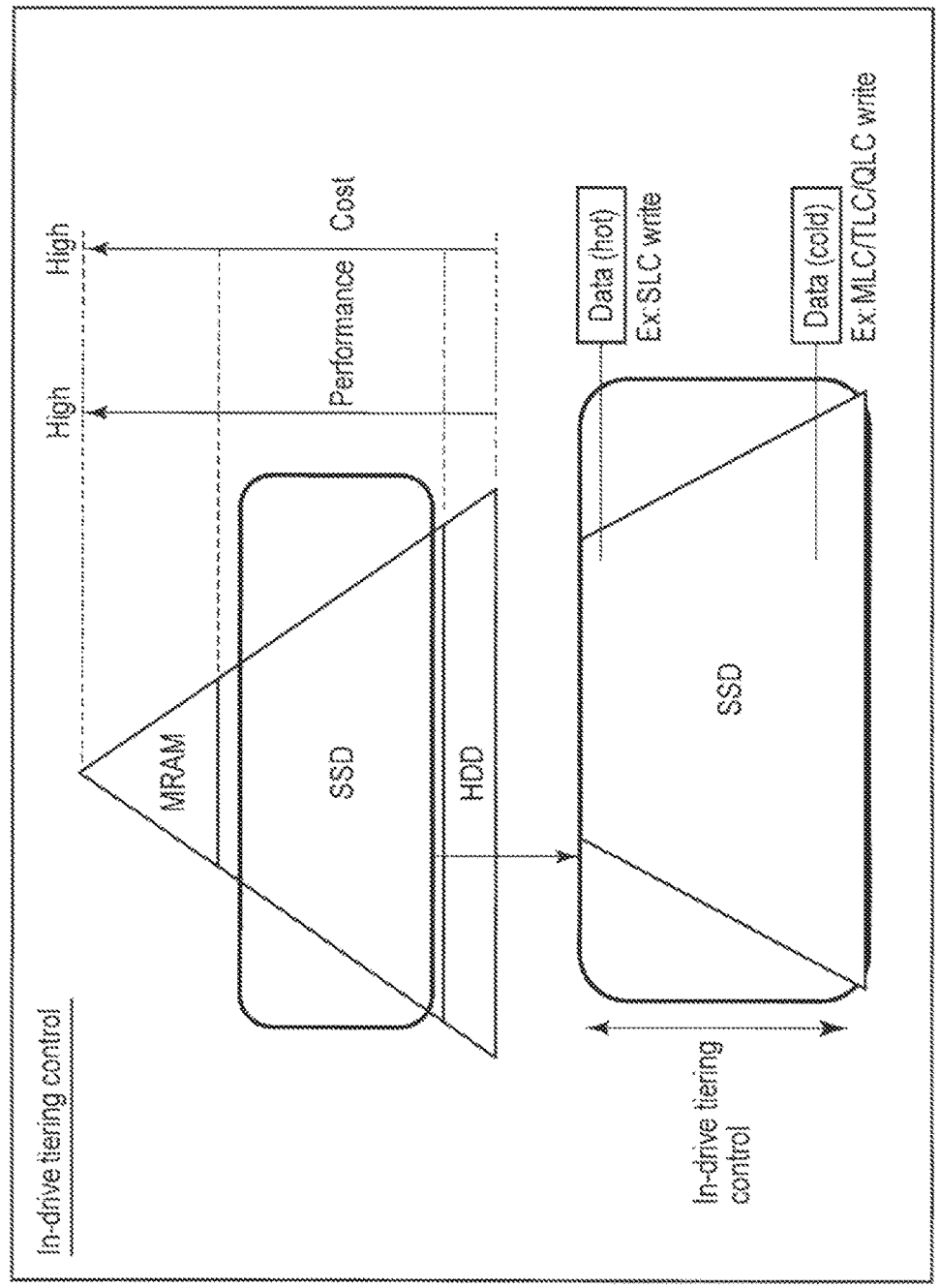
F I G. 40

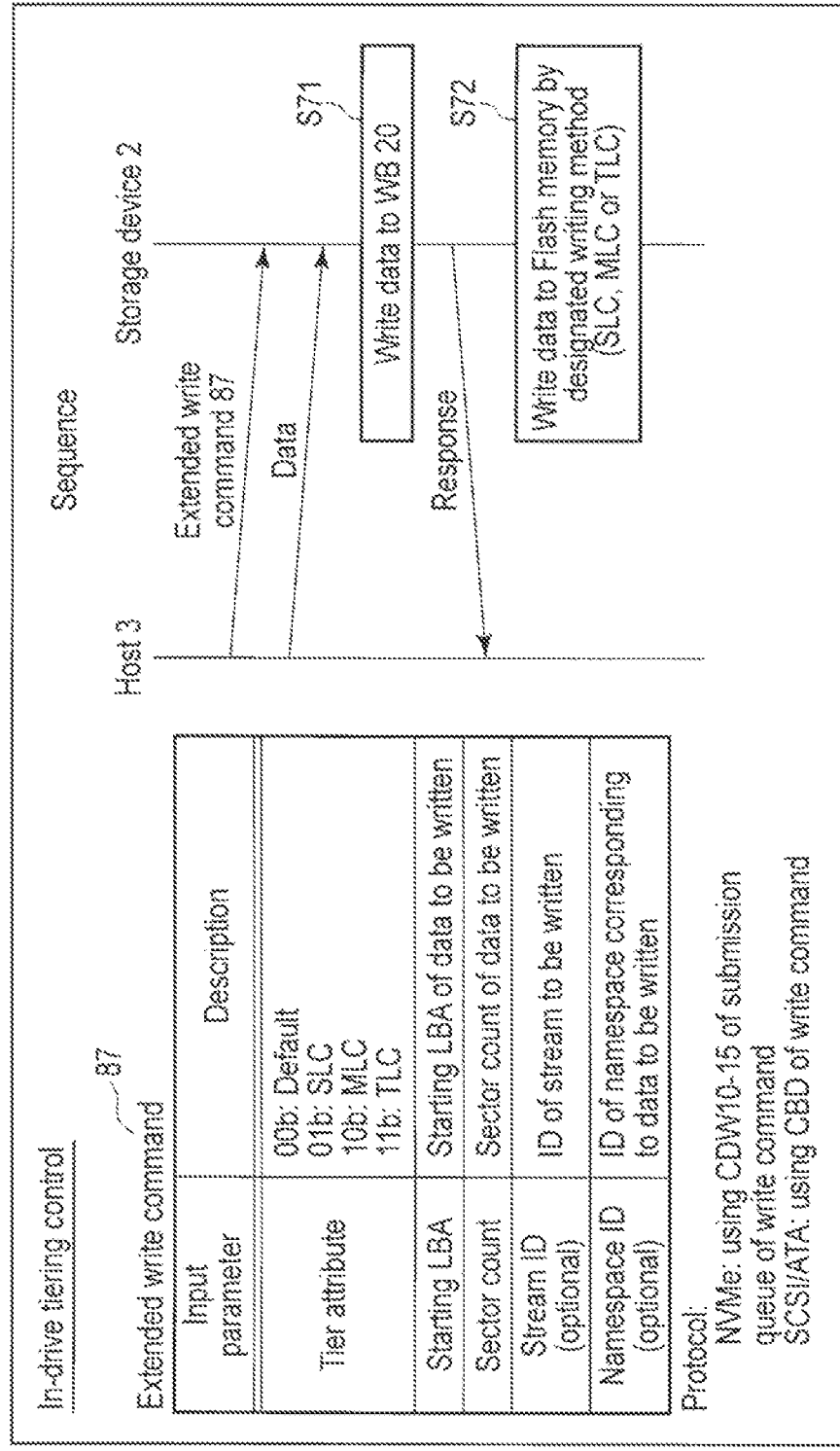
F I G. 41

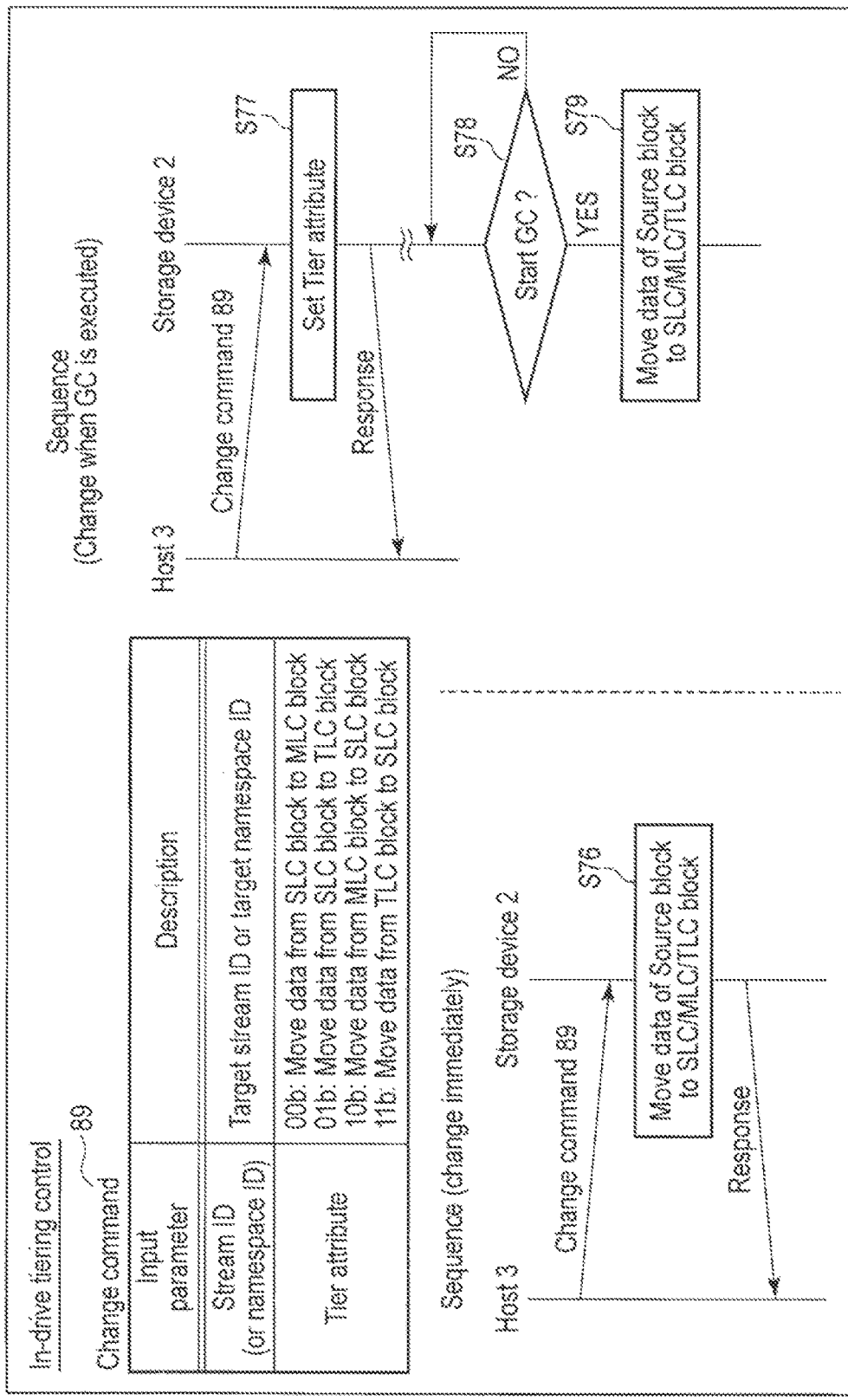
F I G. 43

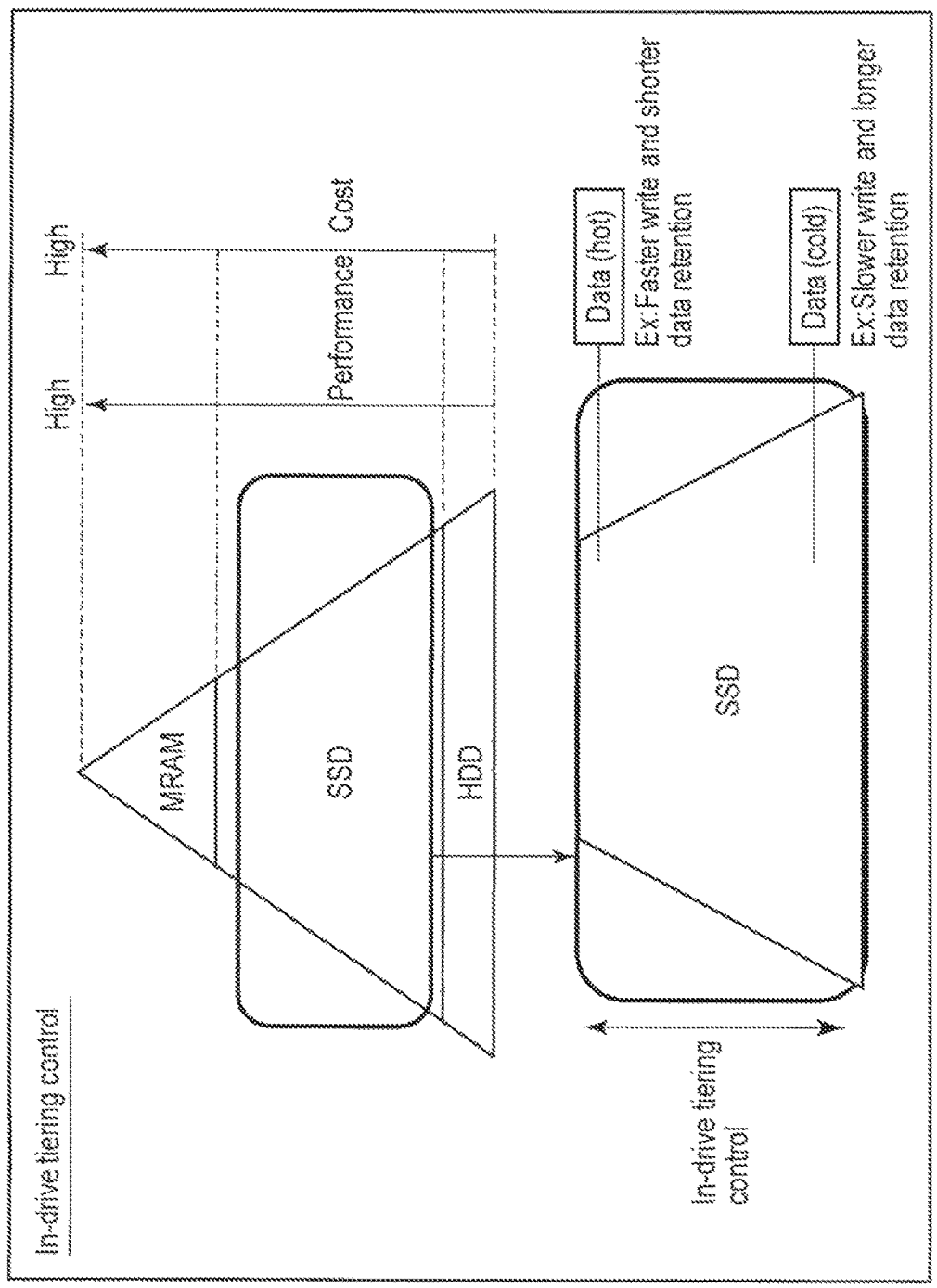
F I G. 45

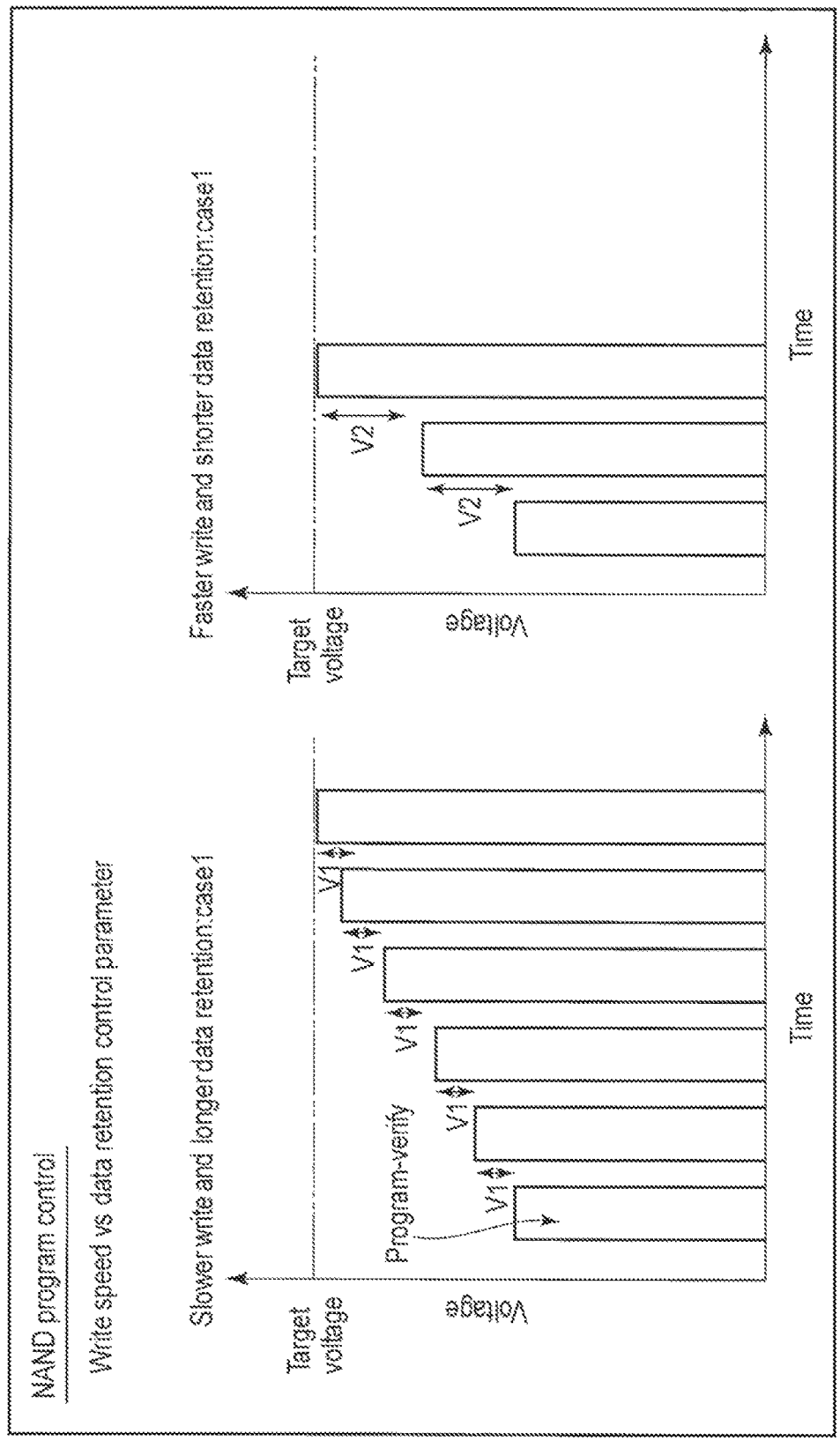
F I G. 46

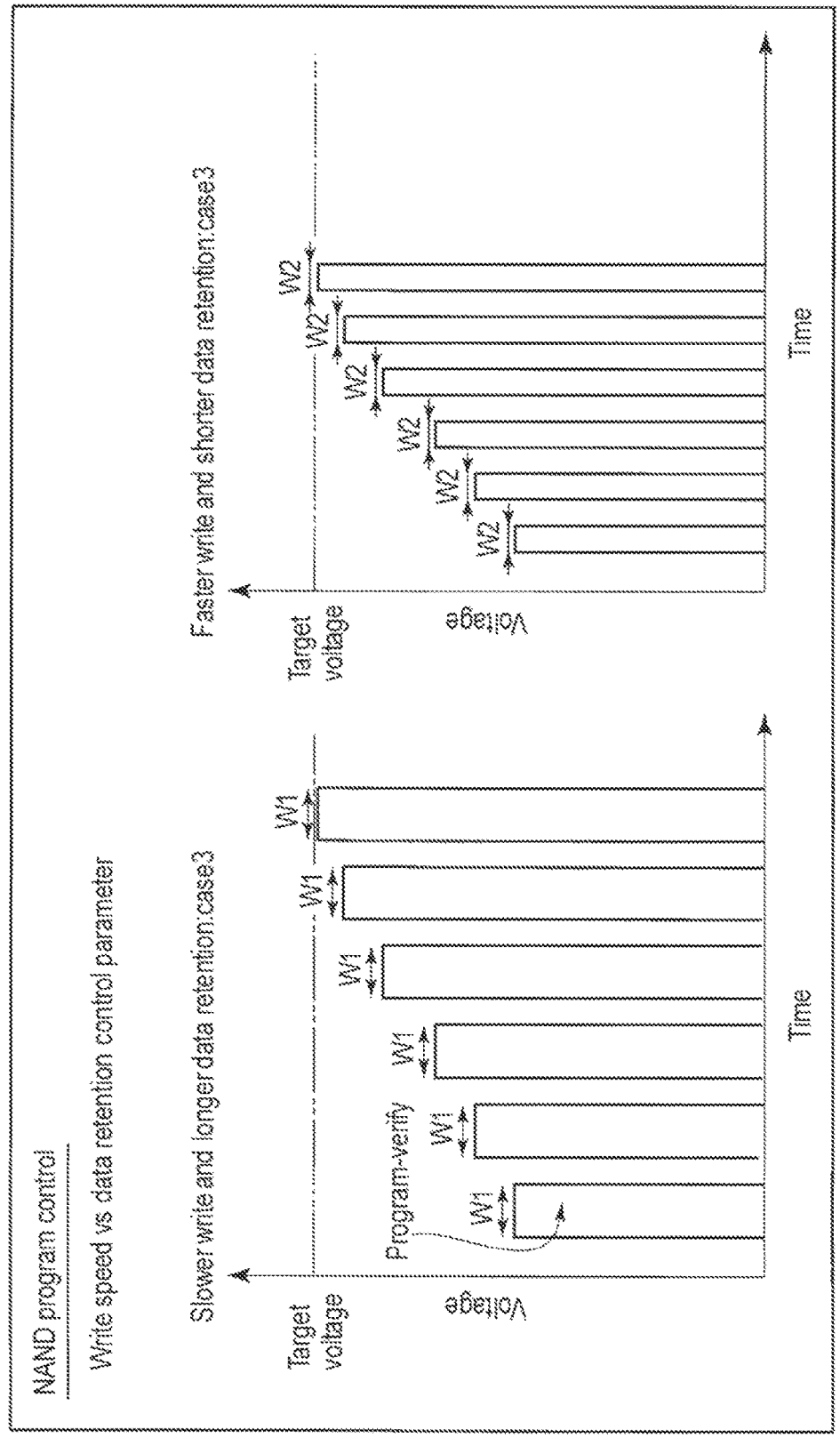
F I G. 48

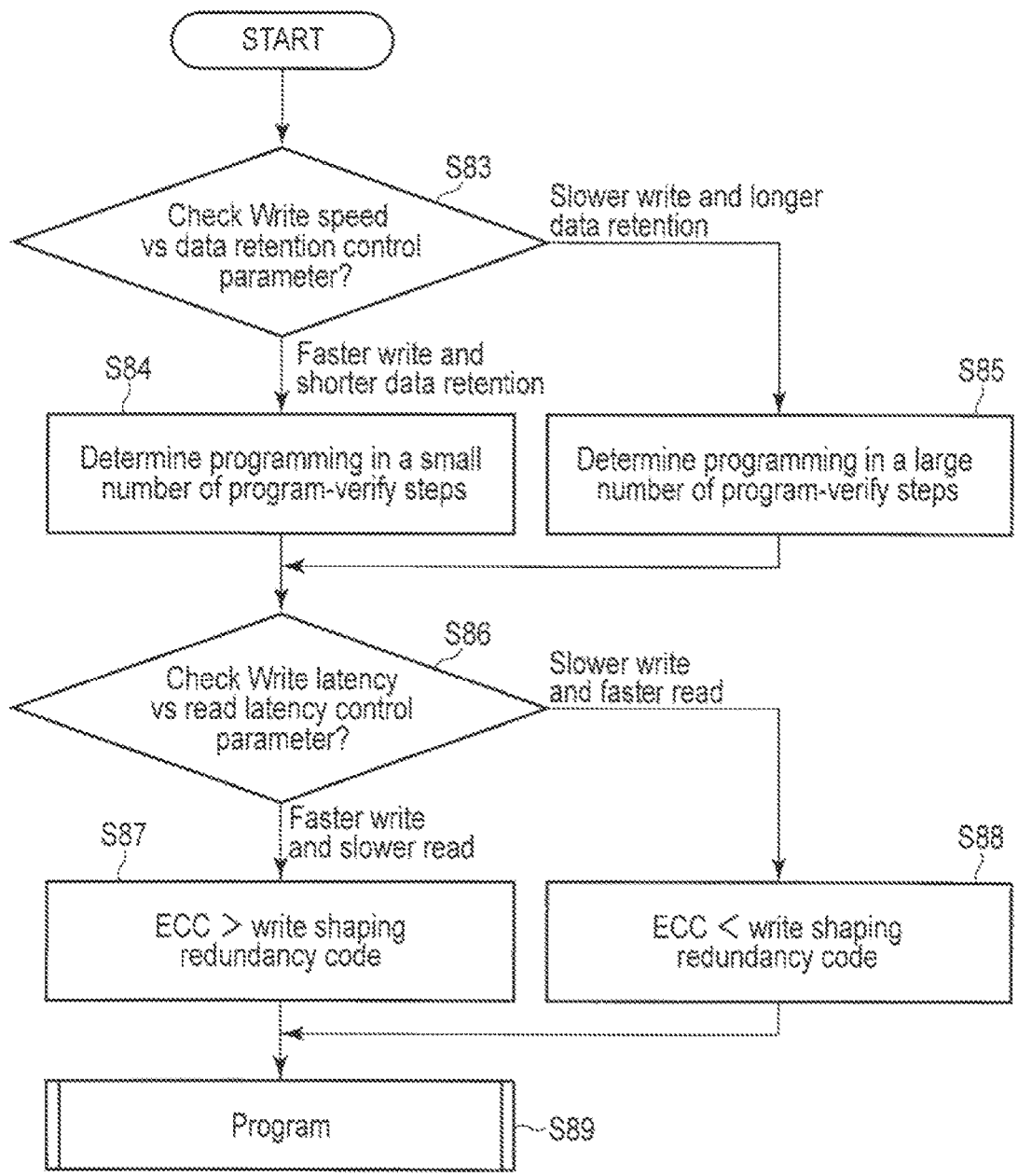
F I G. 50

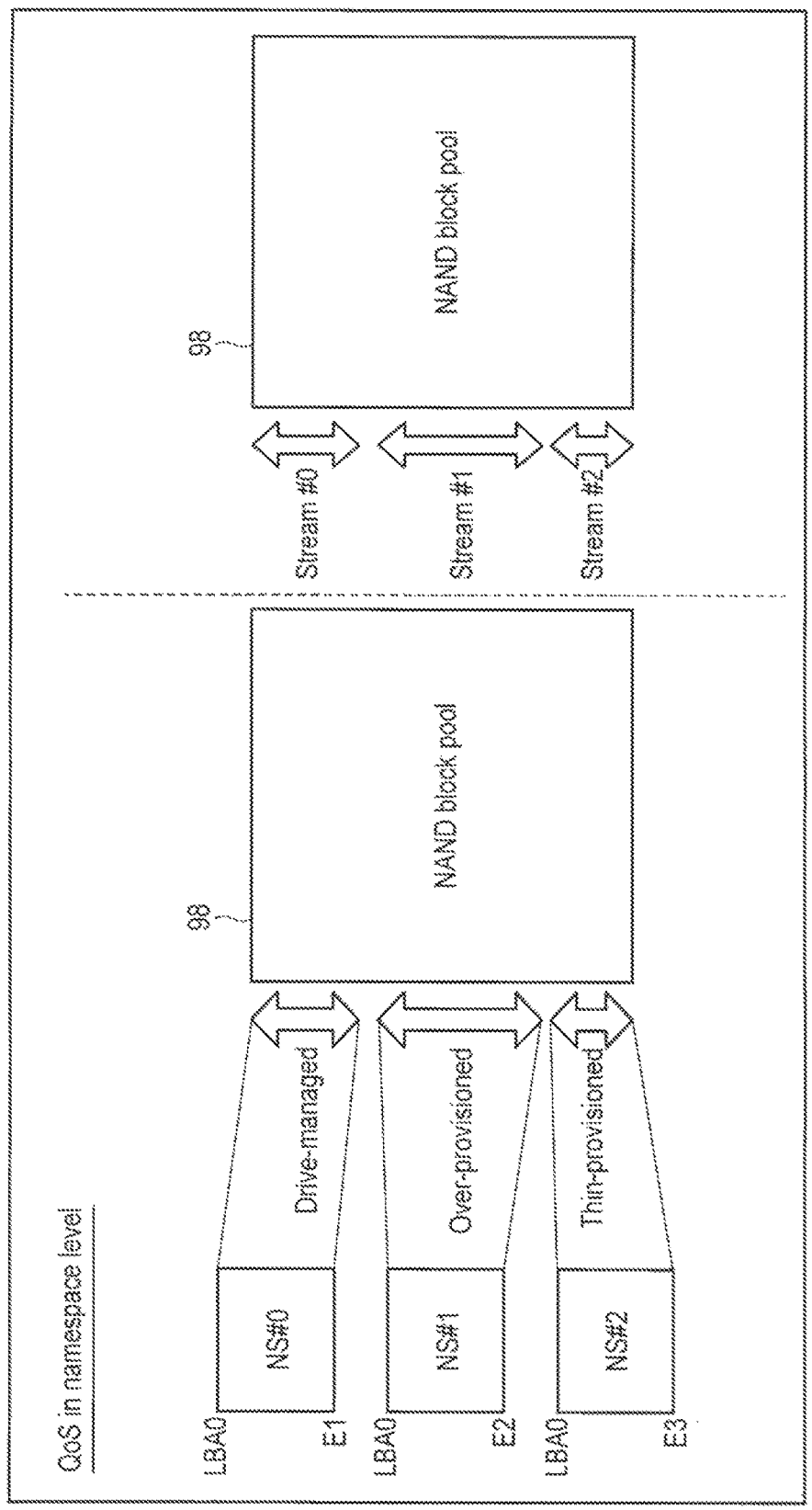
F I G. 51

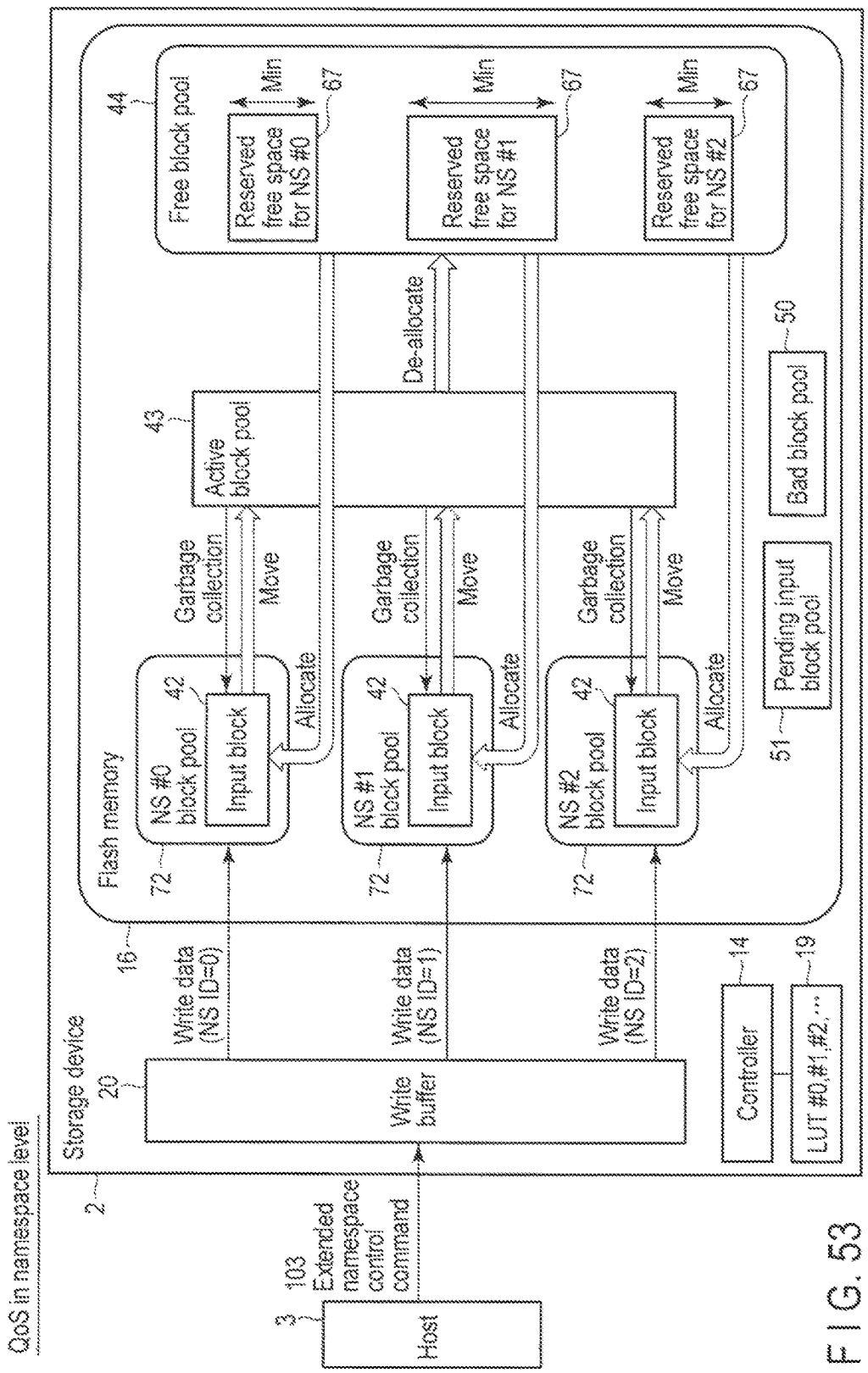
F I G. 53

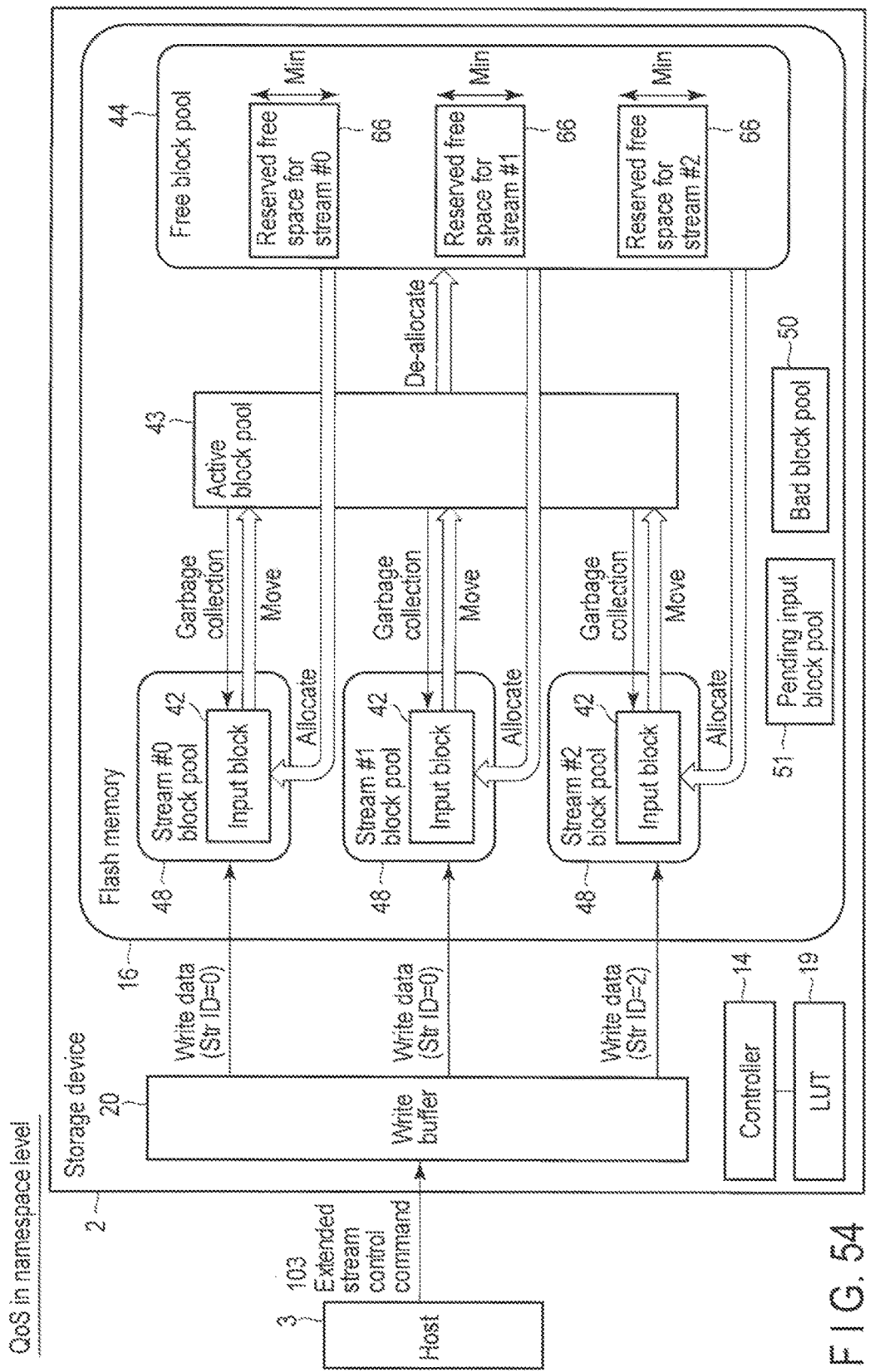
F I G. 54

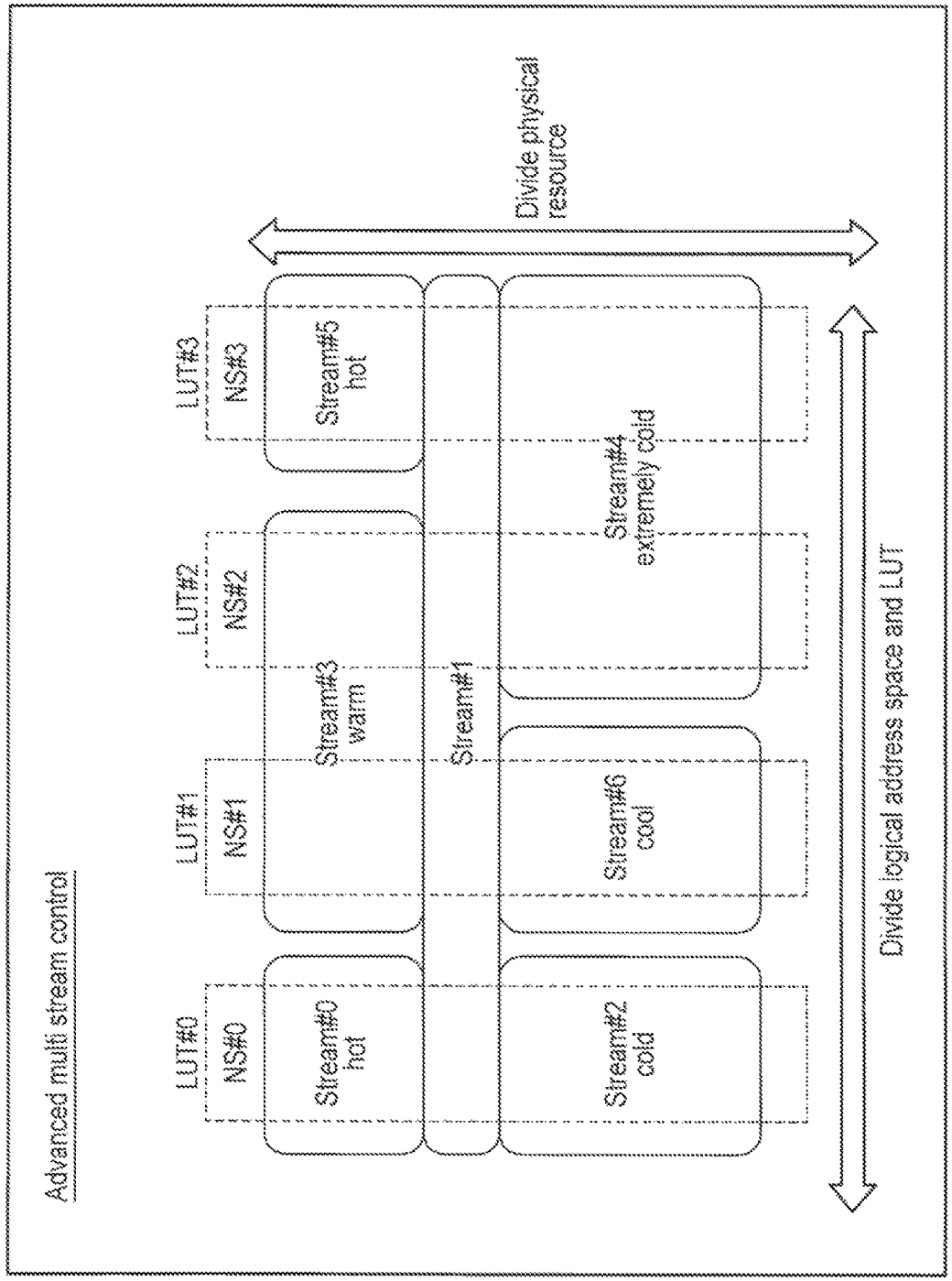
F I G. 55

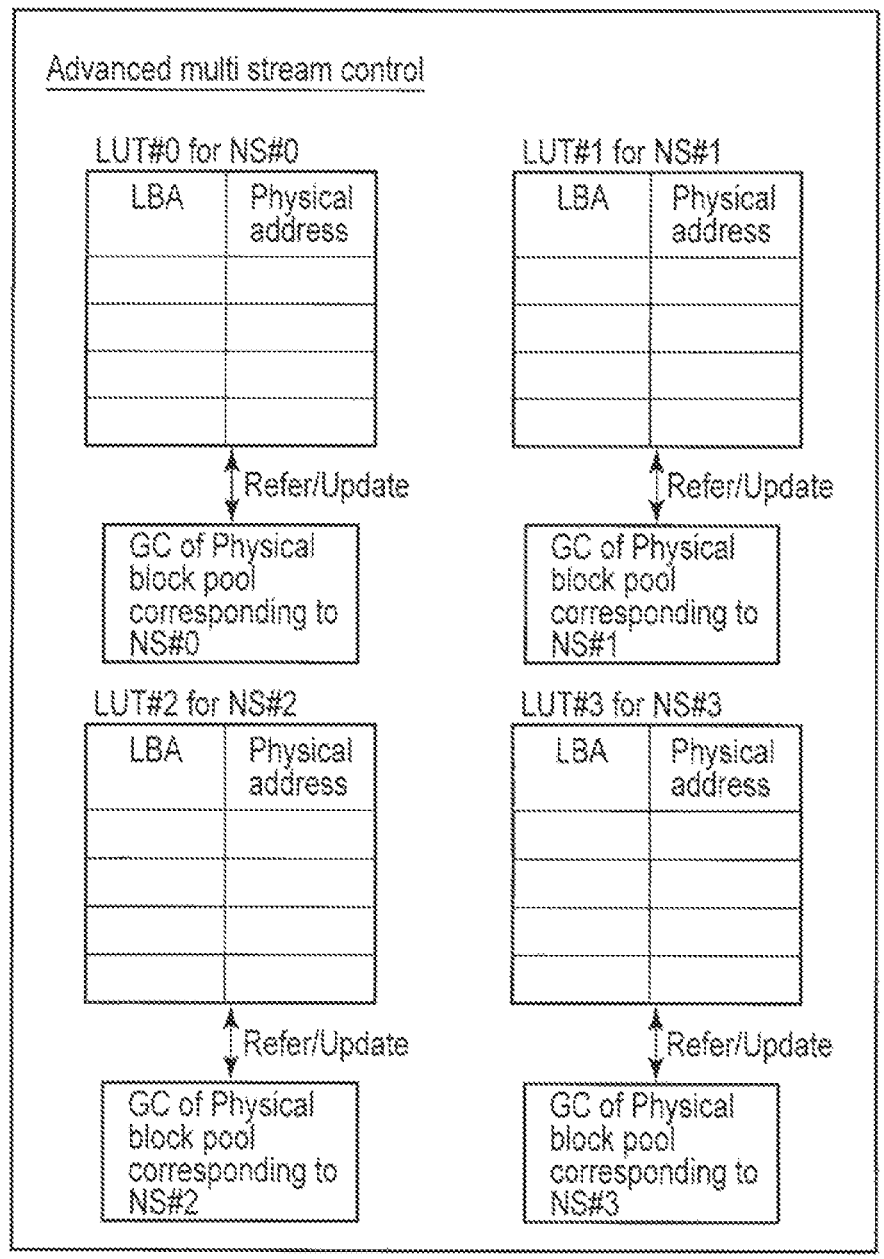
F I G. 56

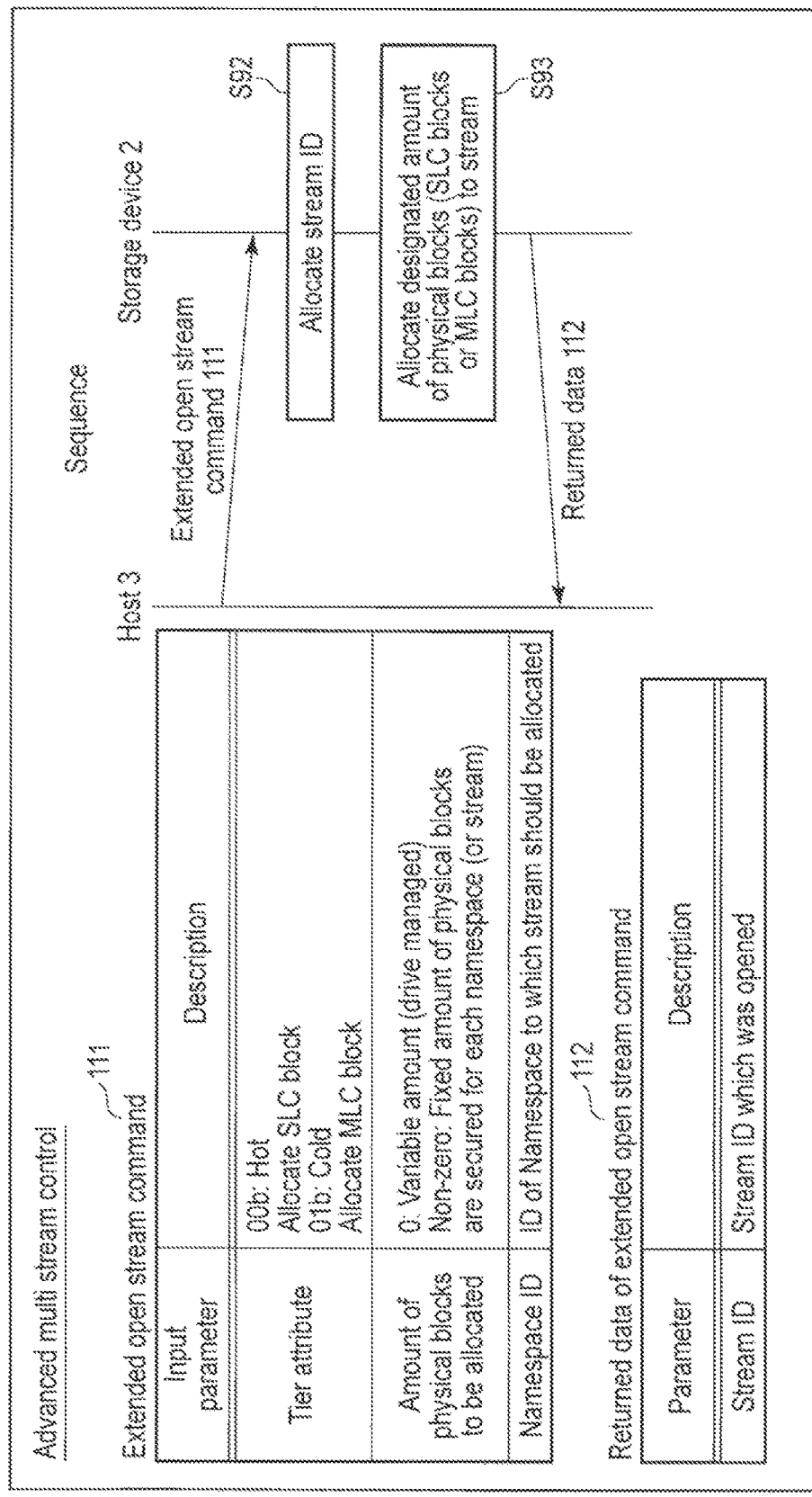
F I G. 57

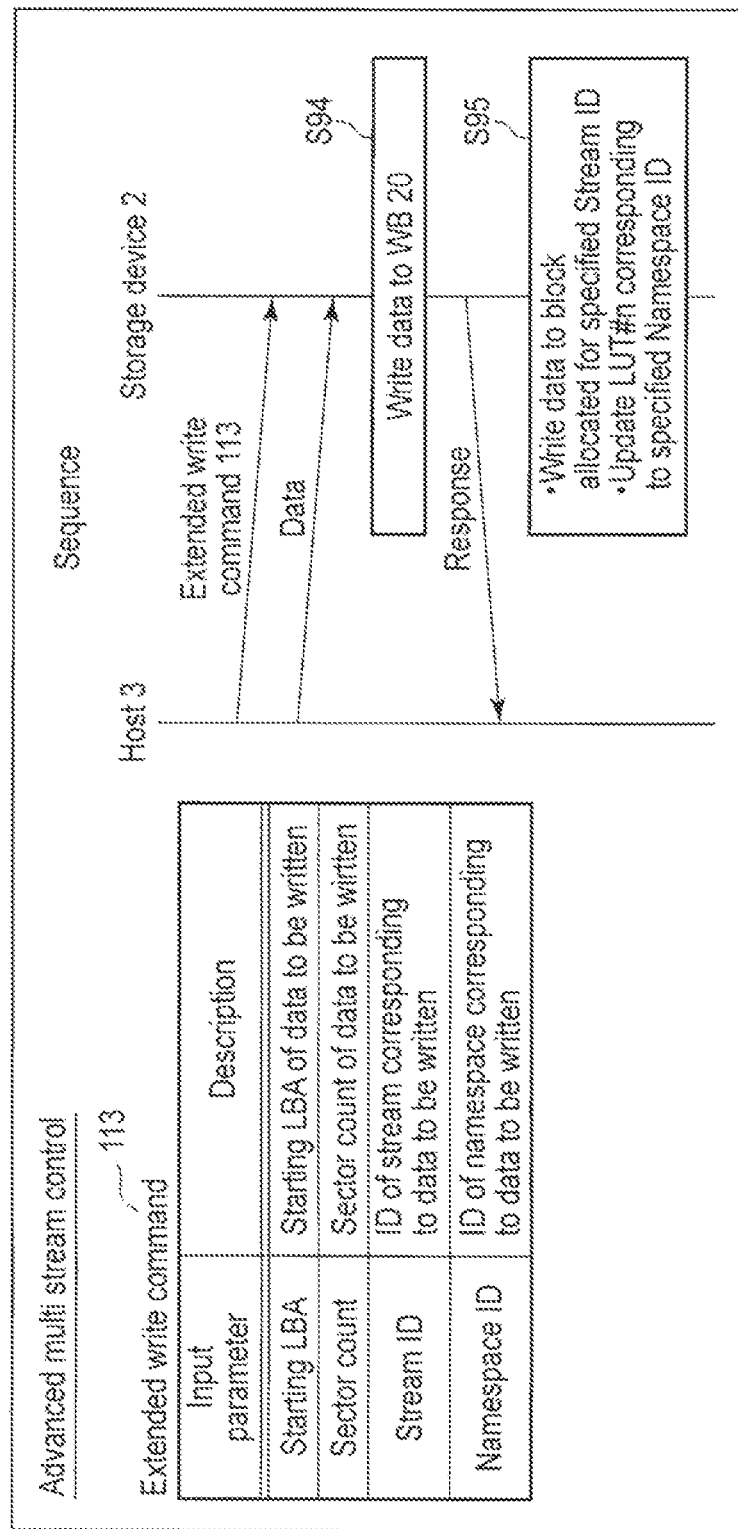
F I G. 58

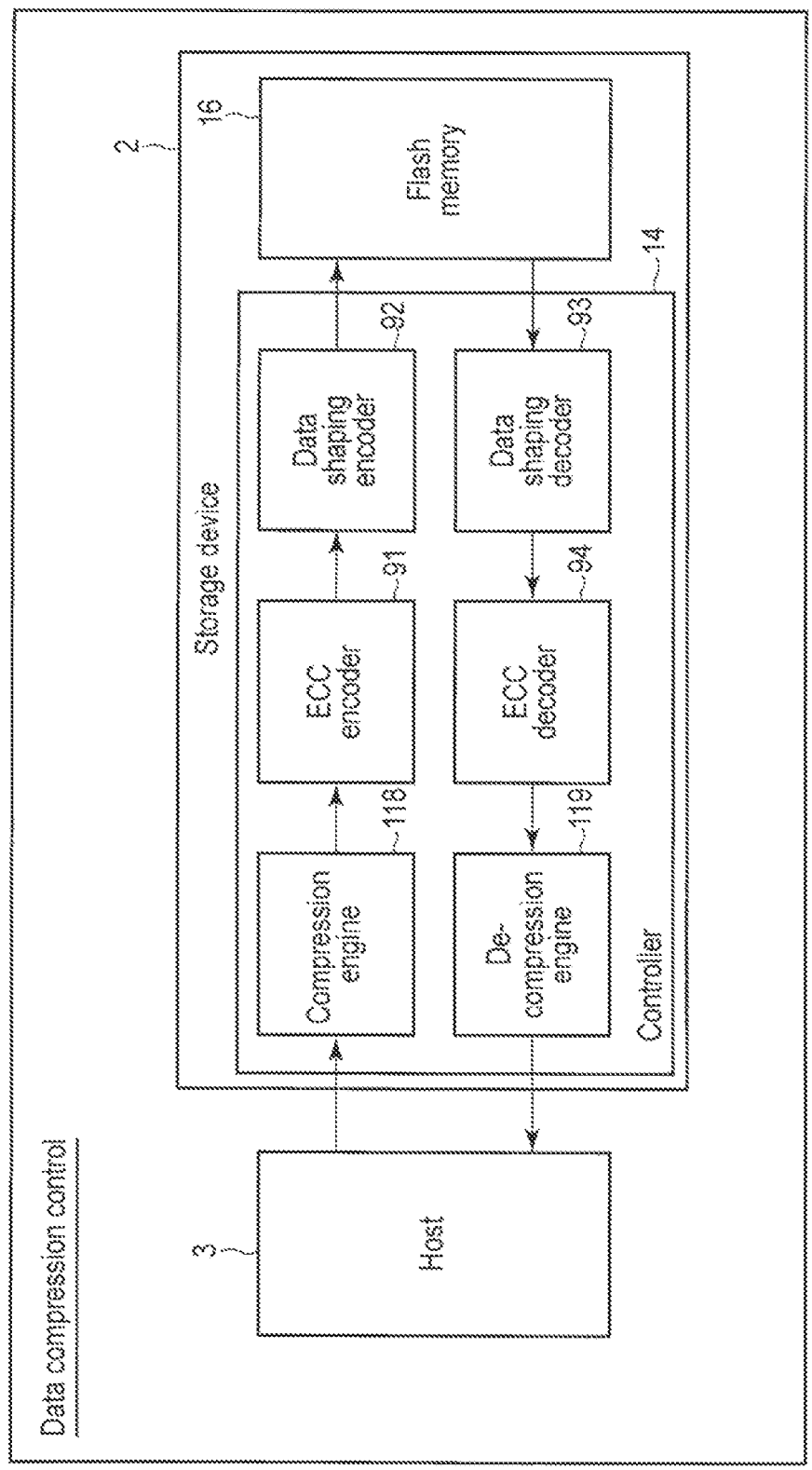
F I G. 59

LUT 19

| Logical addresses (LBA) | Physical addresses | Compression flags | Others |
|---|---|---|---|
|  |  |  |  |
|  |  |  |  |
|  |  |  |  |
|  |  |  |  |
|  |  |  |  |

F I G. 61

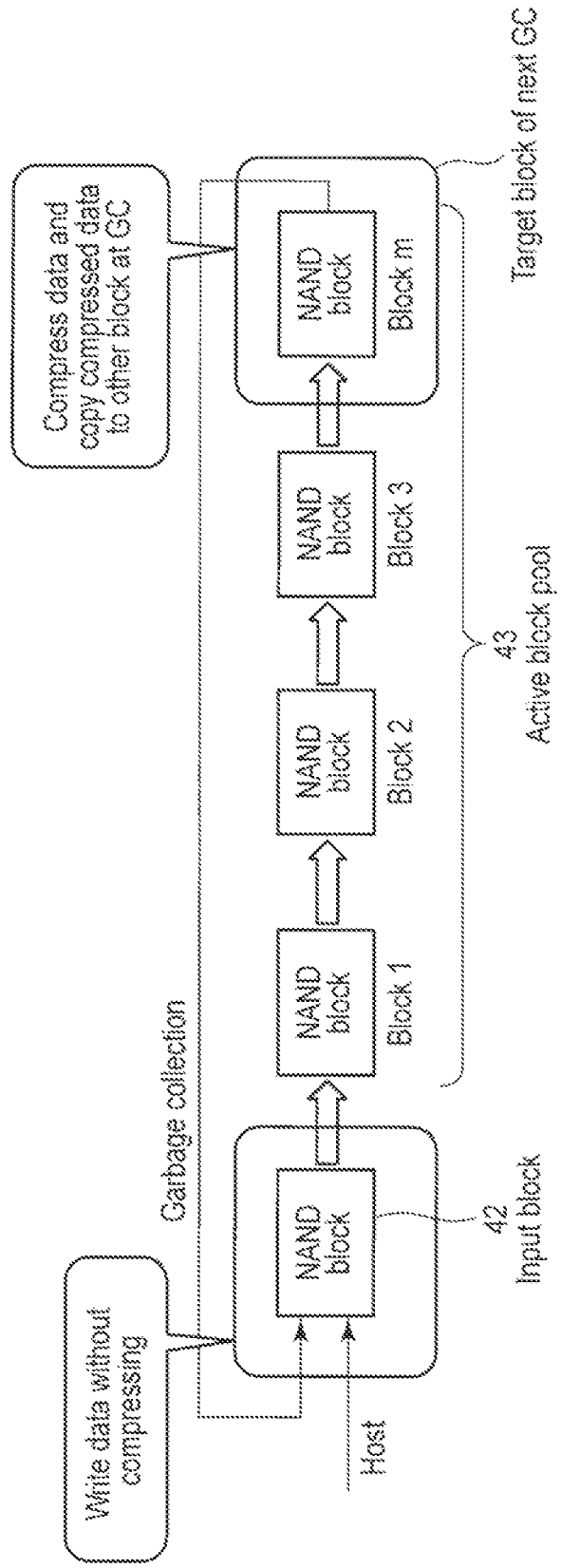
F I G. 62

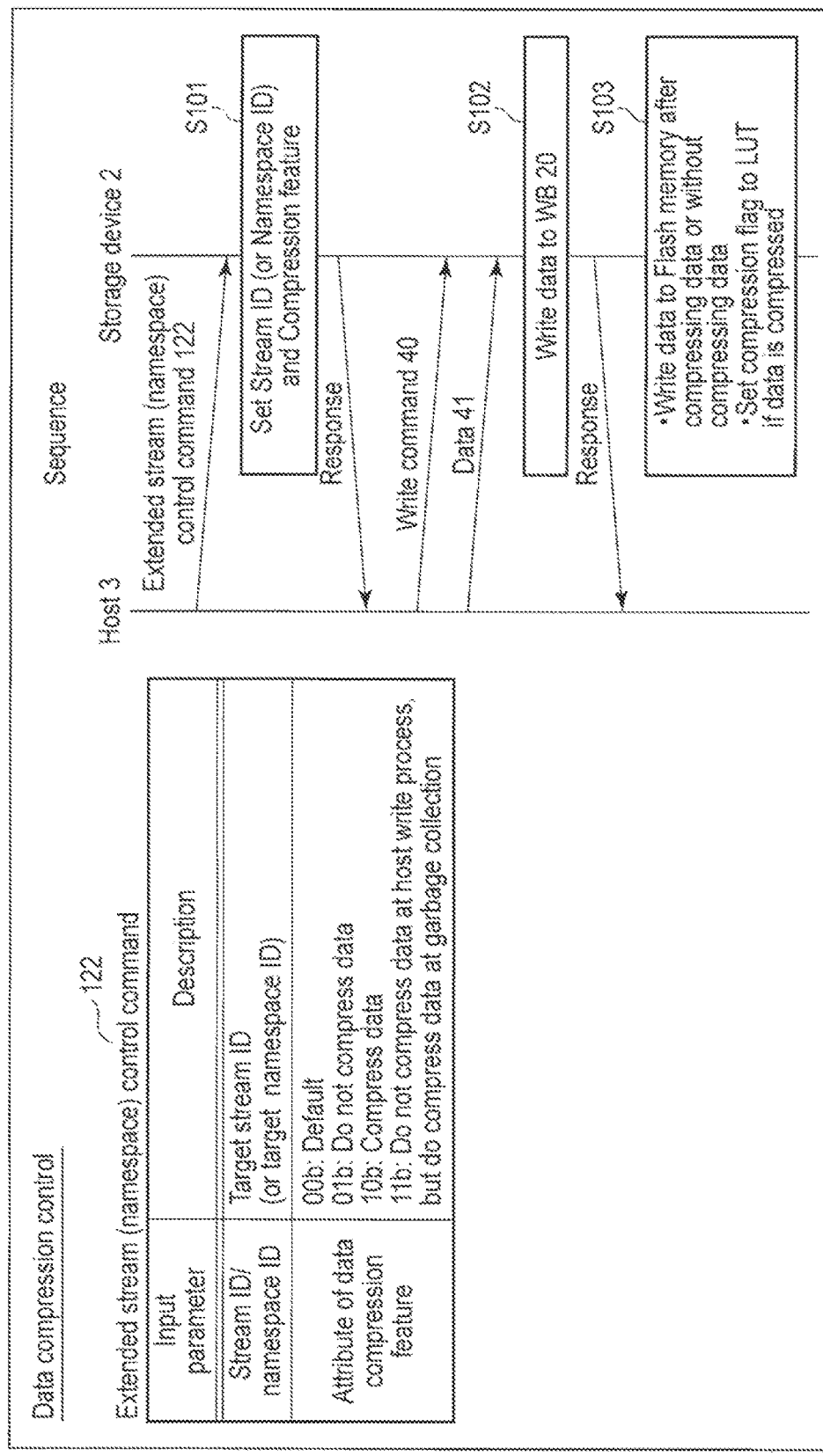
F I G. 64

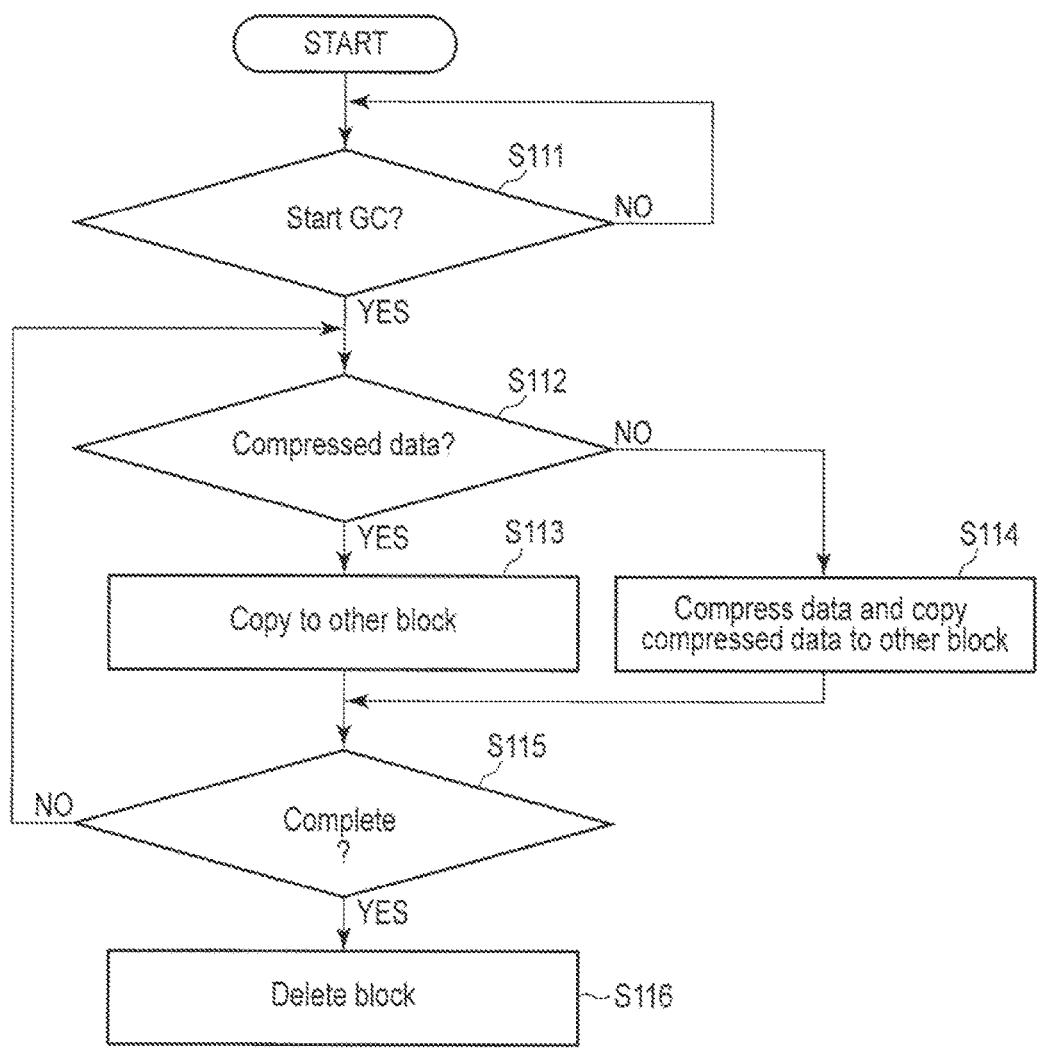
F I G. 65

Backward LUT 19A

| Physical addresses | Time stamps at data write | Data lifetime timer values | Logical addresses |
|---|---|---|---|
|  |  |  |  |
|  |  |  |  |
|  |  |  |  |
|  |  |  |  |
|  |  |  |  |

Data lifetime timer control

Extended open stream command ~124

| Input parameter | Description |
|---|---|
| Data lifetime timer (sec) | 0: Do not discard data<br>Non-zero: Device can discard data at garbage collection after specified time elapsed |

Sequence

Host 3 — Storage device 2

- Extended open stream command 124
- S131: Allocate stream ID
- Allocate input block corresponding to the allocated stream ID
- S132: Return data
- Write command 40
- Data 41
- S133: Write data to WB 20
- Response
- S134:
  - Write data & Update Lookup table
  - Record time stamp at writing and Data lifetime timer value to backward Lookup table
- S135:
  - Refer to backward Lookup table at GC start
  - Discard data meeting condition "current time stamp > time stamp at writing + Data lifetime timer value"

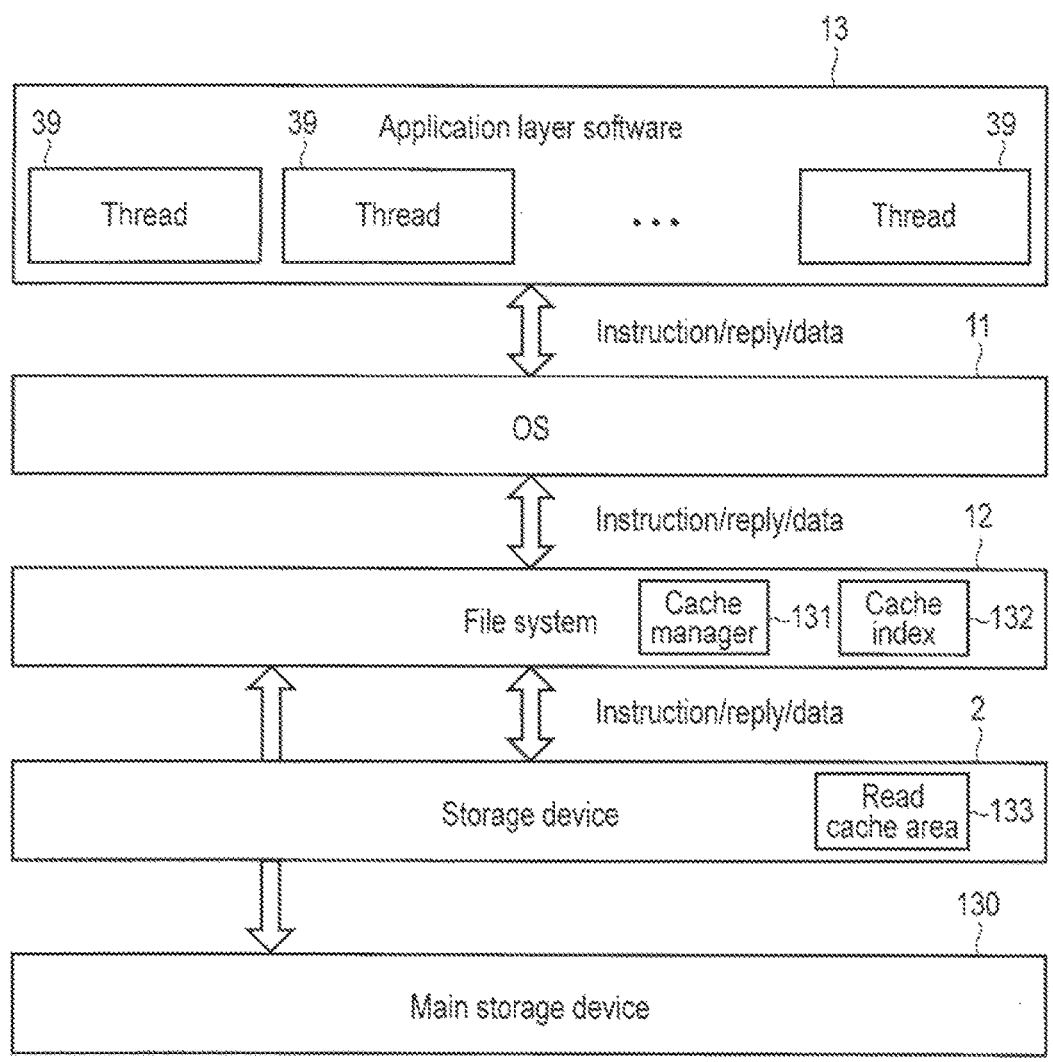
F I G. 70

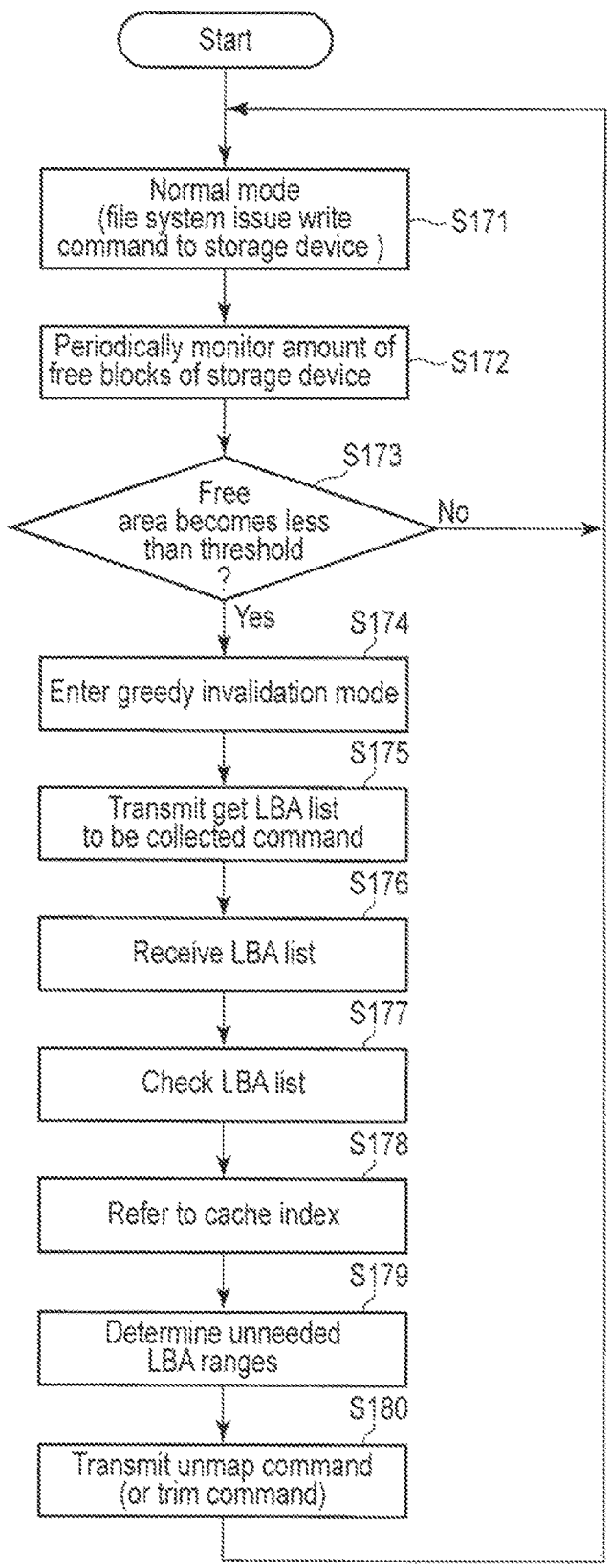
F I G. 72

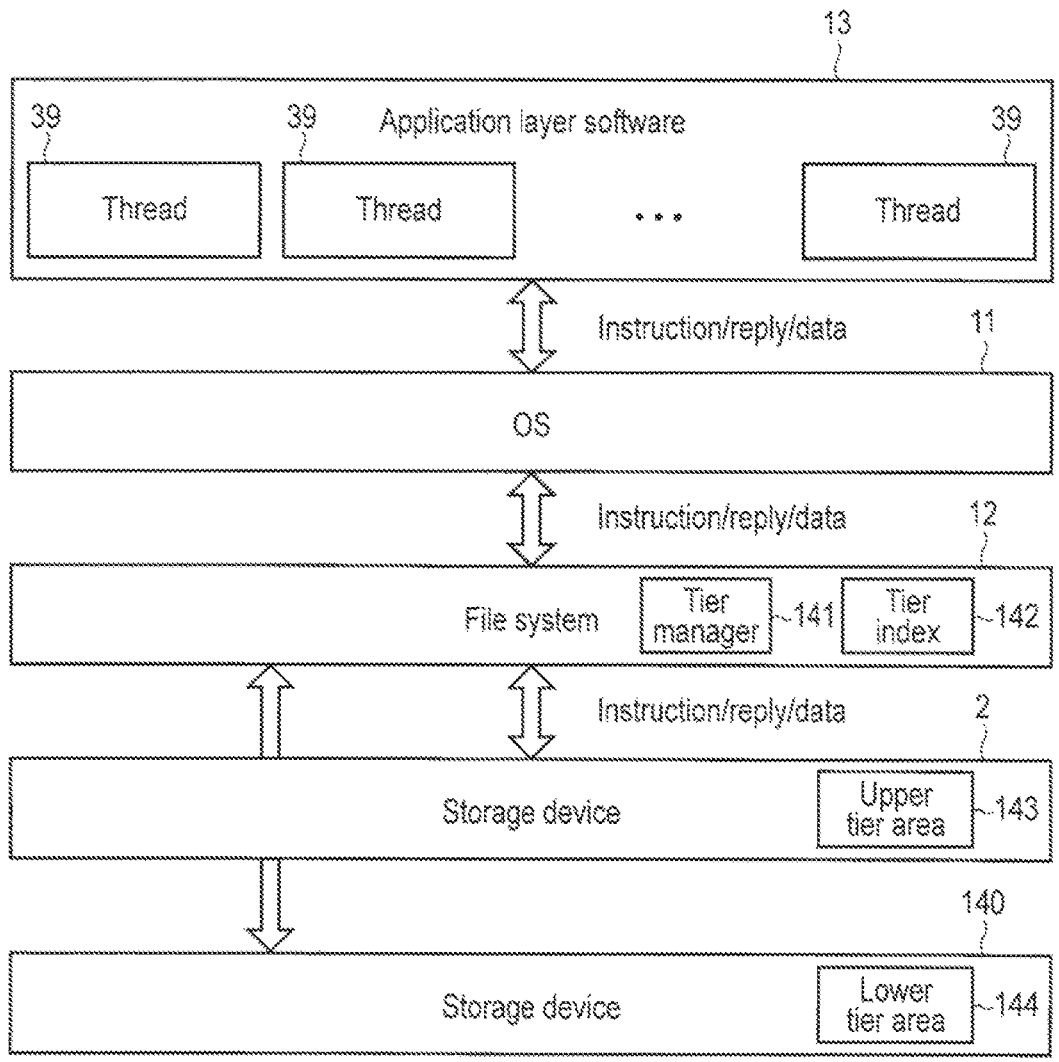
F I G. 73

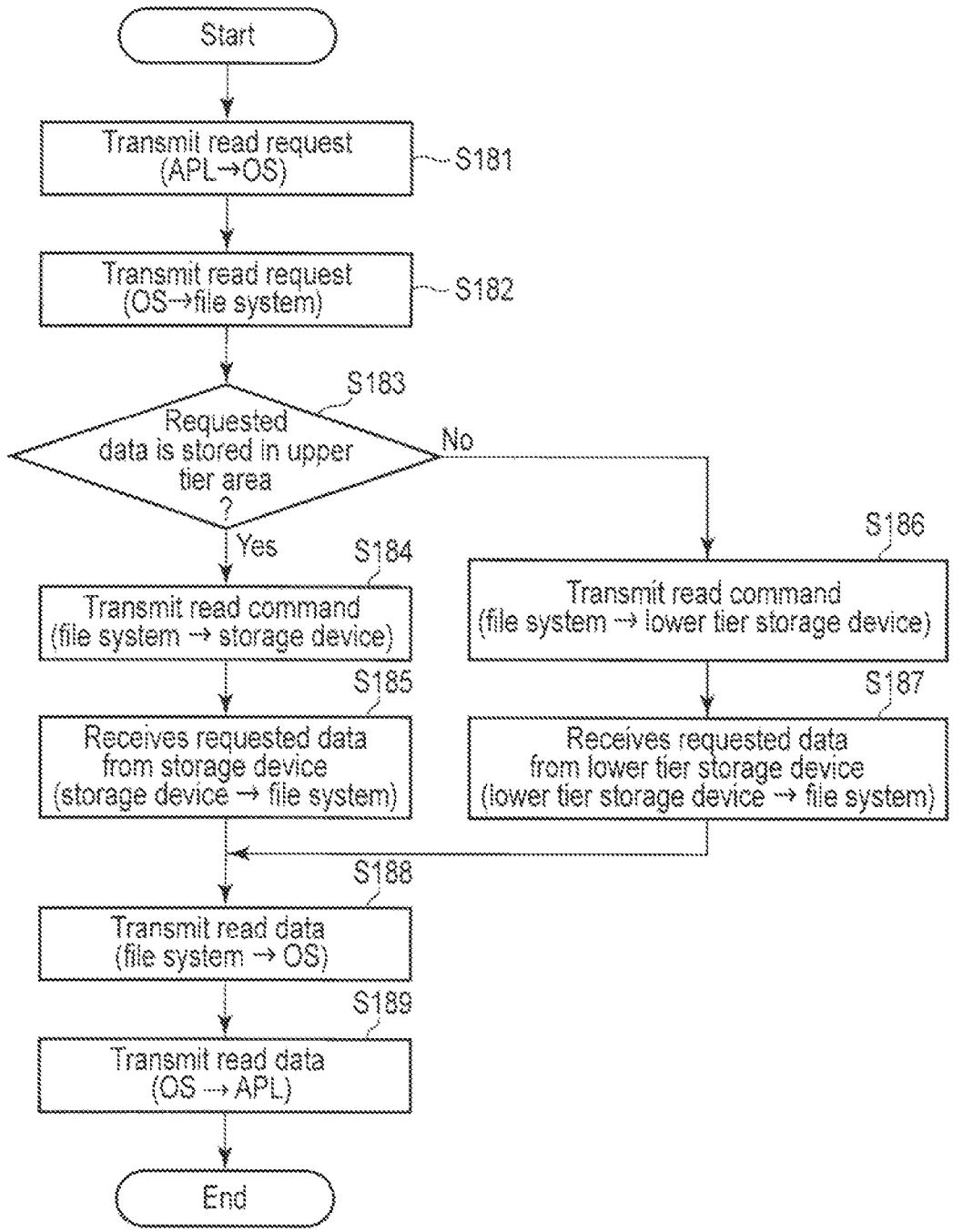
F I G. 74

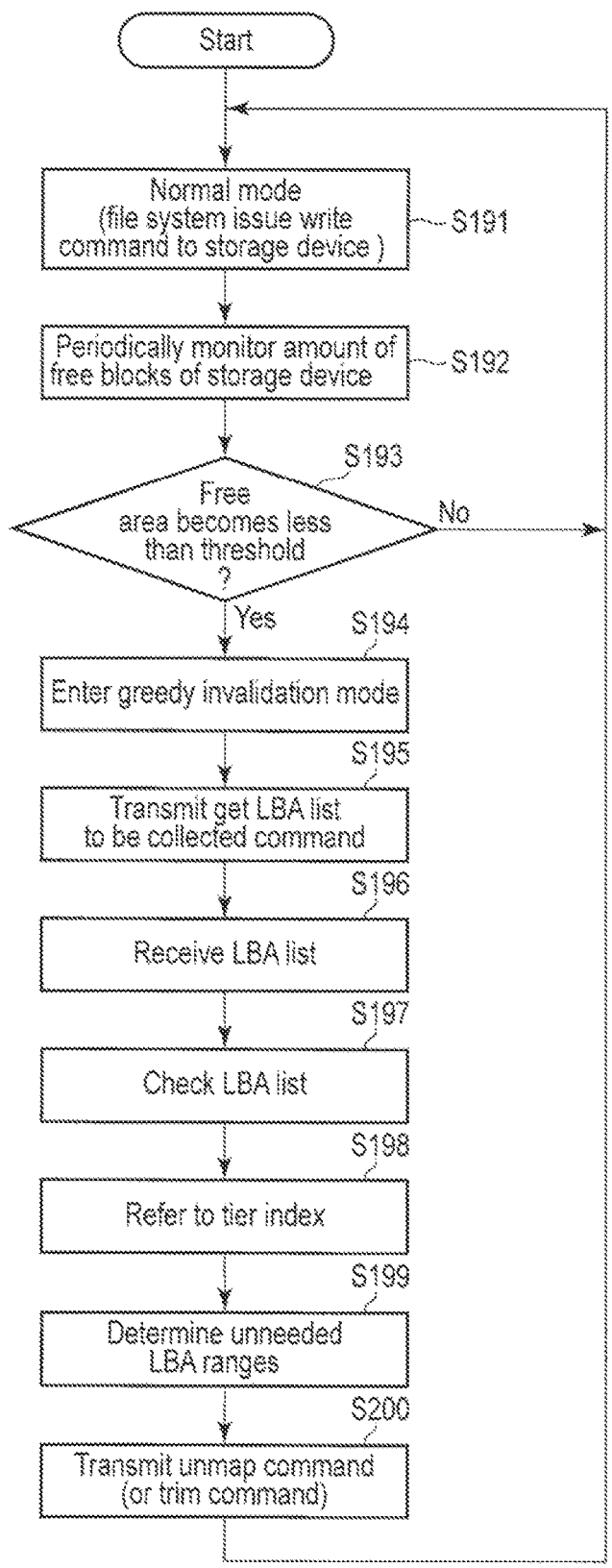
F I G. 75

STORAGE DEVICE THAT SECURES A BLOCK FOR A STREAM OR NAMESPACE AND SYSTEM HAVING THE STORAGE DEVICE

CROSS-REFERENCE TO RELATED APPLICATION

This application is based upon and claims the benefit of priority from the U.S. Provisional Patent Application No. 62/152,372, filed Apr. 24, 2015, the entire contents of which are incorporated herein by reference.

FIELD

Embodiments described herein relate generally to a storage device having nonvolatile memory, in particular a storage device that secures a block of the nonvolatile memory for a stream or a namespace.

BACKGROUND

Recently, a storage device including a nonvolatile memory has become widespread. A solid state drive (SSD) based on NAND flash technology is known as a storage device of one such type. Such an SSD is used as main storage of various computers because of its low power consumption and high performance. For example, a server computer having some tens or some hundreds of the SSDs (enterprise SSDs) is operated at a data center.

For a storage device including the SSDs, lower total cost of ownership (TCO) and higher quality-of-service (QoS) are demanded. To meet these demands, a host of the storage device may need to more actively manage and control operations of the storage device.

BRIEF DESCRIPTION OF THE DRAWINGS

FIG. 1 is a block diagram of an information processing system including a storage device according to an embodiment.

FIG. 2 is a perspective view of the information processing system shown in FIG. 1.

FIG. 8 is a block diagram of a controller in the storage device according to the embodiment.

FIG. 9 illustrates a stream write operation performed by the storage device according to the embodiment.

FIG. 10 illustrates a namespace management performed by the storage device according to the embodiment.

FIG. 12 is a block diagram showing architecture of the storage device according to the embodiment.

FIG. 13 illustrates data structure of an open stream command sent to the storage device and a processing sequence of the command.

FIG. 15 is a block diagram showing architecture of the storage device when Advanced GC (Garbage Collection) control is performed.

FIG. 16 is another block diagram of the storage device when the Advanced (Garbage Collection) control is performed.

FIG. 18 illustrates data structure of an idle garbage collection control command sent to the storage device and a processing sequence of the command.

FIG. 19 is a flowchart of an idle garbage collection operation executed by the storage device according to the embodiment.

FIG. 20 is a block diagram of the storage device when a block boundary report is performed.

FIG. 22 illustrates a state in which data are aligned along a block boundary, in the storage device according to the embodiment.

FIG. 23 illustrates a series of processing sequences of the block boundary report executed by the host and the storage device according to the embodiment.

FIG. 24 is a block diagram showing architecture of the storage device when a select next input block command is processed.

FIG. 27 is a block diagram showing architecture of the storage device when a pend current input block command is processed.

FIG. 29 is a flowchart of the new input block allocation operation executed by the storage device according to the embodiment.

FIG. 30 illustrates data structure of a resume input block command sent to the storage device and a processing sequence of the command.

FIG. 32 illustrates data structure of a release pending input block pool command sent to the storage device and a processing sequence of the command.

FIG. 33 illustrates a relationship between application threads of the host and streams used by the application threads.

FIG. 37 also illustrates the effective "hand-Shake" GC operation.

FIG. 39 illustrates a series of processing sequences of the effective "hand-Shake" GC executed by the host and the storage device according to the embodiment.

FIG. 40 illustrates an in-drive tiering control executed by the storage device according to the embodiment.

FIG. 41 illustrates data structure of an extended write command sent to the storage device and a processing sequence of the command.

FIG. 43 illustrates data structure of a change command applied to the storage device and two processing sequences corresponding to the command.

FIG. 45 illustrates the in-drive tiering control using a Write speed vs Data Retention control parameter in the extended write command shown in FIG. 44.

FIG. 46 illustrates program-verify steps tuning processing executed by the storage device according to the embodiment, based on the Write speed vs Data Retention control parameter.

FIG. 48 illustrates yet another program-verify steps tuning processing executed by the storage device according to the embodiment.

FIG. 50 is a flowchart of the program-verify steps tuning processing and ECC/Write shaping redundancy code tuning processing executed by the storage device according to the embodiment.

FIG. 51 illustrates a QoS in namespace level executed by the storage device according to the embodiment.

FIG. 53 illustrates a reserved free space secured for each namespace in the storage device according to the embodiment.

FIG. 54 illustrates a reserved free space secured for each stream in the storage device according to the embodiment.

FIG. 55 illustrates an advanced multi stream control executed by the storage device according to the embodiment.

FIG. 56 illustrates a plurality of look-up tables corresponding to a plurality of namespaces, managed by the storage device according to the embodiment.

FIG. 57 illustrates data structure of an extended open stream command sent to the storage device and return data of the extended open stream command, and a processing sequence of the extended open stream command.

FIG. 58 illustrates data structure of the extended write command sent to the storage device and a processing sequence of the command.

FIG. 59 illustrates data structure of a data compression control executed by the storage device according to the embodiment.

FIG. 61 illustrates a look-up table to which a compression flag used for the data compression control is included.

FIG. 62 illustrates a data compression control operation to compress data during the garbage collection operation.

FIG. 64 illustrates data structure of an extended stream (namespace) control command sent to the storage device and a processing sequence of the command.

FIG. 65 is a flowchart of the garbage collection operation executed by the storage device according to the embodiment.

FIG. 67 illustrates a backward LUT to which a time stamp at the write timing and a data lifetime timer value are included.

FIG. 68 illustrates data structure of the extended open stream command sent to the storage device for the data lifetime timer control and a processing sequence of the command.

FIG. 70 illustrates a software layer structure when the effective "hand-shake" GC is performed.

FIG. 72 is a flowchart of processing of a cache manager applied to the effective "hand-shake" GC.

FIG. 73 illustrates another software layer structure applied to the effective "hand-shake" GC.

FIG. 74 is a flowchart of a tier algorithm applied to the effective "hand-shake" GC.

FIG. 75 is a flowchart of processing of a tier manager applied to the effective "hand-shake" GC.

DETAILED DESCRIPTION

Figure 3:
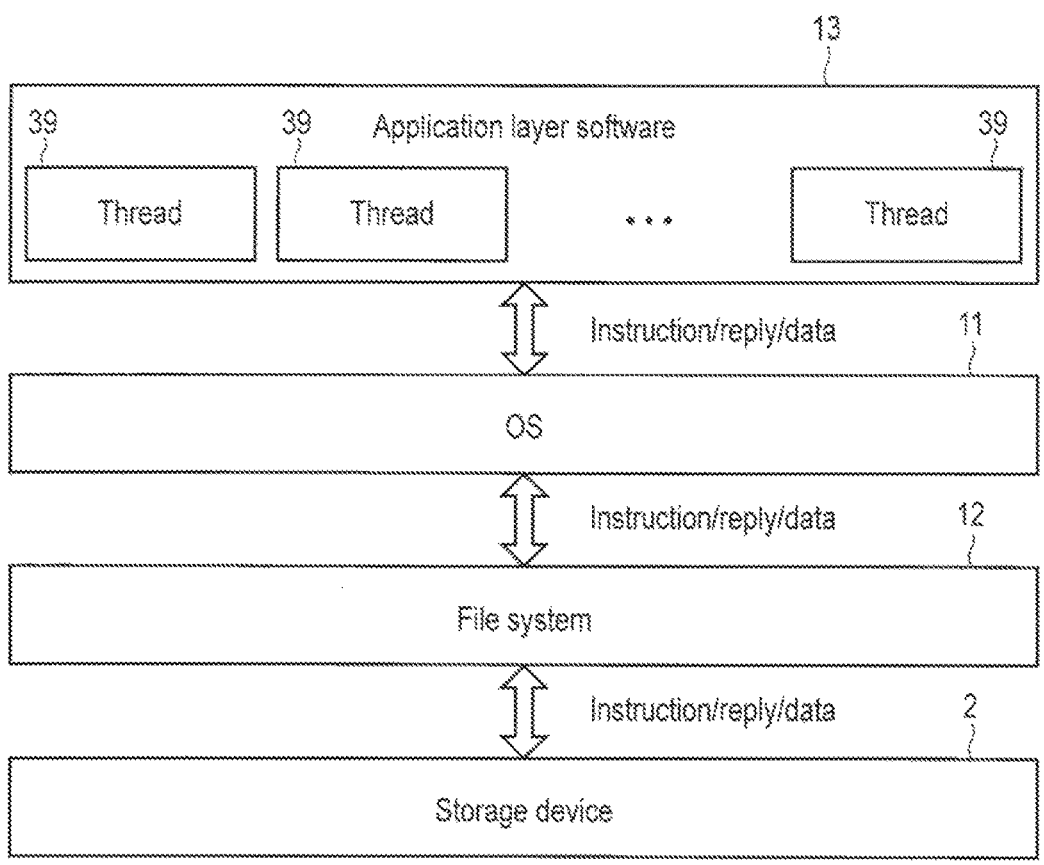
FIG. 3 illustrates a software layer structure of a host in the information processing system shown in FIG. 1.

Various embodiments will be described hereinafter with reference to the accompanying drawings.

In general, according to an embodiment, a storage device includes a nonvolatile semiconductor memory device including a plurality of physical blocks, and a memory controller. The memory controller is configured to associate one or more physical blocks to each of a plurality of stream IDs, execute a first command containing a first stream ID received from a host, by storing write data included in the write IO in the one or more physical blocks associated with the first stream ID, and execute a second command containing a second stream ID received from the host, by selecting a first physical block that includes valid data and invalid data, transfer the valid data stored in the first physical block to a second physical block, and associate the first physical block from which the valid data has been transferred, with the second stream ID.

First, a configuration of an information processing system 1 including a storage device 2 of an embodiment will be described with reference to FIG. 1. The information processing system 1 functions as a storage system that writes data to or reads data from the storage device 2.

The information processing system 1 includes a host (host device) 3, one or more storage devices 2, and an interface 10 configured to connect between the host (host device) 3 and the storage devices 2.

The storage devices 2 are semiconductor storage devices configured to write data to and read data from a nonvolatile memory thereof. In the present embodiment, the storage devices 2 include solid state drives (SSD) 2 based on NAND flash technology. However, the storage devices 2 may include nonvolatile memories of types other than the NAND flash, for example, MRAM.

Besides the storage devices 2 of SSD, the host 3 may be a storage device of the other types (for example, HDD).

The host 3 may be, for example, a server computer used in a data center. Alternatively, the host 3 may be a personal computer.

The storage devices 2 can be used as main storages of an information processing device which functions as the host 3. The storage devices 2 may be built in the information processing device or connected to the information processing device via a cable or a network.

The interface connecting between the host 3 and the storage devices 2 may be based on SCSI, Serial Attached SCSI (SAS), ATA, serial ATA (SATA), PCI Express (PCIe), Universal Serial Bus (USB), Thunderbolt (registered trademark), Ethernet (registered trademark), Fibre channel, etc.

The host 3 includes a CPU 4, a memory 5, a controller 6, and a network interface controller (NIC) 7.

The CPU 4 is a processor configured to execute various programs loaded from one of the storage devices 2 to the memory 5. The programs function as host software. The programs include an operating system (OS) 11, a file system 12, an application software layer 13, etc.

The CPU 4 is connected to the controller 6 via a bus such as PCI Express (PCIe). The CPU 4 controls the controller 6 to control the storage devices 2. The controller 6 is a SAS expander, a PCIe Switch, a PCIe expander, a RAID controller, etc.

The CPU 4 is also connected to a network 8 via the network interface controller (NIC) 7 and a network interface 9. An application software layer 13' of a client terminal 38 connected to the network 8 can access the storage devices 2 via the host 3.

The memory 5 is a Random Access Memory (RAM) which stores programs and data. The memory 5 may be a volatile memory such as DRAM or a nonvolatile memory such as MRAM and ReRAM. The memory 5 includes a storage region for storing the operating system (OS) 11, a storage region for storing the file system 12, and a storage region for storing the application software layer 13.

As is generally known, the OS 11 is software configured to manage the entire host 3, to control the hardware in the host 3, and to execute the software to use the hardware and the storage devices 2. The OS 11 may be, for example, Linux, Windows Server, VMWARE Hypervisor, etc.

The file system 12 is used to execute file operations (creation, saving, updating, deletion, etc.) For example, ZFS, Btrfs, XFS, ext4, NTFS, etc., may be used as the file system 12. Alternatively, a file object system (for example, Ceph Object Storage Daemon) and a key value store system (for example, such as Rocks DB) may be used as the file system 12.

The host 3 (host software) can manage and control the storage devices 2 by transmitting various commands to the storage device 2.

In the present embodiment, an advanced application interface (advanced API) which enables the host 3 to manage and control the storage devices 2 smartly is included in the storage devices 2. The advanced application interface enables the host 3 to execute fine QOS control of the storage devices 2. The advanced application interface can also provide a function of reducing the size of an Over provisioning area required to be reserved in the storage devices 2. A lower TCO with respect to the storage devices 2 can be thereby implemented.

In the present embodiment, not only general commands such as a write command, a read command, an unmap command, a trim command, and a flush command, but also extended commands such as a host initiated garbage control command, an idle garbage control command, a get block boundary info command, a select next input block command, a pend current input block command, a resume input block command, a get pending input pool command, a release pending input block command, a get logical address list to be collected command, an extended write command, an extended namespace (stream) control command, a change command, an extended namespace control command, an extended open stream command, and an extended dataset management command are transmitted to the storage devices 2 via the interface 10. These extended commands are used as advanced API.

FIG. 2 shows a configuration example of the information processing system 1.

In FIG. 2, the information processing system 1 is configured to function as a server computer. The information processing system 1 includes a housing 101 shaped in a thin box which can be accommodated in a rack. A number of storage devices 2 may be arranged inside the housing 101. In this case, the storage devices 2 may be detachably inserted into respective slots provided on a front surface 101A of the housing 101.

A system board (motherboard) 102 is arranged in the housing 101. Various electronic components including the CPU 4, the memory 5, the controller 6, and the network interface controller (NIC) 7 are mounted on the system board (motherboard) 102. The electronic components function as the host 3.

FIG. 3 shows the software layer structure in the host 3.

In general, the application software layer 13 and the client 38 shown in FIG. 1 cannot directly access the storage device 2. For this reason, the application software layer 13 and the client 38 shown in FIG. 1 communicate with the storage device 2 via the OS 11 loaded on the memory 5.

When the application software layer 13 needs to transmit a request such as a read command or a write command to the storage device 2, the application software layer 13 transmits the request to the OS 11. Then, the OS 11 transmits the request to the file system 12. The file system 12 then translates the request into a command (read command, write command, or the like). The command such as a write command and a read command includes a starting logical address (Starting LBA: Logical block Address) corresponding to the data (data to be written or data to be read) and a sector count (transfer length). The file system 12 transmits the command to the storage device 2. When a response from the storage device 2 is received, the file system 12 transmits the response to the OS 11. The, the OS 11 transmits the response to the application software layer 13.

Various application software threads 39 are run on the application software layer 13. Examples of the application software threads 39 include, client software, database software (such as Cassandra DB, Mongo DB, HBASE and etc.), Distributed Storage System (Ceph etc.), Virtual Machine (VM), guest OS and Analytics Software (such as Hadoop, R and etc.).

Figure 4:
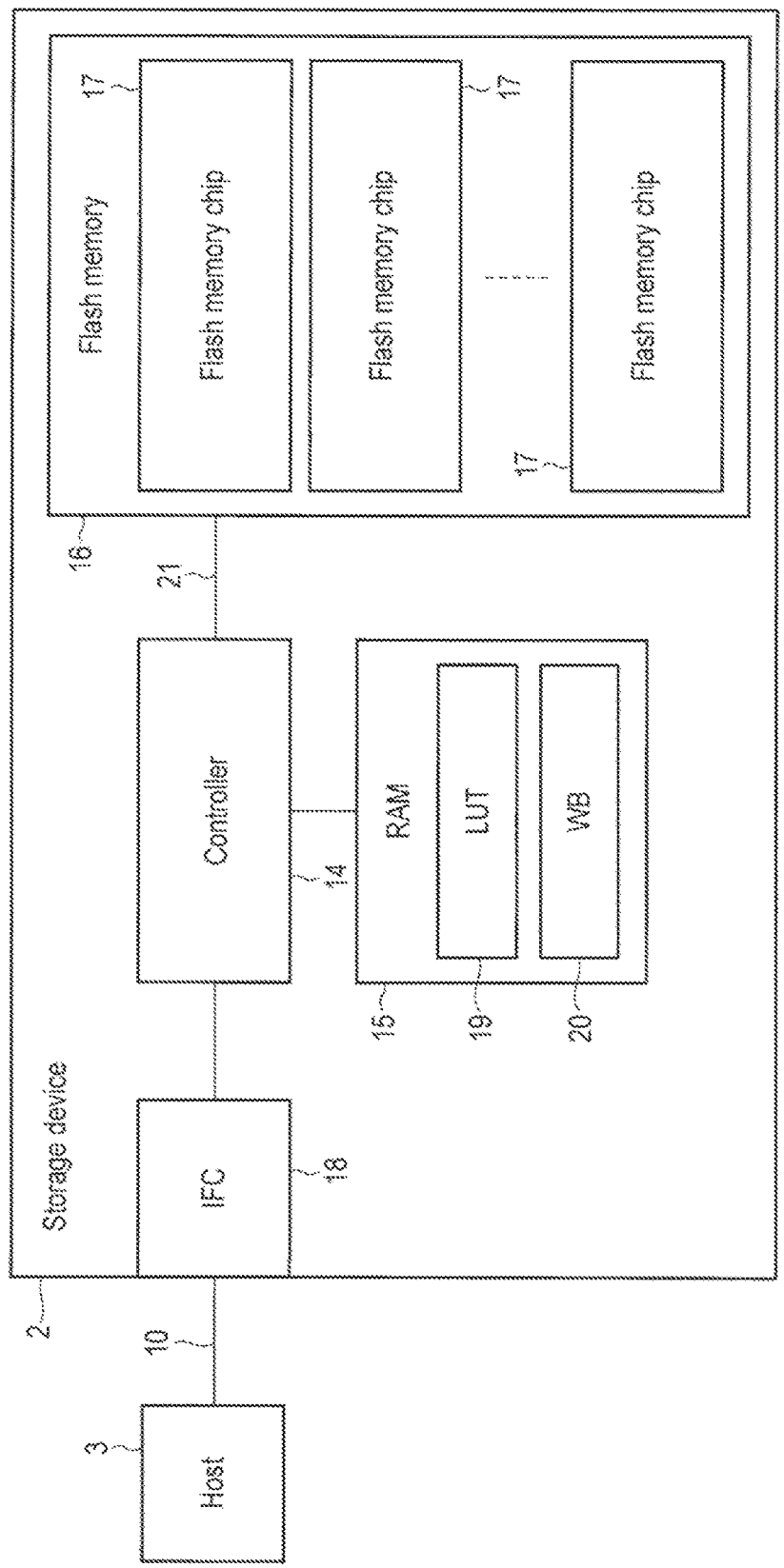
FIG. 4 is a block diagram of the storage device according to the embodiment.

FIG. 4 shows a configuration example of the storage device 2.

In the present embodiment, the storage device 2 is the SSD including the NAND flash memory (hereinafter called flash memory).

The storage device 2 includes a controller 14, a RAM 15, a flash memory 16, and an interface controller (IFC) 18.

The flash memory 16 functions as a nonvolatile memory. The flash memory 16 includes one or more flash memory chips 17. The interface controller (IFC) 18 is configured to transmit a signal to or receive a signal from the host 3 via the interface 10. The RAM 15 includes a storage region to store a lookup table (LUT) 19. The RAM 15 also includes a storage region used as a write buffer (WB) 20.

The lookup table (LUT) 19 stores mapping information indicating relationship between logical addresses and physical addresses of the flash memory 16. Mapping between logical addresses and physical addresses is managed in a predetermined management unit, for example, a unit of page, a unit of block, or a unit of other predetermined data size.

The lookup table (LUT) 19 may further store a flag indicating valid or invalid of the data (physical address) in the management unit. The lookup table (LUT) 19 may include a forward lookup table and a backward lookup table which, by referring to a designated physical address, a logical address, etc., corresponding thereto can be searched.

The write buffer (WB) 20 is a storage region where the data to be written is temporarily stored.

The RAM 15 may be, for example, a volatile RAM such as DRAM (Dynamic Random Access Memory) and SRAM (Static Random Access Memory) or a nonvolatile RAM such as FeRAM (Ferroelectric Random Access Memory), MRAM (Magneto-resistive Random Access Memory), PRAM (Phase Change Random Access Memory), and RaRAM (Resistance Random Access Memory).

The controller 14 is electrically connected to the flash memory 16 via a flash memory interface 21 such as Toggle and ONFI.

The controller 14 can function as a flash translation layer (FTL) configured to execute the data management of the flash memory 16 and the block management of the flash memory 16.

The data management includes (1) management of mapping between the logical addresses (LBAs) and the physical storage locations (physical addresses) of the flash memory 16, and (2) processing for encapsulation of read/write in the page unit and the erase operation in the block unit, etc. The management of mapping between the LBAs and the physical addresses is executed using the lookup table (LUT) 19.

Write of data to a page can be executed at only one time per erase cycle.

For this reason, the controller 14 maps the write (overwrite) to the same LBAs, to at least one other page on the flash memory 16. In other words, the controller 14 writes the data to the other pages. Then, the controller 14 associates the LBAs with the other pages. Furthermore, the controller 14 updates the lookup table (LUT) 19 and invalidates the original pages, i.e., old data associated with the LBAs.

The block management includes bad block management, wear leveling, garbage collection, etc. Wear leveling is an operation of leveling a write count of each block.

Garbage collection is an operation of reclaiming a free space in the flash memory 16. To increase the number of free blocks of the flash memory 16, during the garbage collection operation, all of valid data in a target block where valid data and invalid data exist together are copied to the other block (for example, free block). Further, during the garbage collection operation, the lookup table (LUT) 19 is updated to maps the LBAs of the copied valid data to a correct physical address. By copying the valid data to the other block, the block including the invalid data alone is used as a free block. The block can be therefore reused after erase.

The host 3 transmits a write command to the storage device 2. This command includes the logical address (starting logical address) and a sector counter of the data to be written. The LBAs are used as the logical addresses in the present embodiment, but an object ID may be used as the logical addresses in other embodiments. The LBAs are represented by serial numbers allocated to logical sectors (size: e.g., 512 bytes). The serial numbers start with zero. The controller 14 of the storage device 2 writes the data to be written designated by the Starting LBA and the sector count in the write command, to the block in the flash memory 16. Furthermore, the controller 14 updates the lookup table (LUT) 19 to map the LBAs corresponding to the written data to the physical addresses corresponding to physical storage locations at which the data is written.

Figure 5:
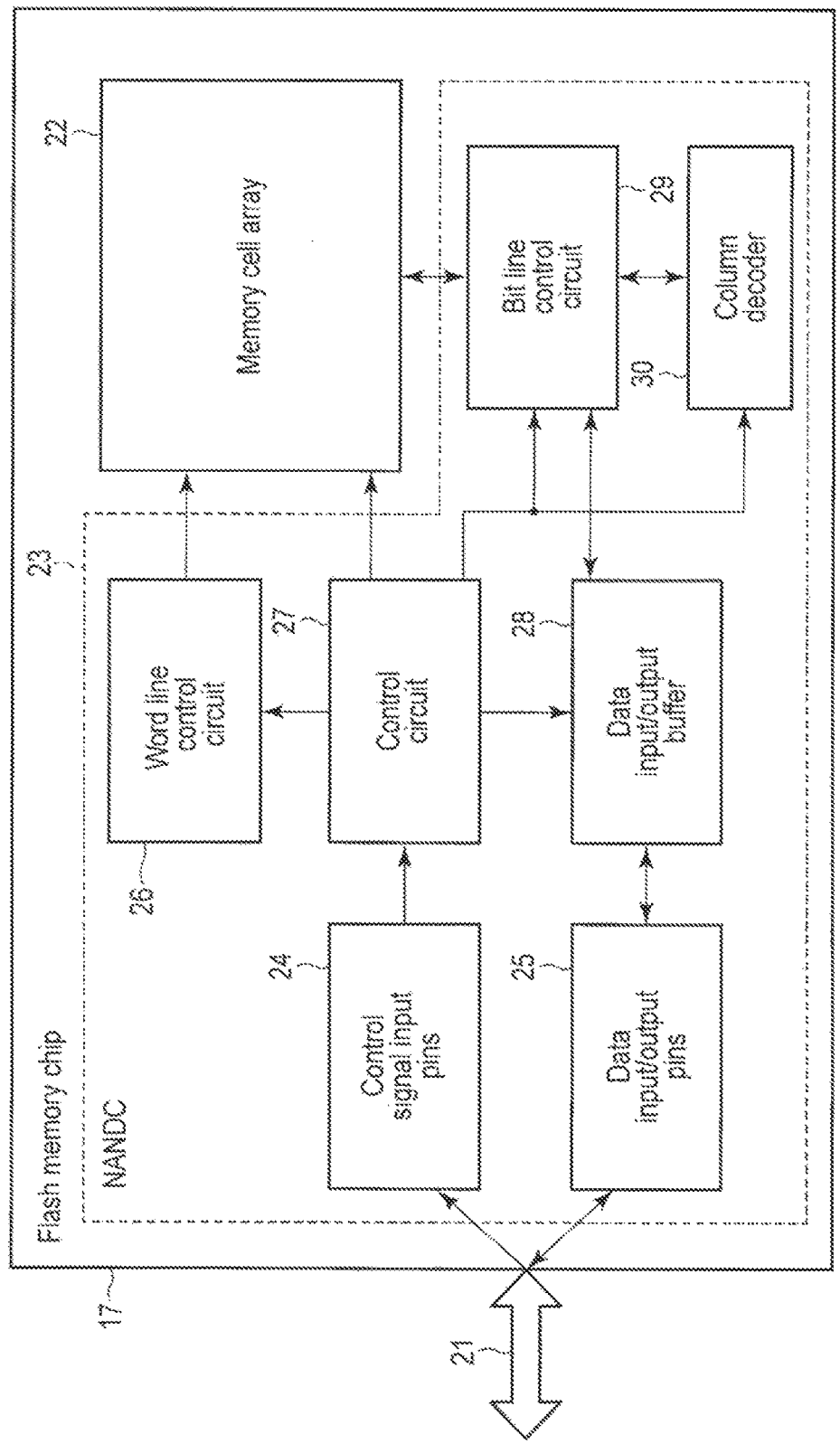
FIG. 5 is a block diagram of a nonvolatile memory chip in the storage device according to the embodiment.

FIG. 5 shows a configuration example of the flash memory chip 17.

The flash memory chip 17 includes a memory cell array 22. The memory cell array 22 includes a number of memory cells. The memory cells are arrayed in a matrix configuration. The memory cell array 22 includes a plurality of bit lines, a plurality of word lines, and a plurality of common source lines. The memory cells are arranged at intersections of the bit lines and the word lines.

A bit line control circuit 29 configured to control the bit lines and a word line control circuit 26 configured to control the word lines are connected to the memory cell array 22. The bit line control circuit 29 cooperates with the word line control circuit 26 to read data from memory cells in a certain page. In addition, the bit line control circuit 29 cooperates with the word line control circuit 26 to write data to memory cells in a certain page.

A column decoder 30, a data input/output buffer 28, and a data input/output pin 25 are connected to the bit line control circuit 29.

The data read from the memory cell array 22 is output to a flash memory interface 21 via the bit line control circuit 29, the data input/output buffer 28, and the data input/output pin 25.

The write data input from the flash memory interface 21 to the data input/output pin 25 is transmitted to the memory cell array 22 via the data input/output buffer 28, column decoder 30 and the bit line control circuit 29.

In addition, the memory cell array 22, the bit line control circuit 29, the column decoder 30, the data input/output buffer 28, and the word line control circuit 26 are connected to a control circuit 27. The control circuit 27 generates control signals and control voltages to control the memory cell array 22, the bit line control circuit 29, the column decoder 30, the data input/output buffer 28, and the word line control circuit 26, based on control signals input from the flash memory interface 21 to control signal input pins 24.

Figure 6:
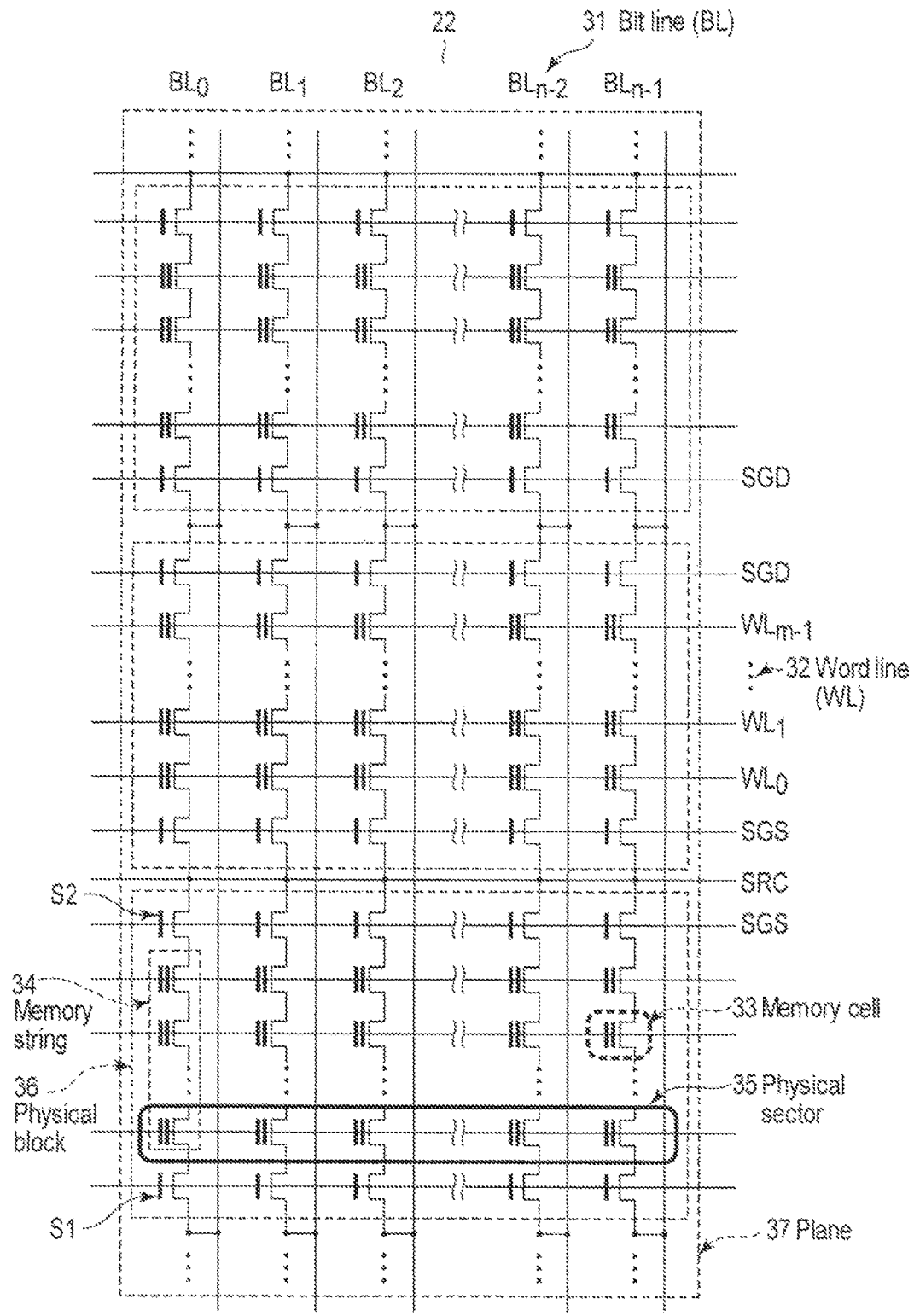
FIG. 6 is a circuit diagram of a memory cell array in the nonvolatile memory chip shown in FIG. 5.

FIG. 6 shows a configuration example of the memory cell array 22.

In the present embodiment, the memory cell array 22 is a NAND cell type memory cell array formed of a plurality of NAND cells. Each NAND cell includes a memory string 34, and selection gates S1 and S2 connected to both ends of the memory string 34. The memory string 34 includes a plurality of memory cells 33 connected in series.

Each memory cell 33 is composed of a memory cell transistor. The memory cell transistor is composed of a MOSFET (Metal Oxide Semiconductor Field Effect Transistor) having a stacked gate structure formed on the semiconductor substrate. The stacked gate structure includes a charge storage layer (floating gate electrode) formed on the semiconductor substrate via a gate insulating film, and a control gate electrode formed on the floating gate electrode via an inter-gate insulating film. A threshold voltage of the memory cell transistor is varied in accordance with the number of electrons trapped in the floating gate electrode. The memory cell transistor storing data of a certain specific value has a threshold voltage corresponding to the data of the specific value.

The selection gate S1 is connected to a bit line BL 31 while the selection gate S2 is connected to a source line SRC. Control gates of the memory cells 33 arranged in the same row are commonly connected to an identical word line WL 32. Gates of the selection gates S1 are commonly connected to a select line SGD while gates of the selection gates S2 are commonly connected to a select line SGS.

The memory cell array 22 includes at least one plane 37. The plane 37 includes a plurality of physical blocks 36. Each of the physical blocks 36 includes a plurality of NAND cells. The data is erased in unit of the physical block 36.

The plurality of memory cells 33 connected to the identical word line 32 forms a physical sector 35. Data write and read are executed in unit of the physical sector 35. When a write method (SLC: Single Level Cell) for writing 1-bit data per memory cell is employed, the physical sector 35 is equivalent to a page. When a write method (MLC: Multi Level Cell) for writing 2-bit data per memory cell is applied, the physical sector 35 is equivalent to two pages (i.e., an upper page and a lower page). When a write method (TLC: Triple Level Cell) for writing 3-bit data per memory cell is employed, the physical sector 35 is equivalent to three pages (i.e., an upper page, a middle page and a lower page).

One word line and one physical sector are selected based on the physical address like the row address received from the controller 14, during the read operation and the write operation (also called program operations). Change of the pages in the physical sector 35 is executed based on a physical page address in the physical address. In the present embodiment, when a certain physical block is set to write the data using the 2-bit/cell writing method (MLC), the controller 14 recognizes the physical sector 35 as two pages, i.e., the upper page and the lower page. In contrast, when a certain physical block is set to write the data using a 1-bit/cell writing method (SLC), the controller 14 recognizes the physical sector 35 as one page. The physical address includes the physical page address and the physical block address. The physical page addresses are allocated to all the physical pages, and the physical block pages are allocated to all the physical blocks.

Figure 7:
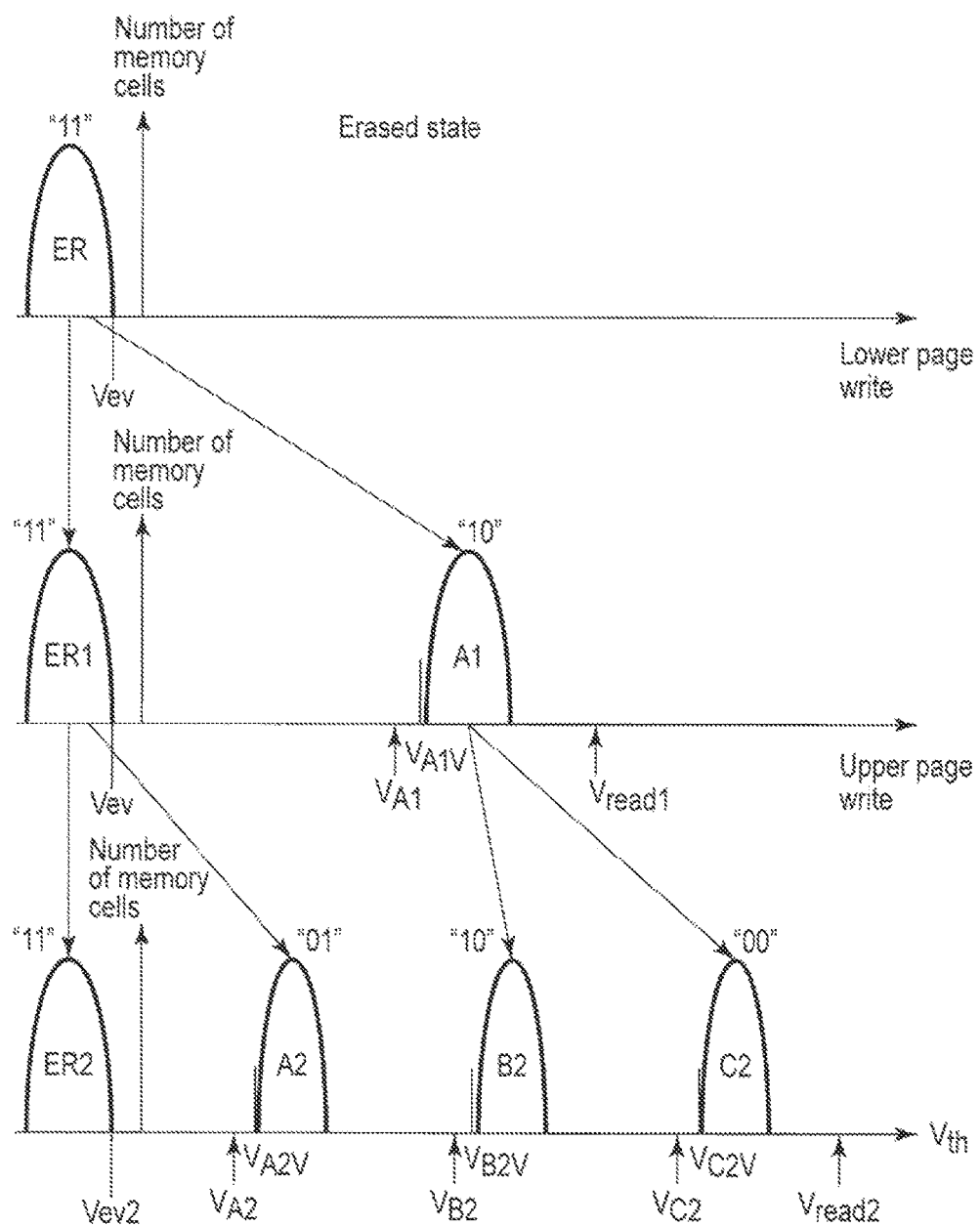
FIG. 7 illustrates a threshold voltage distribution when an MLC data writing method is employed for the nonvolatile memory chip shown in FIG. 5.

FIG. 7 shows a threshold voltage distribution when the 2-bit/cell writing method (MLC data writing method) is employed for the flash memory chip 17.

The threshold value of the memory cell (memory cell transistor) for which the 2-bit/cell writing method is employed is set at any one of four threshold voltages corresponding to one of 2-bit data (data "11", "01", "10" and "00").

2-bit data of one memory cell includes lower page data and upper page data. The lower page data and the upper page data are written to the memory cell through different write operations. When the 2-bit data is represented as "UL", U represents the upper page data and L represents lower page data.

In FIG. 7, VA1 indicates a control voltage applied to the control gate of the memory cell transistor to read 1-bit data (state ER1 or state A1) from the lower page alone. VA1V indicates a verify voltage applied to the control gate of the memory cell transistor in a verify operation to determine whether or not the data has been normally written to the memory cell transistor.

VA2, VB2, and VC2 indicate control voltages applied to the control gate of the memory cell transistor to read 2-bit data (state ER2, state A2, state B2, and state C2) from the lower page and the upper page. VA2V indicates a verify voltage applied to the control gate of the memory cell transistor in a verify operation to determine whether or not the data (state A2) has been normally written to the memory cell transistor. VB2V indicates a verify voltage applied to the control gate of the memory cell transistor in a verify operation to determine whether or not the data (state B2) has been normally written to the memory cell transistor. VC2V indicates a verify voltage applied to the control gate of the memory cell transistor in a verify operation to determine whether or not the data (state C2) has been normally written to the memory cell transistor.

First, writing the lower page data will be described with reference to first to second rows in FIG. 7.

Each of all the memory cell transistors in the erased block has a threshold voltage distribution ER in the erased state. The threshold voltage distribution ER corresponds to data "11".

The threshold voltage distribution ER of the memory cell transistor is set to be either of two threshold voltage distributions (ER1 and A1) in accordance with the value ("1" or "0") of the lower page data. If the value of the lower page data is "1", the threshold voltage distribution of the memory cell transistor is maintained to be data "11" (ER1).

In contrast, if the value of the lower page data is "0", program-verify steps are repeatedly executed to raise the threshold voltage of the memory cell transistor by a predetermined amount. The program operation and the verify operation are executed by one program-verify step. The verify operation is an operation to determine whether or not target data is programmed in the memory cell transistor, by reading the data from the memory cell transistor. The threshold voltage distribution of the memory cell transistor is changed to data "10" (A1) by executing the program-verify steps at a predetermined number of times.

Next, writing the upper page data will be described with reference to the second to third rows in FIG. 7.

If the value of the upper page data is "1", the threshold voltage distribution of the memory cell transistor of data "11" (ER1) is maintained to be data "11" (ER2), and the threshold voltage distribution of the memory cell transistor of data "10" (A1) is maintained to be data "10" (B2). However, the threshold voltage distribution B2 may be adjusted at a level higher than the threshold voltage distribution A1 using the positive verify voltage VB2V higher than the verify voltage VA1V.

In contrast, if the value of the upper page data is "0", the program-verify steps are executed at a predetermined number of times to raise the threshold voltage of the memory cell transistor by a predetermined amount. As a result, the threshold voltage distribution of the memory cell transistor of the data "11" (ER1) is changed to data "01" (A2), and the threshold voltage distribution of the memory cell transistor of the data "10" (A1) is changed to the data "00" (C2). At this time, the verify voltages VA2V and VC2V may be used, and the lower limits of the threshold voltage distributions A2 and C2 may be adjusted.

FIG. 8 shows a configuration example of the controller 14 in the storage device 2.

The flash memory 16 includes a number of blocks (physical blocks) B0 to Bm−1 as described above. One block functions as an erase unit. Each of the blocks B0 to Bm−1 includes a number of pages (physical pages P0 to Pn−1). In the flash memory 16, data read and data write are executed in unit of page.

The controller 14 includes a CPU 61, a RAM interface 62, a NAND interface 63, and at least one hardware engine 64. The CPU 61, the RAM interface 62, the NAND interface 63, and the hardware engine 64 are interconnected via a bus 60.

The CPU 61 is a processor configured to control the RAM interface 62, the NAND interface 63, and the hardware engine 64. The CPU 61 executes command processing for processing commands from the host 3, etc., besides the FTL layer processing. The CPU 61 further executes processing corresponding to the advanced API.

The RAM interface 62 is a RAM controller configured to control the RAM 15 under control of the CPU 61.

The RAM 15 may store not only the lookup table 19 and the write buffer (WB) 20, but also a backward lookup table 19A. In this case, the lookup table 19 may function as a forward lookup table.

The NAND interface 63 is a NAND controller configured to control the flash memory 63 under control of the CPU 61.

The hardware engine 64 is a hardware circuit configured to execute heavy-load processing. The hardware engine 64 is configured to execute specific processing such as data compression, error detection and correction, and data shaping (scramble).

In the present embodiment, the storage device 2 has following features. Processing corresponding to each of the following features may be executed by the CPU 61 of the controller 14.

1. Multi Stream/Namespace Control

The controller 14 of the storage device 2 supports a multi stream control and a multi namespace control.

In the multi stream control, data associated with the same stream is written in the same block. The host 3 associates data having the same expected lifetime such as data in the same file, with the same stream. The lifetime of data means a period from the time when the data is produced to the time when the data is erased or updated. The data having the same expected lifetime means a data group which can be invalidated substantially simultaneously by the erasure or updating. For example, the data associated with a single file may be handled as the data having the same expected lifetime.

The controller 14 writes the data associated with a specific stream to the same block. Data unassociated with the specific stream is not written to the block to which the data associated with a specific stream is written. In other words, the controller 14 writes data associated with different streams to different blocks, respectively.

Possibility to invalidate all of the data in the block at one time can be increased by the multi stream control. This is because the data having the same lifetime can be erased or updated at one time by the host 3, with high possibility.

As to the erase blocks from which the entire data are invalidated, they can become free blocks only by erasing the erase blocks without performing any copy (date movement). As a result, the write operation using the stream can improve the WAF (Write Amplification Factor).

Multi namespace control is the technology of enabling a plurality of logical address spaces (LBA spaces) to be allocated to the storage device 2 in order to enable one storage device to be handled as if it were a plurality of drives.

The write command from the host 3 includes an ID of a specific namespace. The controller 14 determines the namespace to be accessed, based on the namespace ID included in the write command. The host 3 can thereby handle the storage device 2, without a partitioning operation for partitioning the logical address space into a plurality of spaces, as if the device were a plurality of drives. The multi namespace control can therefore reduce the TCO on the host 3 side.

2. Advanced Garbage Collection (GC) Control

In the present embodiment, the controller 14 of the storage device 2 does not completely divide the physical resource of the flash memory 16 with respect to each of streams or namespaces, but collectively manage the free block pool including the free blocks of the flash memory 16 for the streams or namespaces.

This is because, according to a method of completely dividing the physical resource for each of the streams or namespaces, even if the physical resource allocated to a certain stream or a certain namespace is not much used and remains, the physical resource cannot be used for the other streams or namespaces.

In a conventional SSD, the garbage collection is generally performed to increase the amount of the entire free space in the drive. The conventional SSD starts a garbage collection operation (i.e., drives an initiated garbage collection) to secure the free space when the amount of the free space is reduced to a value equal to or lower than a threshold value.

The advanced garbage collection (GC) control is performed to enable the host 3 to designate the stream (or namespace) in which the free space needs to be secured and further designate the amount of free space which should be secured.

When the controller 14 receives a garbage collection control command (the host initiated garbage control command or the idle garbage control command) from the host 3, the controller 14 executes a garbage collection operation for securing a designated amount of exclusive free space for the stream or namespace designated by the command. As a result, a necessary amount of exclusive physical resource can be secured for the designated stream or namespace using architecture in which the physical resource is shared among a plurality of streams or a plurality of namespaces.

In the architecture in which the physical resource is shared among a plurality of streams or a plurality of namespaces, substantially all free blocks are often consumed by the stream (or namespace) which first requests to write data. If a write operation using another stream or another namespace is started in this state, performance of the write operation is often deteriorated remarkably.

By performing the advanced garbage collection (GC) control, the host 3 can designate a stream (or namespace) in which a certain amount of data is to be written and can cause the storage device 2 to secure the designated amount of free space for the designated stream (or namespace). Therefore, even if write access to a certain stream (or namespace) is concentrated, writing at least the data of the amount corresponding to the designated amount of free space, at a stable rate, can be guaranteed.

As a result, a necessary minimum performance can be secured for each stream (or namespace) while using the architecture in which the physical resource is shared by the streams or namespaces.

3. Block Boundary Report

Block boundary report is performed to enable the host 3 to have block boundary information indicating a remaining free space of a block currently used for data write, i.e., a current input block. The host 3 can require the block boundary information of the storage device 2 as needed.

Based on the block boundary information, the host 3 can recognize how much amount of data can be further written to the current input block without crossing the block boundary. For example, if the size of the data which is to be written is larger than the remaining free space of the current input block, the host 3 may request the controller 14 of the storage device 2 to allocate a new input block. In response to this request, the controller 14 allocates a new input block. As a result, the entire data to be written can be written to the same block without crossing the block boundary.

If the entire data written across two blocks is invalidated later, fragmentation occurs in both of the two blocks due to the invalidation of the data. Writing the data across two blocks therefore increases the data copy amount in the garbage collection and thereby deteriorates WAF.

Since the function of the block boundary report enables the data to be aligned in the block boundary, the function can remarkably improve WAF.

4. Effective "Hand Shake" GC

Effective "hand shake" GC is a function of enabling the host 3 to additionally select discardable data that is considered to contribute to the improvement of WAF most.

In general, worthless data such as data that is least likely to be used is present in the storage device 2. Examples of the data include data used for a certain period alone such as a temporary file and a work file. Examples of the data used for a certain period alone include read cache data.

For example, duplication of certain data (main data) in the other storage device such as HDD is stored in the storage device 2 as read cache data. Since the original data (main data) of the read cache data is present in the other storage device, the read cache data is discardable data.

The storage device 2 may be used as a read cache area for the other storage device such as HDD. The data read from the other storage device is transmitted to the host 3 and written to the storage device 2 as the read cache data.

Frequency of receiving requests to read the read cache data becomes lowered as the time elapses, due to temporal locality of the data. The read cache data for which read request is received less frequently is worthless and discardable data.

The effective "hand shake" GC enables the data which is considered unneeded to be invalidated by the storage device 2.

By using a command (Get logical address list to be collected command) for the effective "hand shake" GC, the host 3 can require a list of the logical addresses corresponding to the valid data stored in the target block for a next garbage collection, from the controller 14 of the storage device 2.

When the controller 14 receives the command, the controller 14 specifies the target block for the next garbage collection and acquires information about the logical addresses corresponding to the valid data stored in the target block. Then, the controller 14 provides the host 3 with the data indicating the list of the logical addresses corresponding to the valid data stored in the target block for the next garbage collection.

The list of the logical addresses represents a set of data that can contribute to improve WAF by invalidation of the data. This is because the data copy amount in the next garbage collection can be efficiently reduced by invalidating the data in the set of data.

The host 3 can designate the discardable data that is considered to most contribute to improve WAF, easily and positively, by merely additionally selecting from the list of the logical addresses the data which may be discarded.

5. In-Drive Tiering Control

In-drive tiering control is a function of enabling a tier (first tier) corresponding to a storage device having a feature of writing or reading data at a high speed and a tier (second tier) corresponding to another storage device having a feature of storing a large amount of data at a low cost, to exist together in the same SSD.

In the first tier, a 1-bit/cell writing method (SLC writing method) of writing 1-bit data to each memory cell is employed.

In the second tier, a writing method of writing data of two or more bits to each memory cell is employed. The writing method employed in the second tier may be a 2-bit/cell writing method (MLC writing method), a 3-bit/cell writing method (TLC writing method), or a 4-bit/cell writing method (QLC writing method).

The host 3 can designate a tier attribute which should be used to write the data, by using a command for In-drive tiering control (the extended write command or the extended namespace (stream) control command).

For example, when data is to be written at a high speed, the host 3 may designate the tier attribute corresponding to the 1-bit/cell writing method (SLC writing method). In contrast, when data is to be stored at a low cost, the host 3 may designate the tier attribute corresponding to the 2-bit/cell writing method (MLC writing method), the 3-bit/cell writing method (TLC writing method), or the 4-bit/cell writing method (QLC writing method). The tier attribute which should be used may be designated in units of the write data. Alternatively, the tier attribute which should be used may be designated in units of the stream or name space.

The controller 14 of the storage device 2 writes the data to the flash memory 16 by employing the writing method designated by the tier attribute.

6. NAND Program Control

NAND program control is also one of functions for the In-drive tiering control.

The host 3 can designate a tier attribute giving a higher priority to the write speed than to data retention or a tier attribute giving a higher priority to the data retention than to the write speed, by using a command for the NAND program control (Extended write command, etc.)

For example, when data (hot) is to be written at a high speed and a high update frequency, the host 3 may designate the tier attribute giving a higher priority to the write speed than to the data retention. In contrast, when data (cold) which has a low update frequency is to be stored for a long period of time, the host 3 may designate the tier attribute giving a higher priority to the data retention than to the write speed. The tier attribute which should be used may be designated in units of the write data. Alternatively, the tier attribute which should be used may be designated in units of the stream or namespace.

The controller 14 of the storage device 2 writes the data to the flash memory 16 by employing the writing method giving a higher priority to the write speed than to the data retention or the writing method giving a higher priority to the data retention than to the write speed. Change of the writing method is executed by tuning the number of the program-verify steps which should be executed to program the write data to the flash memory 16.

In addition, the host 3 can designate the tier attribute giving a higher priority to data reliability than to a read speed or the tier attribute giving a higher priority to the read speed than to the data reliability, using a command for the NAND program control (Extended write command, etc.)

For example, when data is required to have high reliability, the host 3 may designate a tier attribute giving a higher priority to the data reliability than to the read speed. In contrast, when data is required to have a high read speed rather than high reliability, such as data (cache data) having the original data stored in the other storage, the host 3 may designate the tier attribute giving a higher priority to the read speed than to the data reliability. The tier attribute which should be used may be designated in units of the write data. Alternatively, the tier attribute which should be used may be designated in units of the stream or namespace.

The controller 14 of the storage device 2 writes the data to the flash memory 16 by employing the writing method giving a higher priority to the data reliability than to the read speed or the writing method giving a higher priority to the read speed than to the data reliability. Change of the writing method is executed by tuning a ratio between reliability assurance capability of ECC which should be added to the write data and reliability assurance capability of the code for data shaping which should be added to the write data.

7. QoS in Namespace Level

In the present embodiment, the controller 14 of the storage device 2 operates to share the free block pool including the free blocks of the flash memory 16 among a plurality of streams or a plurality of namespaces.

QoS in namespace level is a function of enabling the host 3 to designate the namespace or stream to which a minimum amount of exclusive free space should be allocated and further enabling the host 3 to designate the amount of free space which should be allocated.

When the controller 14 receives a command for the QoS in namespace level (the extended namespace control command or the extended stream control command) from the host 3, the controller 14 allocates a designated amount of exclusive free space for the stream or namespace designated by the command. As a result, a minimum amount of exclusive physical resource can be allocated to each stream or namespace while using the architecture in which the physical resource is shared by the streams or namespaces.

The host 3 can allocate a minimum amount of physical resource exclusive for each stream or namespace by using the function of QoS in namespace level.

Similarly to the function of the advanced garbage collection (GC) control, the function of QoS in namespace level can assure a necessary minimum performance for each stream (or each namespace) while using the architecture in which the physical resource is shared by the streams or namespaces.

The function of the advanced garbage collection (GC) control can be used in combination with the function of QoS in namespace level.

For example, the host 3 can assure a minimum amount of exclusive free space to each namespace or stream by using the function of QoS in namespace level, and can further increase the amount of exclusive free space to a specific namespace or stream at an idle time by using the function of the advanced garbage collection (GC) control.

8. Advanced Multi Stream Control

Advanced multi stream control is a function of enabling a plurality of namespaces and a plurality of streams to be present together in the storage device 2. The logical address space of the flash memory 16 is divided into a plurality of logical address spaces corresponding to a plurality of namespaces. The controller 14 manages each mapping between the logical addresses (LBAs) and the physical addresses in units of namespaces, by using a plurality of lookup tables corresponding to a plurality of namespaces. The physical resource of the flash memory 16 is divided into a plurality of streams.

Each stream is associated with at least one namespace. A certain stream may be associated with a specific namespace, or the other stream may be associated with several namespaces. For example, when a first stream is associated with both a first namespace and a second namespace, and a second stream is associated with the first namespace alone, the free space allocated to the first stream is shared by the first namespace and the second namespace, and the free space allocated to the second stream is exclusive for the first namespace.

Advanced garbage collection (GC) control, QoS in namespace level, etc. can also be applied to SSD in which both a plurality of namespaces and a plurality of streams are provided.

In addition, the function of In-drive tiering control may also be applied to SSD in which both a plurality of namespaces and a plurality of streams are provided.

9. Data Compression Control

Data compression control is a function of enabling the host 3 to control a data compression function in the storage device 2. The data compression function is a function of compressing the write data in the storage device 2 and writing the compressed data to a block of the flash memory 16. The amount of the physical resource necessary for storing data can be remarkably reduced by using the data compression function.

In contrast, when the data compression function is used, the write speed and the read speed are lowered. In general, hardware for executing the data compression function consumes comparatively much power. For this reason, when the data compression function is used, the power consumption of the storage device 2 is also increased.

The degree of an effect of the data compression function depends on the type of the write data. For example, the data compression function for the write data encrypted by the host 3 or the write data which has been compressed by the host 3 has a small effect.

The function of Data compression control can be therefore employed as one of functions for the In-drive tiering control.

The host 3 can designate either a tier attribute of compressing data and writing the compressed data to the block of the flash memory 16 or a tier attribute of writing the write data to the block without compressing the data, using a command for Data compression control (Extended write command, Extended dataset management command, etc.)

For example, when data is required to be written or read at a high speed, the host 3 may designate the tier attribute of writing the write data without compressing the data. In contrast, when data is required to be stored at a low cost, the host 3 may designate the tier attribute of compressing the data.

Alternatively, when the encrypted data or already compressed data is written, the host 3 may designate the tier attribute of writing the write data without compressing the data. In contrast, when the data which is not encrypted or the data which is not compressed is written, the host 3 may designate the tier attribute of compressing the data.

The function of Data compression control enables the host 3 to designate yet another tier attribute of writing the write data to the block without compressing the data and of compressing the data at the garbage collection of the block.

When data is required to be written at a high speed and at a low cost, the host 3 may designate the tier attribute of writing the write data to the block without compressing the data and of compressing the data at the garbage collection of the block.

The controller 14 of the storage device 2 writes the data to the flash memory 16 by employing either the writing method of compressing the data and writing the compressed data to the block of the flash memory 16, the writing method of writing the write data to the block without compressing the write data, or the writing method of writing the write data to the block without compressing the write data and of compressing the data at the garbage collection of the block.

10. Data Lifetime Timer Control

The original data of data such as read cache data and data replication is stored in the other storage as described above. In addition, data such as a temporary file, a work file, and temporary data is used for a certain period alone. These data may be therefore discarded after a certain period of time elapses.

The host 3 can notify the storage device 2 of a data lifetime using a command for Data lifetime timer control (the extended write command, the extended open stream command, or the like).

The controller 14 of the storage device 2 writes the data to a block in the flash memory 16, based on the write command from the host 3. In this case, the controller 14 may store, for example, a first time stamp when the data is written, and a lifetime of the data as designated by the host 3 in, for example, a backward lookup table 19A. Alternatively, the controller 14 may calculate a sum of the first time stamp at the data write time and the lifetime, and store the sum value in, for example, the backward lookup table 19A.

During the garbage collection of the block, the controller 14 executes a garbage collection operation for collecting only valid data of which sum of the first time stamp and the lifetime is greater than the current time stamp, from the block. The data copy amount at the garbage collection can be thereby reduced.

The functions of the advanced garbage collection (GC) control, Block boundary report, the effective "hand shake" GC, In-drive tiering control, NAND program control, QoS in namespace level, Advanced multi stream control, Data compression control, and Data lifetime timer control may be used independently or arbitrarily used in combination.

<1. Multi Stream/Namespace Control>

FIG. 9 shows a stream write operation performed by the storage device 2.

In the storage device 2, the same number of blocks as the number of active streams is prepared besides a block for data unassociated with any streams.

It is assumed here that a block B0 is allocated as an input block to which data unassociated with any streams (non-stream data) should be written, a block B1 is allocated as an input block to which data corresponding to stream #0 of stream ID=0 should be written, and a block B2 is allocated as an input block to which data corresponding to stream #1 of stream ID=1 should be written.

Data #A1, data #A2, and data #A3 associated with the stream #0 are written to the block B1. If the block B1 is filled with data, a new input block for the stream #0 is allocated.

The data B1 unassociated with any streams is written to the block B0. If the block B0 is filled with data, a new input block for non-stream data is allocated.

Data #C1 and data #C2 associated with the stream #1 are written to the block B2. If the block B2 is filled with data, a new input block for the stream #1 is allocated.

FIG. 10 shows a namespace management performed by the storage device 2.

It is assumed here that a plurality of namespaces NS#0 to NS#n is created. 0 to E0 logical address space (LBA space) A0 is allocated to namespace NS#0. 0 to E1 logical address space (LBA space) A1 is allocated to namespace NS#1. Similarly, 0 to En logical address space (LBA space) An is allocated to namespace NS#n.

In the present embodiment, the lookup table LUT is divided for each namespace. In other words, n lookup tables LUT#0 to LUT#n corresponding to the namespaces NS#0 to NS#n, respectively, are managed by the controller 14 of the storage device 2.

The lookup table LUT#0 manages mapping between the LBA space A0 of the namespace NS#0 and the physical addresses of the flash memory 16. The lookup table LUT#1 manages mapping between the LBA space A1 of the namespace NS#1 and the physical addresses of the flash memory 16. The lookup table LUT#n manages mapping between the LBA space An of the namespace NS#n and the physical addresses of the flash memory 16.

The controller 14 can execute the garbage collection operation independently for each namespace, using the lookup tables LUT#0 to LUT#n, respectively.

In the present embodiment, the physical resource of the flash memory 16 is shared by the namespaces NS#0 to NS#n, but a necessary minimum amount of exclusive physical resource can be allocated to each namespace. In this case, management data 100 may include information indicating mapping between the namespaces and the minimum amounts of exclusive physical resources (at least one block) allocated to the namespaces.

In the present embodiment, since the amount predetermined or designated by the host 3, of the exclusive physical resource can be allocated to each of the namespaces NS#0 to NS#n, a substantially entire physical resource is not consumed by a certain namespace, and writing the data corresponding to the namespaces NS#0 to NS#n at a stable rate can be assured.

In the present embodiment, since n lookup tables LUT#0 to LUT#n corresponding to the namespaces NS#0 to NS#n, respectively, are managed by the controller 14 of the storage device 2, the garbage collection can be executed efficiently, independently for each of the namespaces NS#0 to NS#n.

In the present embodiment, the free block created by the garbage collection can be shared by the namespaces NS#0 to NS#n.

Figure 11:
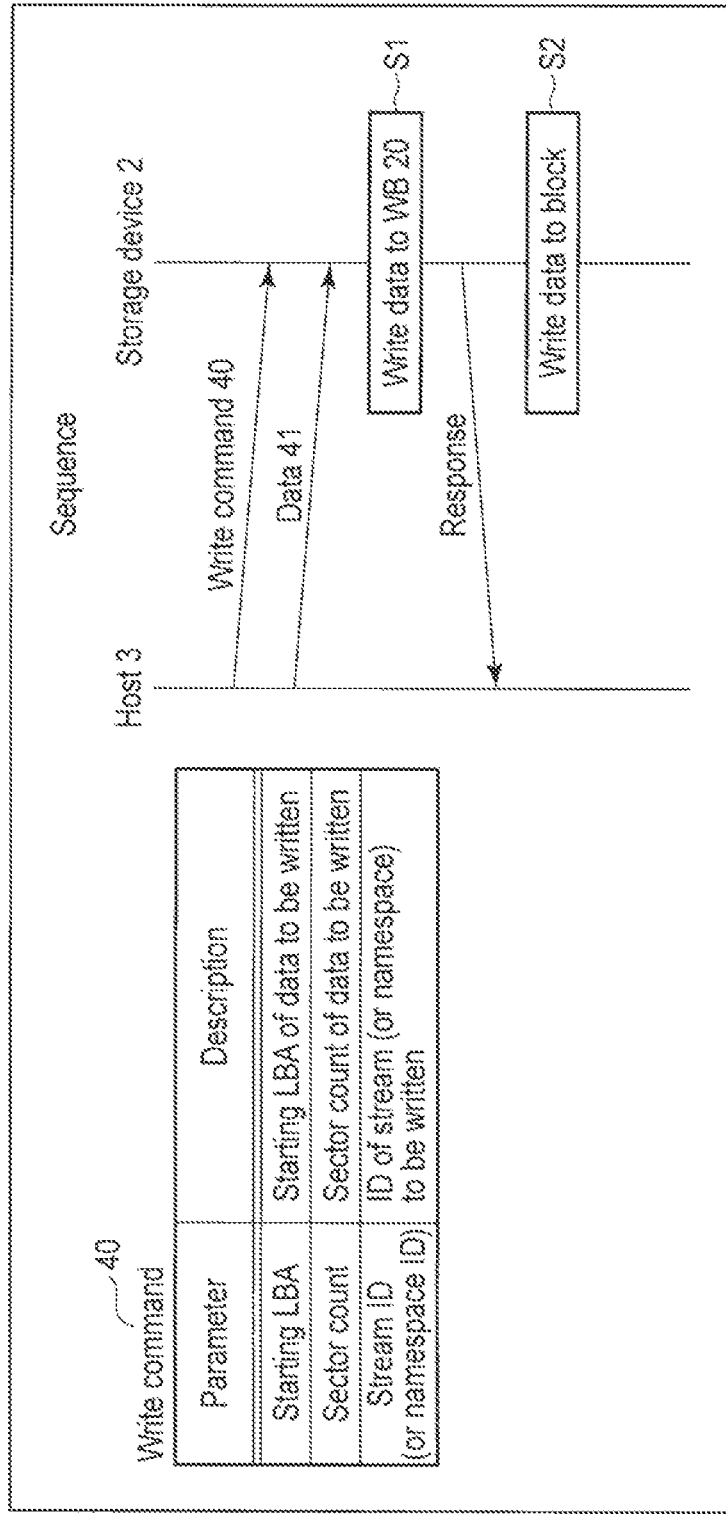
FIG. 11 illustrates data structure of a write command sent to the storage device and a processing sequence of the write command.

FIG. 11 shows a structure of a write command 40 and a processing sequence of the write operation.

The write command 40 includes a parameter indicating a starting LBA of the write data and a parameter indicating a sector count (transfer length) of the write data. The write command 40 may further include a parameter indicating a stream ID. The stream ID indicates an ID of the stream associated with the write data designated by the starting LBA and the sector count of the write command 40. A write command 40 which does not include the stream ID or includes a stream ID indicating a predetermined invalid valid may be handled as a normal write command that requires write of non-stream data.

In an environment using namespaces, the write command 40 may include a parameter indicating a namespace ID instead of the stream ID.

The host 3 transmits the write command 40 to the storage device 2 via the interface 10, in the write operation. The host 3 transmits write data 41 to the storage device 2 via the interface 10.

The controller 14 of the storage device 2 writes the write data 41 to a write buffer (WB) 20 (step S1), and sends to the host 3 a notice of command completion. After that, the controller 14 writes the write data 41 to a block (input block) in the flash memory 16 (step S2). The controller 14 updates the lookup table 19 and maps the LBA of the write data to the physical address of the physical storage location at which the write data has been written.

FIG. 12 shows the architecture of the storage device 2 for the write operation.

The controller 14 manages a plurality of input blocks 42, an active block pool 43 and a free block pool 44. The physical block 36 explained with reference to FIG. 6 belongs to any one of the input blocks 42, the active block pool 43, the free block pool 44, a bad block pool 50, and a pending input block pool 51.

The input blocks 42 are blocks in which data can be written even if the controller 14 does not erase the blocks. In other words, each input block 42 includes a page which can be used without erasing the block. The input blocks 42 are blocks in a non-stream block pool 47 and a plurality of stream block pools 48.

The input block 42 in the non-stream block pool 47 is a block in which the data unassociated with any streams (non-stream data) should be written. The input block 42 in the stream #0 block pool 48 is a block in which the data associated with stream #0 should be written. The input block 42 in the stream #n block pool 48 is a block in which the data associated with stream #n should be written.

The active block pool 43 includes blocks filled with data. The free block pool 44 includes free blocks that do not store any valid data. The bad block pool 50 includes bad blocks that cannot be used any more. The pending input block pool 51 includes blocks (pended blocks) which are not temporarily used as the input blocks.

The lookup table 19 manages physical block addresses of the respective input blocks 42, active block pool 43, free block pool 44, bad block pool 50, and pending input block pool 51.

If no stream ID is designated by the write command 40, the controller 14 writes the data 41 to the input block 42 in the non-stream block pool 47. If the stream ID=0 is designated by the write command 40, the controller 14 writes the data 41 to the input block 42 in the stream #0 block pool 48. If stream ID=n is designated by the write command 40, the controller 14 writes the data 41 to the input block 42 in the stream #n block pool 48.

When any one of the input blocks 42 is filled with data, the controller 14 moves the input block 42 to the active block pool 43. In other words, a state of the input block 42 is changed to the active block, and the controller 14 manages the input block 42 as the active block. When there is no available input block in any of the non-stream block pool 47 or the plurality of stream block pools 48, the controller 14 allocates a new input block 42 from the free block pool 44. Alternatively, the controller 14 may execute the garbage collection operation of handling a target active block selected from the active block pool 43 as a free block and allocate the free block as a new input block 42.

More specifically, when the controller 14 writes the data from the write buffer (WB) 20 to the flash memory 16, the controller 14 looks up the physical address of pages in the input block 42 to which the data should be written, by referring to the lookup table (LUT) 19. When there are no available input blocks 42, the controller 14 allocates the new input block 42 from the free block pool 44. When there are no pages which can be used without erasing the input block 42 in the input block 42, the controller 14 moves the input block 42 to the active block pool 43. When a sufficient amount of free blocks are not present in the free block pool 44, the controller 14 executes the garbage collection (GC) operation to create free blocks from the blocks in the active block pool 43.

Various methods can be used as the method of selecting the target block (target active block) of the garbage collection from the active block pool 43.

For example, if the active block pool 43 includes a plurality of stages similarly to a FIFO buffer, the controller 14 may select an active block on a final stage of the active block pool 43 as the target block. This is because the active block on the final stage generally includes a large amount of invalid data and the valid data rate of the active block is low. The data copy amount at the garbage collection can be thereby reduced.

Alternatively, the controller 14 may select an active block having the largest invalid data rate from the active block pool 43, as the target block, by referring to the lookup table 19.

The number of target blocks for the garbage collection selected from the active block pool 43 is not necessarily one, but several active blocks may be selected as the target blocks.

FIG. 13 shows an open stream command sent to the storage device 2 and a processing sequence of the command.

The open stream command 45 is a command to open a new stream. When the host 3 transmits the open stream command 45 to the storage device 2, the controller 14 of the storage device 2 executes processing to open a new stream. In this case, the controller 14 allocates a new stream ID different from stream IDs of currently opened streams, to the newly opened stream (step S3). The controller 14 allocates an input block for the newly opened stream (step S4). Then, the controller 14 transmits return data 49 including the stream ID of the newly opened stream to the host 3.

Figure 14:
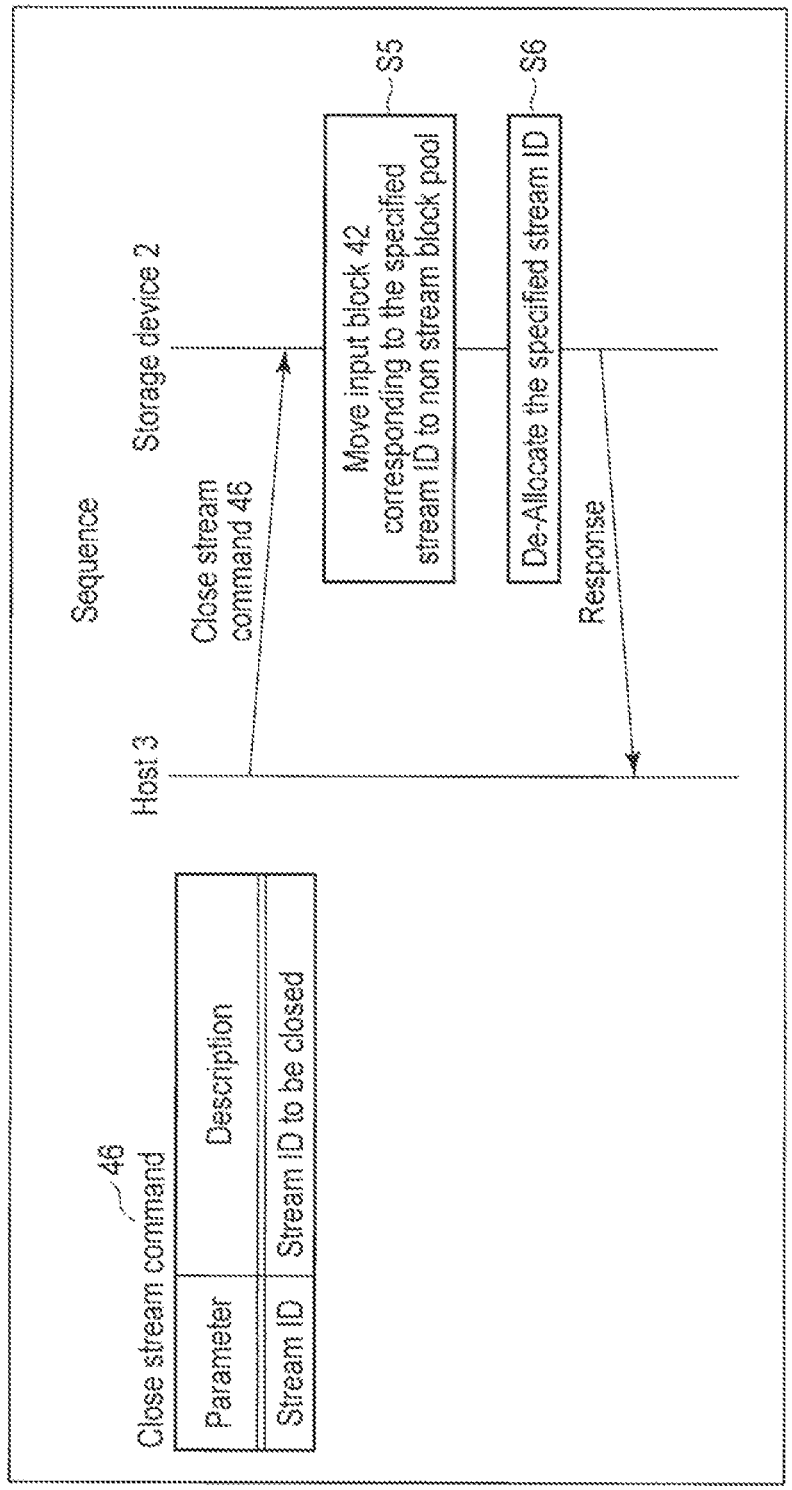
FIG. 14 illustrates data structure of a close stream command sent to the storage device and a processing sequence of the command.

FIG. 14 shows a close stream command sent to the storage device 2 and a processing sequence of the command.

The close stream command 46 is a command to close the opened stream. The close stream command 46 includes a parameter indicating a stream ID of a stream which should be closed. When the host 3 transmits the close stream command 46 to the storage device 2, the controller 14 of the storage device 2 moves an input block 42 corresponding to the stream ID designated by the close stream command 46, to the non-stream block pool 47 (step S5). The controller 14 de-allocates the designated stream ID (step S6), and sends to the host 3 a notice of command completion.

<2. Advanced Garbage Collection (GC) Control>

Next, the advanced garbage collection (GC) control will be described in detail with reference to FIG. 15 to FIG. 19.

FIG. 15 shows the architecture of the storage device 2 that performs the advanced garbage collection (GC) control.

In the present embodiment, a reserved free space for each of streams may be preliminarily allocated. A reserved free space for a certain stream is a minimum amount of free space exclusive for the stream. As for a stream which does not need the reserved free space, the amount of the reserved free space corresponding to the stream may be zero.

The free block pool 44 includes a plurality of reserved free spaces corresponding to a plurality of streams. A reserved free space 66 for stream #0 is a minimum amount of free space exclusive for the stream #0. A reserved free space 66 for stream #n is a minimum amount of free space exclusive for the stream #n.

The function of the advanced garbage collection (GC) control secures the designated amount of free space exclusive for the stream designated by the host 3. The host 3 can increase the amount of the reserved free space of a specific stream by a desired amount as needed, by using the function of the advanced garbage collection (GC) control.

The advanced garbage collection (GC) control can also be employed in not only an environment supporting the streams, but also an environment supporting the namespaces and an environment supporting mixture of the namespaces and the streams.

For example, in the environment supporting the namespaces, as shown in FIG. 16, the free block pool 44 may include a reserved free space 67 for NS #0, a reserved free space 67 for NS #1, and a reserved free space 67 for NS #n. The reserved free space 67 for NS #0 is an exclusive free space allocated to the namespace NS #0. The reserved free space 67 for NS #1 is an exclusive free space allocated to the namespace NS #1. The reserved free space 67 for NS #n is an exclusive free space allocated to the namespace NS #n.

The function of the advanced garbage collection (GC) control secures the amount of free space exclusive for the namespace designated by the host 3. The host 3 can increase the amount of the reserved free space of a specific namespace by a desired amount as needed, by employing the advanced garbage collection (GC) control.

In the environment supporting the namespaces, the input blocks 42 may be divided into a plurality of namespace block pools 72 corresponding to a plurality of namespaces. Alternatively, the identical input block 42 may be shared by at least two specific namespaces.

Figure 17:
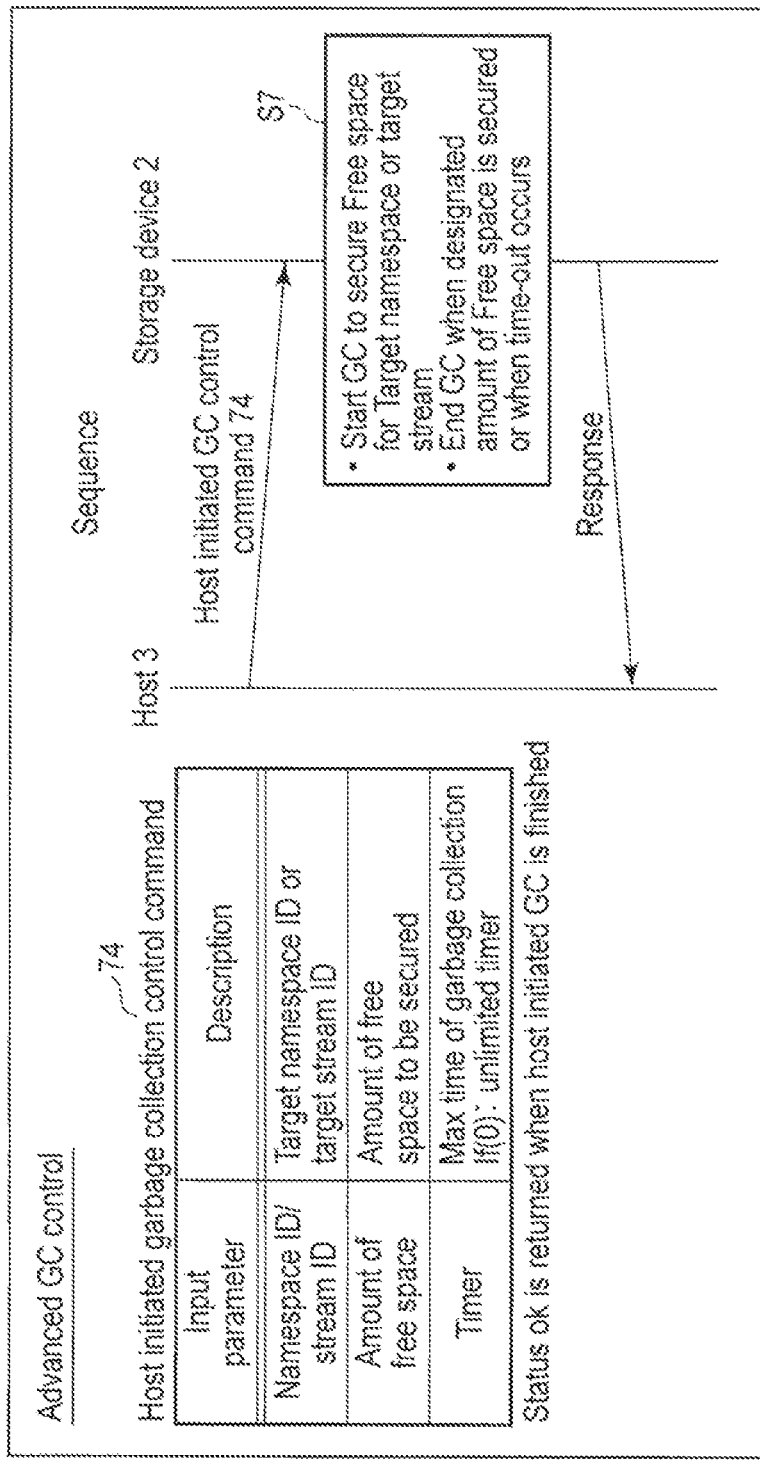
FIG. 17 illustrates data structure of a host initiated garbage collection control command sent to the storage device and a processing sequence of the command.

FIG. 17 shows a host-initiated garbage collection control command for the advanced garbage collection (GC) control and a processing sequence of the command.

The host-initiated garbage collection control command 74 is a garbage collection control command used for the advanced garbage collection (GC) control. The host-initiated garbage collection control command 74 requires the storage device 2 to start the garbage collection operation.

The host-initiated garbage collection control command 74 includes input parameters listed below.

(1) Namespace ID or Stream ID
(2) Amount of free space
(3) Timer

Namespace ID or Stream ID indicates a target namespace for which the free space should be secured or a target stream for which the free space should be secured.

Amount of free space indicates the amount of free space which should be secured.

Timer indicates a maximum time of the garbage collection operation. The garbage collection operation is ended at an earlier time of the time when the designated amount of free space is secured and the time when the maximum time elapses. If Timer is zero, the maximum time of the garbage collection operation is not limited.

If the host 3 desires to write a predetermined amount of data corresponding to a certain namespace or a certain stream at a preferable latency, the host 3 transmits the host-initiated garbage collection control command 74 to the storage device 2. In response to the host-initiated garbage collection control command 74 from the host 3, the controller 14 of the storage device 2 executes the garbage collection operation to secure a designated amount of exclusive free space for the target namespace or the target stream (step S7). The controller 14 ends the garbage collection operation, at an earlier time of the time when the designated amount of free space is secured and the time when the maximum time elapses.

In the present embodiment, the designated amount of free space exclusive for the designated namespace or the designated stream is secured. Therefore, a necessary amount of exclusive physical resource can be secured for the designated stream or the designated namespace while using architecture in which the physical resource is shared by a plurality of streams or a plurality of namespaces.

For example, if writing data of 500 MB to a certain stream is scheduled, the host 3 transmits to the storage device 2 the host-initiated garbage collection control command 74 including a parameter indicating the ID of the stream and a parameter indicating the amount (500 MB) of the free space which should be secured for the stream. Writing the data of 500 MB associated with the certain stream to the flash memory 16 at a preferable latency can be thereby secured.

FIG. 18 shows an idle garbage collection control command for the advanced garbage collection (GC) control and a processing sequence of the command.

The idle garbage collection control command 75 is a garbage collection control command used for the advanced garbage collection (GC) control. The idle garbage collection control command 75 causes the storage device 2 to execute the garbage collection operation at the idle time.

The idle garbage collection control command 75 includes input parameters listed below.

(1) ENIDGC
(2) Namespace ID or Stream ID
(3) Amount of free space
(4) Start time
(5) Timer ENIDGC indicates an enabled or disabled state of the idle garbage collection. ENIDGC of value 0b indicates that the idle garbage collection is disabled, while ENIDGC of value 1b indicates that the idle garbage collection is enabled.

When the storage device 2 is executing the idle garbage collection operation, if the host 3 transmits a command such as the write command or the read command to the storage device 2, conflict between the idle garbage collection operation and the command processing occurs. To stop the idle garbage collection operation, the time of several milliseconds is often required. For this reason, start of the processing of the command from the host 3 may be delayed.

In the present embodiment, the host 3 can require enablement or disablement of the idle garbage collection using the input parameter, ENIDGC. Therefore, if the host 3 is scheduled to transmit a command such as the write command or the read command to the storage device 2, the host 3 can require disablement of the idle garbage collection as needed.

As a result, performance deterioration caused by the delay of start of command processing can be suppressed.

Namespace ID or Stream ID indicates a target namespace for which the free space should be secured or a target stream for which the free space should be secured.

Amount of free space indicates the amount of free space which should be secured.

Start time indicates conditions for starting the idle garbage collection. When Start time (ms) elapses after completion of processing the last command (or reception of the last command), the controller 14 of the storage 2 starts the idle garbage collection operation. If the storage device 2 receives the command from the host 3 before the Start time (ms) elapses after the completion of processing the last command (or reception of the last command), the controller 14 does not start the idle garbage collection operation. The host 3 can appropriately adjust the conditions for starting the idle garbage collection using the input parameter, Start time.

Timer indicates a maximum time of the idle garbage collection operation to enable processing of a next command from the host 3 to be executed without delay. The idle garbage collection operation is ended earlier than the time when the designated amount of free space is secured and the time when the maximum time elapses. If Timer is zero, maximum time of the idle garbage collection operation is not limited.

If the host 3 desires to execute writing a predetermined amount of data corresponding to a certain namespace or a certain stream at a preferable latency, the host 3 transmits the idle garbage collection control command 75 to the storage device 2. In response to the idle garbage collection control command 75 from the host 3, the controller 14 of the storage device 2 configures the idle garbage collection, based on the input parameters of the idle garbage collection control command 75 (step S8), and sends to the host 3 a notice of the command completion.

FIG. 19 shows steps of the idle garbage collection operation.

The controller 14 of the storage device 2 determines whether the idle garbage collection is enabled or disabled with respect to each stream or namespace designated by the idle garbage collection control command 75 (step S11).

If the Idle garbage collection is enabled (YES in step S11), the controller 14 determines whether or not the time indicated as Start time has elapsed, after the completion of processing the last command (or reception of the last command) (steps S12 and S13).

When the time indicated as Start time elapses after the completion of processing the last command (or reception of the last command), the controller 14 starts the idle garbage collection operation to secure the designated amount of exclusive free space for the designated stream or namespace (step S14). The controller 14 ends the garbage collection operation, at an earlier time of the time when the designated amount of free space is secured and the time when the maximum time elapses (steps S14 to S16).

Thus, in the present embodiment, when the controller 14 receives the garbage collection control command (host-initiated garbage control command or idle garbage control command) from the host 3, the controller 14 executes the garbage collection operation to secure the designated amount of exclusive free space for the stream or namespace designated by the command. As a result, a necessary amount of exclusive physical resource can be secured for the specific stream or namespace in the architecture in which the physical resource is shared by a plurality of streams or a plurality of namespaces. Writing the desired amount of data for each stream (or namespace) to the flash memory 16 at a stable latency can be thereby secured.

<3. Block Boundary Report>

Next, details of the block boundary report will be described with reference to FIG. 20 to FIG. 35.

FIG. 20 shows a summary of a function of the block boundary report.

The function of the block boundary report provides the host 3 with block boundary information indicating a remaining free space of the input block (i.e., an amount of unwritten pages in the input block) as described above. The host 3 transmits to the storage device 2 a command (get block boundary info command) to obtain block boundary information of a current input block 42 in a non-stream block pool 47 or block boundary information of a current input block in a specific stream block pool 48.

If the block boundary information of the stream ID=0 is requested by the get block boundary info command, the controller 14 of the storage device 2 sends to the host 3 an amount of unwritten pages in the current input block 42 in the stream #0 block pool 48.

If the non-stream block boundary information is requested by the get block boundary info command, the controller 14 of the storage device 2 sends to the host 3 an amount of unwritten pages in the current input block 42 in the non-stream block pool 47.

Based on the block boundary information, the host 3 can recognize how much amount of data can be further written to the current input block without crossing the block boundary. For example, if the size of the data to be written is larger than the remaining free space of the current input block, the host 3 may request the controller 14 of the storage device 2 to allocate a new input block. In response to this request, the controller 14 allocates a free block as a new input block. The entire data to be written can be thereby written to the new input block.

Figure 21:
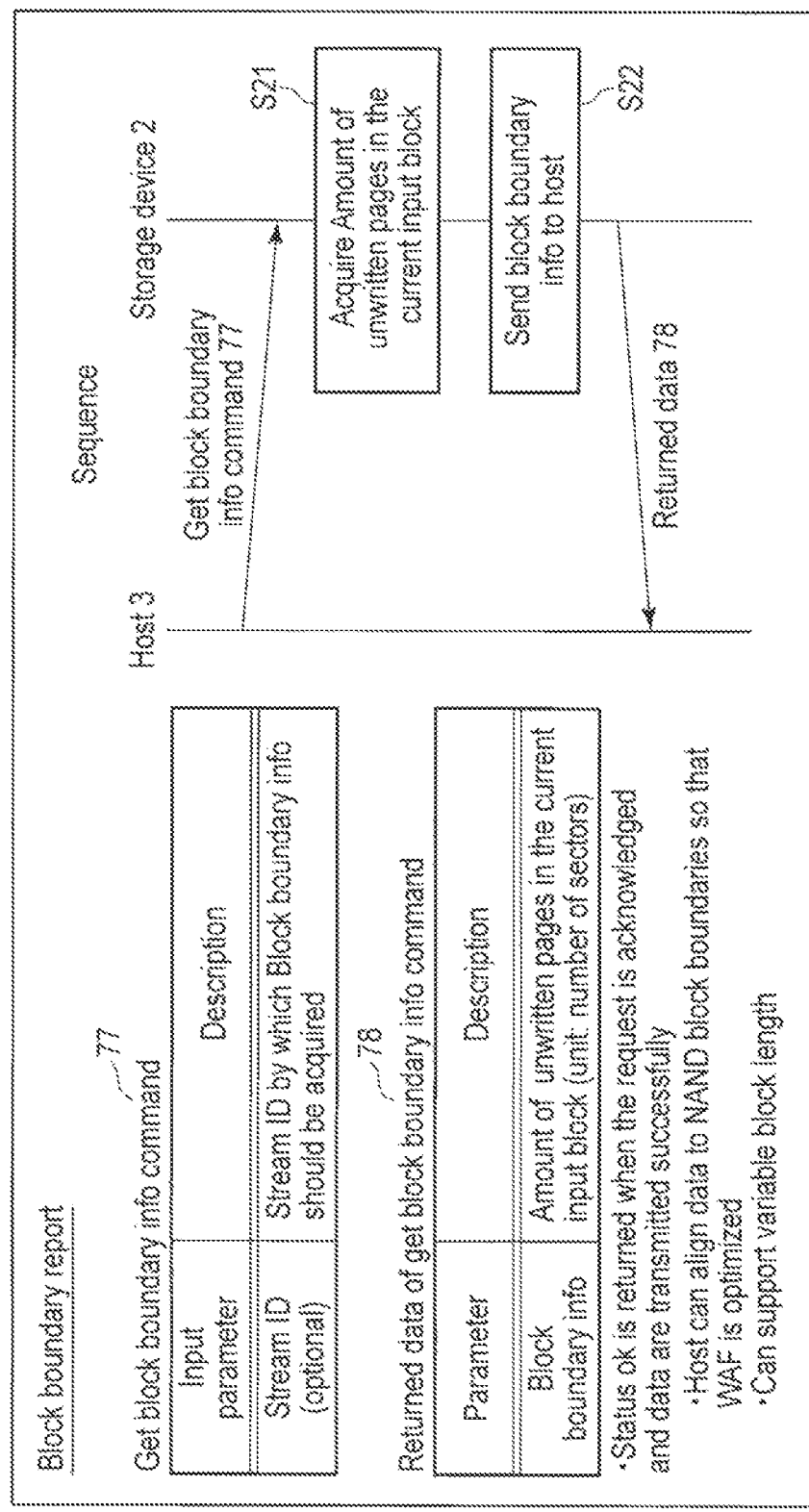
FIG. 21 illustrates data structure of a get block boundary info command sent to the storage device and a return data of the get block boundary info command, and a processing sequence of the get block boundary info command.

FIG. 21 shows a get block boundary info command for the block boundary report, return data returned in response to the get block boundary info command from the storage device of the present embodiment, and a processing sequence of the get block boundary info command.

A get block boundary info command 77 is a command used for the block boundary report. The get block boundary info command 77 requests an amount of unwritten pages in a block to which the data is to be written, i.e., a current input block.

The get block boundary info command 77 includes the following input parameter.

(1) Stream ID (Optional)

Stream ID indicates a Stream ID for which the block boundary information should be acquired. This input parameter is optional, and the get block boundary info command 77 may not include this input parameter.

Return data 78 returned in response to the get block boundary info command includes the following parameter.

(1) Block Boundary Info

Block boundary info indicates an amount of unwritten pages in the current input block. The unit of the amount of unwritten pages may be the number of sectors.

The host 3 transmits the get block boundary info command 77 to the storage device 2. In response to the get block boundary info command 77 from the host 3, the controller 14 of the storage device 2 determines the amount of unwritten pages in the block to which the data is to be written, i.e., the current input block by referring to the lookup table 19 (step S21). The controller 14 transmits the return data 78 indicating the amount of unwritten pages in the current input block to the host 3 (step S22).

FIG. 22 shows a state in which the data is aligned along a block boundary, in the storage device 2.

Since the size of the write data is unrelated to the size of the block, the data is often written across the block boundary, conventionally, as shown in an upper row of FIG. 22. For example, data #2 is written across block 0 and block 1, and data #4 is written across block 1 and block 2.

If the data #2 written across two blocks 0 and 1 is invalidated later, fragmentation occurs in both of the two blocks 0 and 1 due to the invalidation of the data #2. In this case, the two blocks 0 and 1 become targets of the garbage collection due to invalidation of the data #2. Writing the data across two blocks therefore increases the data copy amount in the garbage collection and thereby deteriorates WAF.

In the present embodiment, the host 3 can determine whether or not the size of the data to be written is greater than the remaining free space of the current input block, based on the block boundary information. If the size of the data to be written is smaller than or equal to the remaining free space of the current input block, the host 3 transmits to the storage device 2 a write command requiring writing of the data to be written. In contrast, if the size of the data to be written is greater than the remaining free space of the current input block, the host 3 can transmit the write command to the storage device 2 after requesting allocation of a (new) input block from the storage device 2. As a result, the WAF can be improved since the data can be aligned along the block boundary as shown in a middle row of FIG. 22.

In the current SSD, a variable-length block becomes supported. The function of the Block boundary info of the present embodiment can align the data along the block boundary of the variable-length block as shown at a lower row of FIG. 22.

FIG. 23 shows a series of processing sequences executed by the storage device 2 and the host 3.

It is assumed here that the host 3 sends the get block boundary info command 77 for stream #1.

The host 3 transmits the get block boundary info command 77 designating the stream ID=1 to the storage device 2. The controller 14 of the storage device 2 determines the amount of unwritten pages in the block to which the data associated with the stream #1 should be written, i.e., the current input block 42 (step S31). The controller 14 transmits the return data 78 indicating the amount of unwritten pages in the current input block to the host 3 (step S32). If the size of the write data which should be written to the block for the stream #1 is greater than the amount of unwritten pages, the host 3 transmits to the storage device 2 a command (select next input block command or pend current input block command) requiring allocation of a new input block for the stream #1 (step S33).

In response to this request, the controller 14 allocates a free block as a new input block for the stream #1 (step S34).

After that, the host 3 transmits the write command 40 designating the stream ID=1 to the storage device 2 and also transmits the write data 41 to the storage device 2.

FIG. 24 shows an architecture of the storage device 2 for the select next input block command.

When the host 3 transmits the select next input block command to designate the stream ID of the selected stream to the storage device 2, the controller 14 moves a current input block corresponding to the selected stream to a pending input block pool 51 and manages the current input block as the pended input block. The controller 14 selects a free block from the free block pool 44, and allocates the selected free block as a new input block (also called a next input block) of the selected stream.

The pended input block in the pending input block pool 51 is reused as an input block of the other stream or an input block to which data unassociated with any streams should be written.

In general, as the number of streams to be supported increases, the number of available blocks is reduced and excessive over-provisioning may occur. The amount of allocated input block is obtained by the number of active streams multiplied by the average block size.

In the present embodiment, since the pended input block in the pending input block pool 51 is reused as an input block of the other stream or the input block to which data unassociated with any streams should be written, excessive over-provisioning can be prevented.

Figure 25:
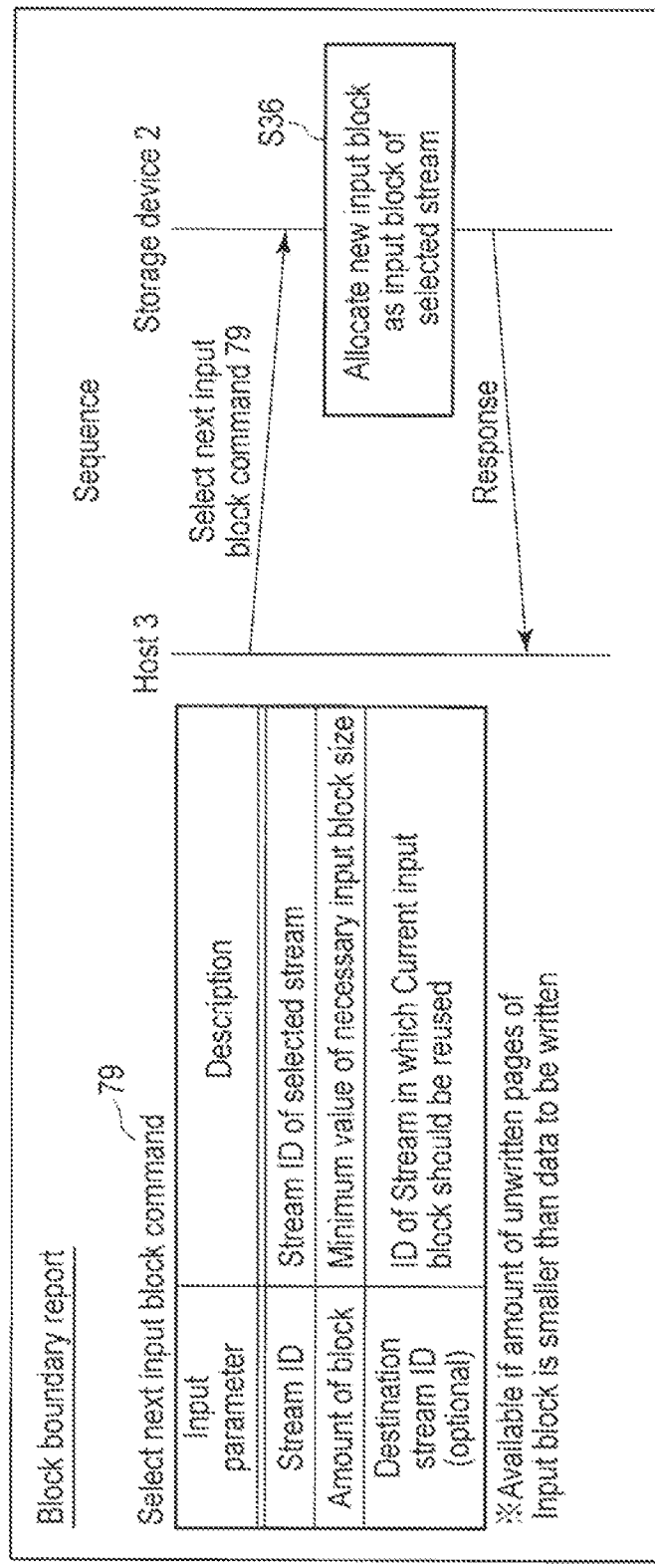
FIG. 25 illustrates data structure of the select next input block command sent to the storage device and a processing sequence of the command.

FIG. 25 shows a select next input block command and a processing sequence of the command.

The select next input block command 79 includes input parameters listed below.

(1) Stream ID
(2) Amount of block
(3) Destination Stream ID (optional)

Stream ID indicates a Stream ID of the selected stream.

Amount of block indicates a minimum value of the size of the new input block.

Destination Stream ID indicates an ID of a stream in which the current input block should be reused.

If the size of the data to be written is greater than the remaining capacity of the current input block corresponding to the selected stream, the host 3 transmits the select next input block command 79 including the Stream ID of the selected stream to the storage device 2. The controller 14 of the storage device 2 selects a free block having a size greater than the size designated by the input parameter of the Amount of block in the select next input block command 79, from the free block pool 44, and allocates the free block as the input block of the selected stream (step S36).

Figure 26:
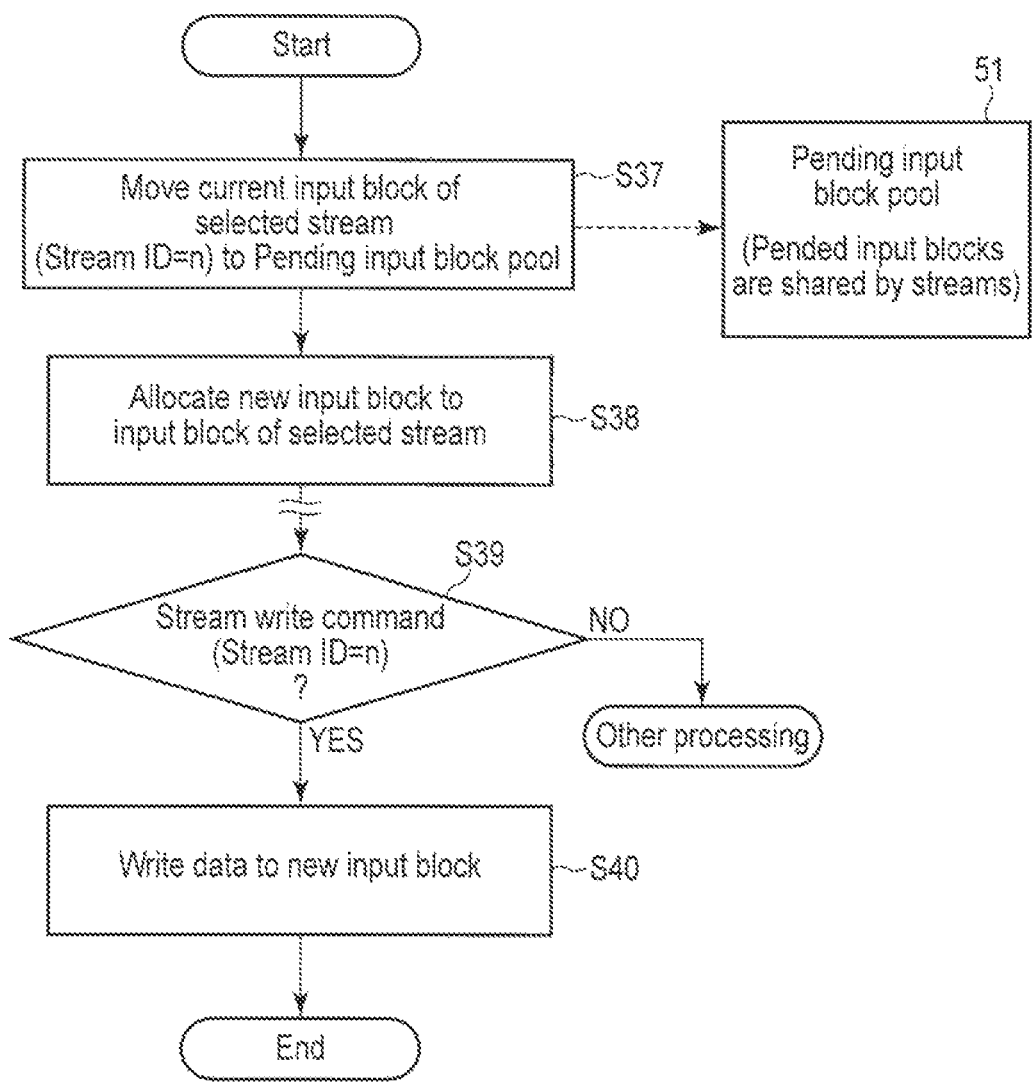
FIG. 26 is a flowchart of a new input block allocation operation executed by the storage device according to the embodiment.

FIG. 26 shows steps of a new input block allocation operation executed by the storage device 2.

When the controller 14 of the storage device 2 receives the select next input block command 79 from the host 3, the controller 14 moves to the pending input block pool 51 a current input block corresponding to the selected stream (stream ID=n) designated by the select next input block command 79 (step S37). A state of the current input block is changed to the pended input block. The pended input block can be shared among the streams as described above. If the select next input block command 79 includes the Destination Stream ID, the pended input block may be reused as the input block of the stream designated by the Destination stream ID. For example, when the current input block of the stream designated by the Destination Stream ID is filled with data, the pended input block may be allocated to the input block of the stream designated by the Destination Stream ID.

The controller 14 allocates a new input block from the free block pool 44 to assign the allocated new input block to the input block of the selected stream (step S39). After that, if the controller 14 receives the write command including stream ID=n from the host 3 (YES in step S39), the controller 14 writes the data designated by the write command to the new input block (step S40).

FIG. 27 shows an architecture of the storage device 2 for the pend current input block command.

When the host 3 transmits the pend current input block command designating the stream ID of the selected stream to the storage device 2, the controller 14 temporarily suspends the use of the current input block corresponding to the selected stream and moves the current input block to the pending input block pool 51 as the pended input block. The controller 14 selects a free block from the free block pool 44, and allocates the selected free block as a new input block (also called a next input block) of the selected stream. When the new input block is filled with the data and is thereby moved to the active block pool 43, the controller 14 allocates again the pended input block to the input block of the selected stream and resumes the use of the pended input block.

Figure 28:
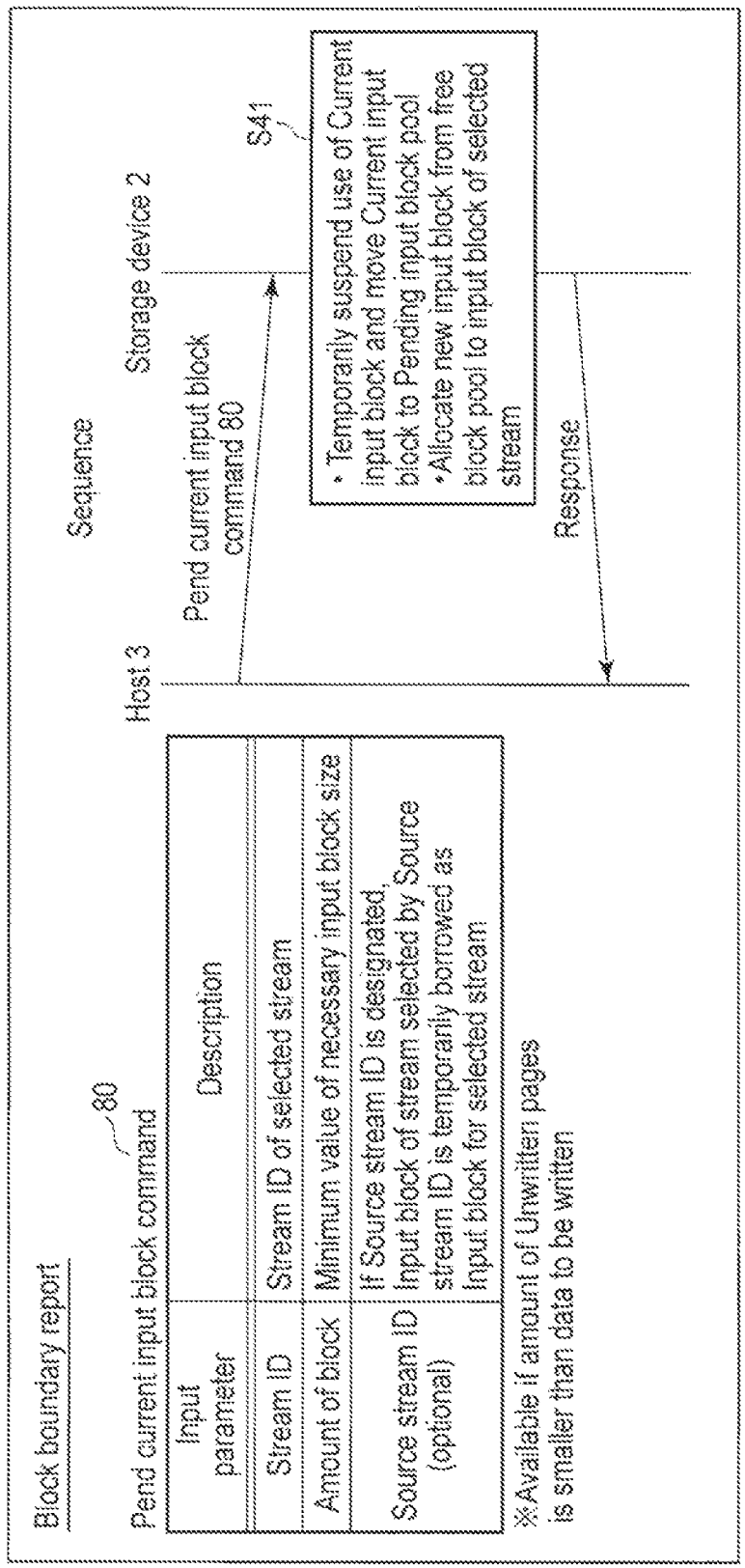
FIG. 28 illustrates data structure of the pend current input block command sent to the storage device and a processing sequence of the command.

FIG. 28 shows the pend current input block command and a processing sequence of the command.

The pend current input block command 80 temporarily suspends the use of the current input block, and requests allocation of the new block.

The pend current input block command 80 includes input parameters listed below.

(1) Stream ID
(2) Amount of block
(3) Source Stream ID (optional)

Stream ID indicates a Stream ID of the selected stream.

Amount of block indicates a minimum value of the size of the new input block.

The Source Stream ID is optional. When the Source Stream ID is designated by the pend current input block command 80, the input block of the stream designated by the Source Stream ID may be temporarily borrowed and used as the input block of the selected stream.

If the size of the write data is greater than the remaining capacity of the current input block corresponding to the selected stream, the host 3 transmits the pend current input block command 80 including a Stream ID of the selected stream to the storage device 2. The controller 14 of the storage device 2 temporarily suspends the use of the current input block corresponding to the selected stream and moves the current input block to the pending input block pool 51 (step S41). In step S41, the host 3 further selects a free block having a size greater than the size designated by the input parameter of the amount of block in the pend current input block command 80, from the free block pool 44, and allocates the free block as the input block of the selected stream.

FIG. 29 shows other steps of the new input block allocation operation executed by the storage device 2.

When the controller 14 of the storage device 2 receives the pend current input block command 80 from the host 3, the controller 14 temporarily suspends the use of the current input block corresponding to the selected stream (Stream ID=n) designated by the pend current input block command 80 and moves the current input block to the pending input block pool 51 (step S42). A state of the current input block is changed to the pended input block.

The controller 14 allocates a new input block from the free block pool 44, and uses the allocated new input block as the input block of the selected stream (step S43). After that, if the controller 14 receives the write command including Stream ID=n from the host 3 (YES in step S44), the controller 14 writes the data designated by the write command to the new input block (step S45).

The controller 14 determines whether or not the new input block is filled with data (step S46). If the new input block is filled with data (YES in step S46), the controller 14 moves this new input block to the active block pool 43 (step S47). Then, by allocating the block temporarily suspended in step 42 to the input block of the selected stream, the controller 14 resumes the use of the block (step S48).

FIG. 30 shows a resume input block command which can be added for the function of the block boundary report and a processing sequence of the command.

The resume input block command 81 is a command requesting compulsory resuming of use of the pended input block.

The resume input block command 81 includes an input parameter below.

(1) Stream ID

Stream ID indicates a Stream ID of the selected stream.

The host 3 determines whether or not the resuming of use of the pended input block of the selected stream is necessary. For example, if the size of the data which should be next written substantially fills the remaining capacity of the pended input block, the host 3 may determine that the resuming of use of the pended input block of the selected stream is necessary. The host 3 transmits the resume input block command 81 including the Stream ID of the selected stream to the storage device 2. By allocating the pended input block corresponding to the selected stream designated by the resume input block command 81, as the input block of the selected stream, the controller 14 of the storage device 2 compulsorily resumes use of the pended input block (step S49).

Figure 31:
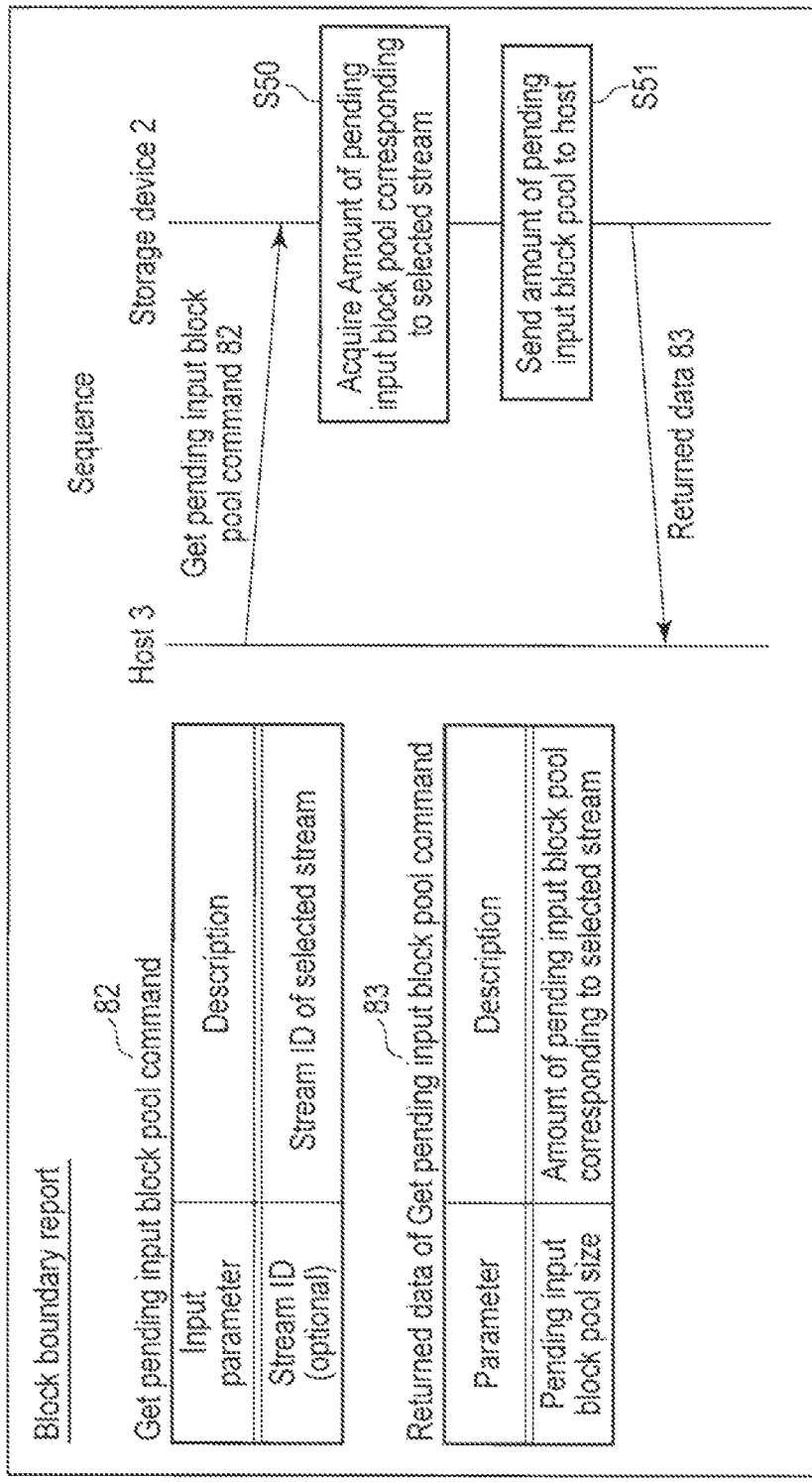
FIG. 31 illustrates data structure of a get pending input block pool command sent to the storage device and return data of the get pending input block pool command and a processing sequence of the get pending input block pool command.

FIG. 31 shows a get pending input block pool command that can be added for the function of block boundary report, return data of get pending input block pool command, and a processing sequence of the get pending input block pool command.

The get pending input block pool command 82 is a command requesting the amount of the pending input block pool corresponding to the selected stream (i.e., amount of the pended input blocks corresponding to the selected stream).

The get pending input block pool command 82 includes an input parameter below.

(1) Stream ID

Stream ID indicates a Stream ID of the selected stream.

The return data 83 of get block boundary info command includes a parameter explained below.

(1) Pending Input Block Pool Size

Pending input block pool size indicates the amount of the pending input block pool (i.e., amount of the pended input blocks corresponding to the selected stream).

The host 3 transmits the get pending input block pool command 82 including the Stream ID of the selected stream to the storage device 2. The controller 14 of the storage device 2 determines the amount of the pending input block pool corresponding to the selected stream designated by the get pending input block pool command 82 (i.e., amount of the pended input blocks corresponding to the selected stream) (step S50). The amount of the pended input blocks corresponding to the selected stream may be a sum of the remaining free space of the pended input blocks. The controller 14 transmits to the host 3 return data 83 indicating the amount of the pending input block pool corresponding to the selected stream (i.e., amount of the pended input blocks corresponding to the selected stream) (step S51).

FIG. 32 shows a release pending input block pool command that can be added for the function of the block boundary report and a processing sequence of the command.

The release pending input block pool command 84 is a command requesting release of the pended input blocks corresponding to the selected stream.

The release pending input block pool command 84 includes an input parameter below.

(1) Stream ID

Stream ID indicates a Stream ID of the selected stream.

The host 3 transmits the release pending input block pool command 84 including the Stream ID of the selected stream to the storage device 2. The controller 14 of the storage device 2 allocates the pended input blocks corresponding to the selected stream designated by the release pending input block pool command 84, to the non-stream block pool 47, and reuses the pended input blocks corresponding to the selected stream as the input block 42 of the non-stream block pool 47 (step S52).

FIG. 33 shows a relationship between application threads 39 of the host 3 and the streams used by the application threads 39.

The application threads 39 access the storage device 2 using different stream IDs.

Figure 34:
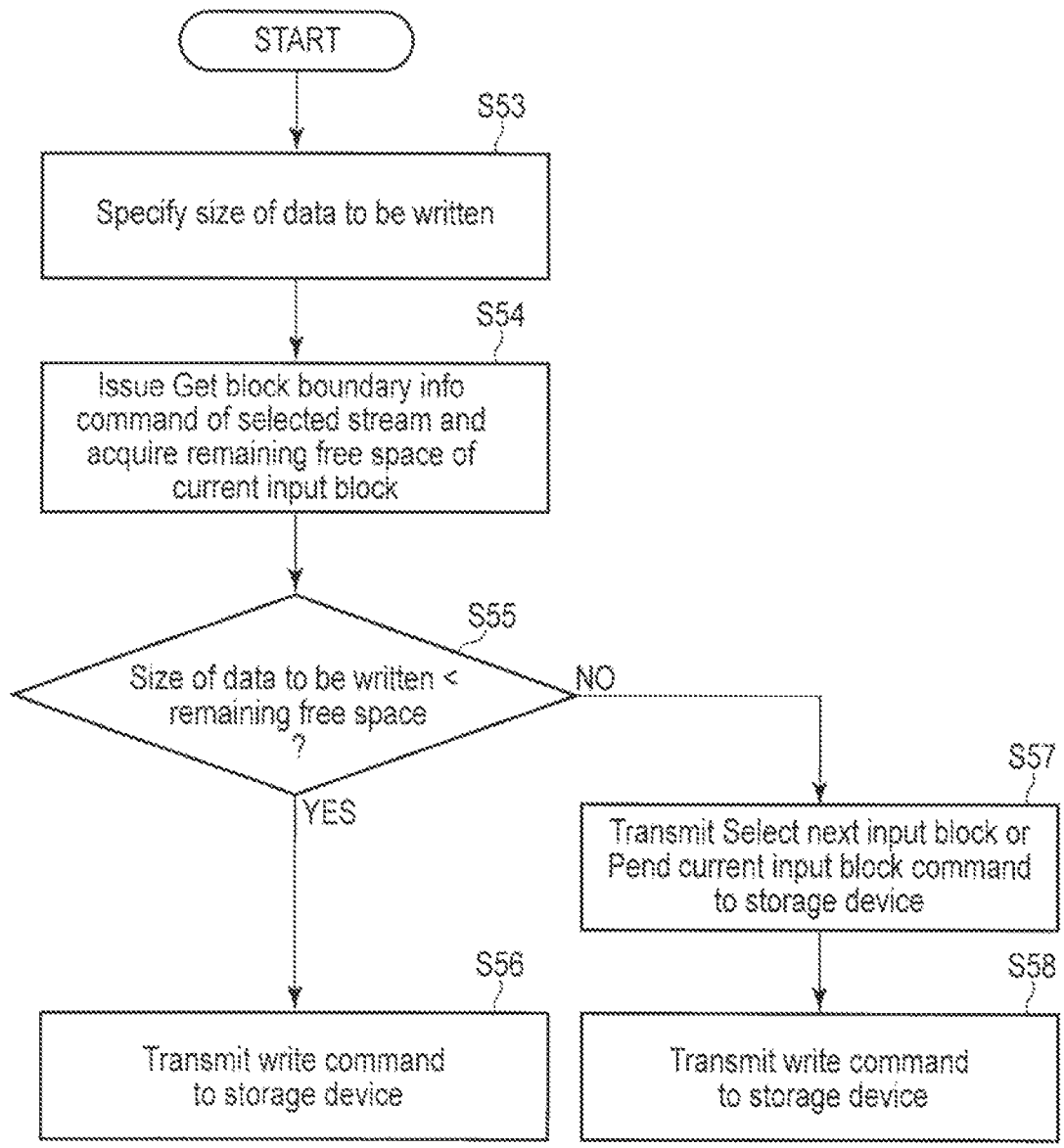
FIG. 34 is a flowchart of processing executed by the host (host software) when a block boundary report is processed.

FIG. 34 shows steps of processing executed by the host 3 (host software) using the function of the block boundary report.

When a certain one of the application threads 39 is to write data, the application thread 39 specifies the data size of the data to be written (step S53). The application thread 39 acquires the remaining free space of the current input block corresponding to the selected stream, by transmitting to the storage device 2 the get block boundary info command 77 including the stream ID of the selected stream (i.e., ID of the stream used by the application thread 39) (step S54).

The application thread 39 determines whether or not the data size of the data to be written is smaller than the remaining free space of the current input block (step S55).

If the data size is smaller than the remaining free space of the current input block (YES in step S55), the application thread 39 transmits the write command 40 including the stream ID of the selected stream to the storage device 2 in order to write the data the current input block (step S56).

In contrast, if the data size is greater than the remaining free space of the current input block (NO in step S55), the application thread 39 transmits the select next input block command 79 or the pend current input block command 80 to the storage device 2 to request allocation of the new input block (step S57). After that, the application thread 39 transmits the write command 40 including the stream ID of the selected stream to the storage device 2 in order to write the data to the new input block (step S58).

Figure 35:
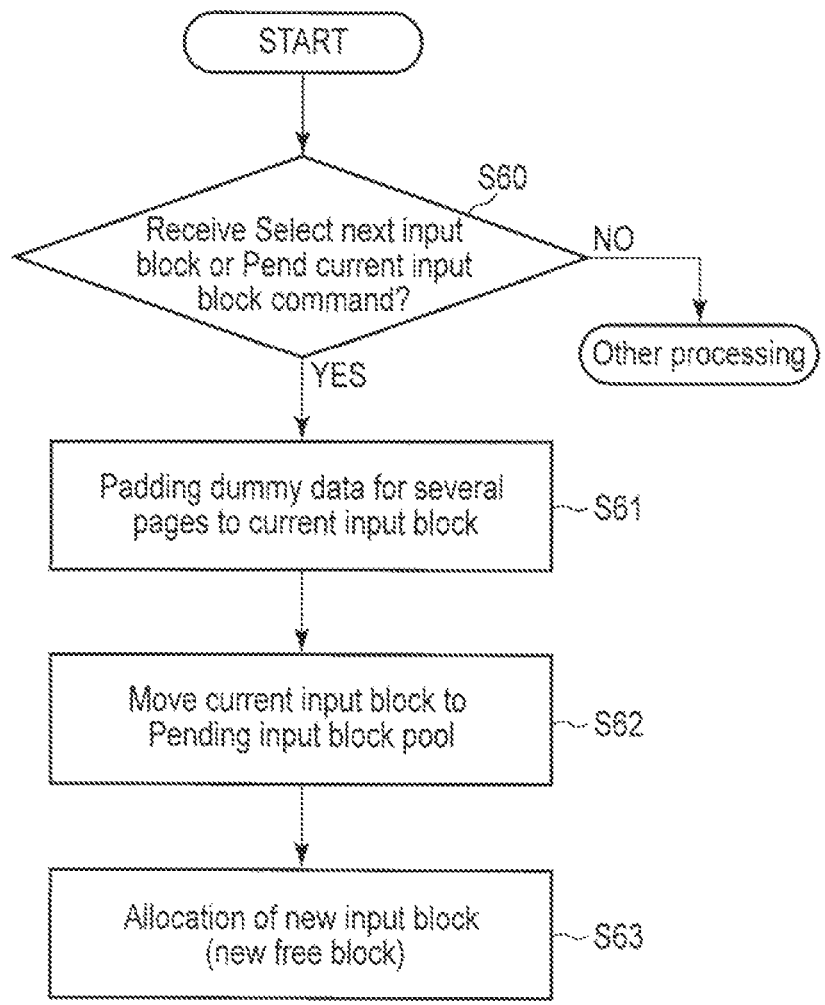
FIG. 35 is a flowchart of processing executed by the storage device according to the embodiment when the select next input block command or the pend current input block command is processed.

A flowchart of FIG. 35 shows steps of processing executed by the storage device 2 in response to reception of the select next input block command 79 or the pend current input block command 80.

When the controller 14 of the storage device 2 receives the select next input block command 79 or the pend current input block command 80 from the host 3 (YES in step S60), the controller 14 performs an operation for padding the current input block with dummy data for several pages (step S61). If a current input block including an unwritten page is left for a long period of time, reliability of data at the tail of the current input block may be deteriorated. To prevent this issue, at least one next available page following the data at the tail of the current input block is padded with dummy data, in step S61.

The controller 14 moves the current input block to the pending input block pool 51 (step S62), and allocates a new input block (step S63).

<4. Effective "Hand-Shake" GC>

Next, the effective "hand-shake" GC will be described in detail with reference to FIG. 36 to FIG. 39 and FIG. 70 to FIG. 75.

Figure 36:
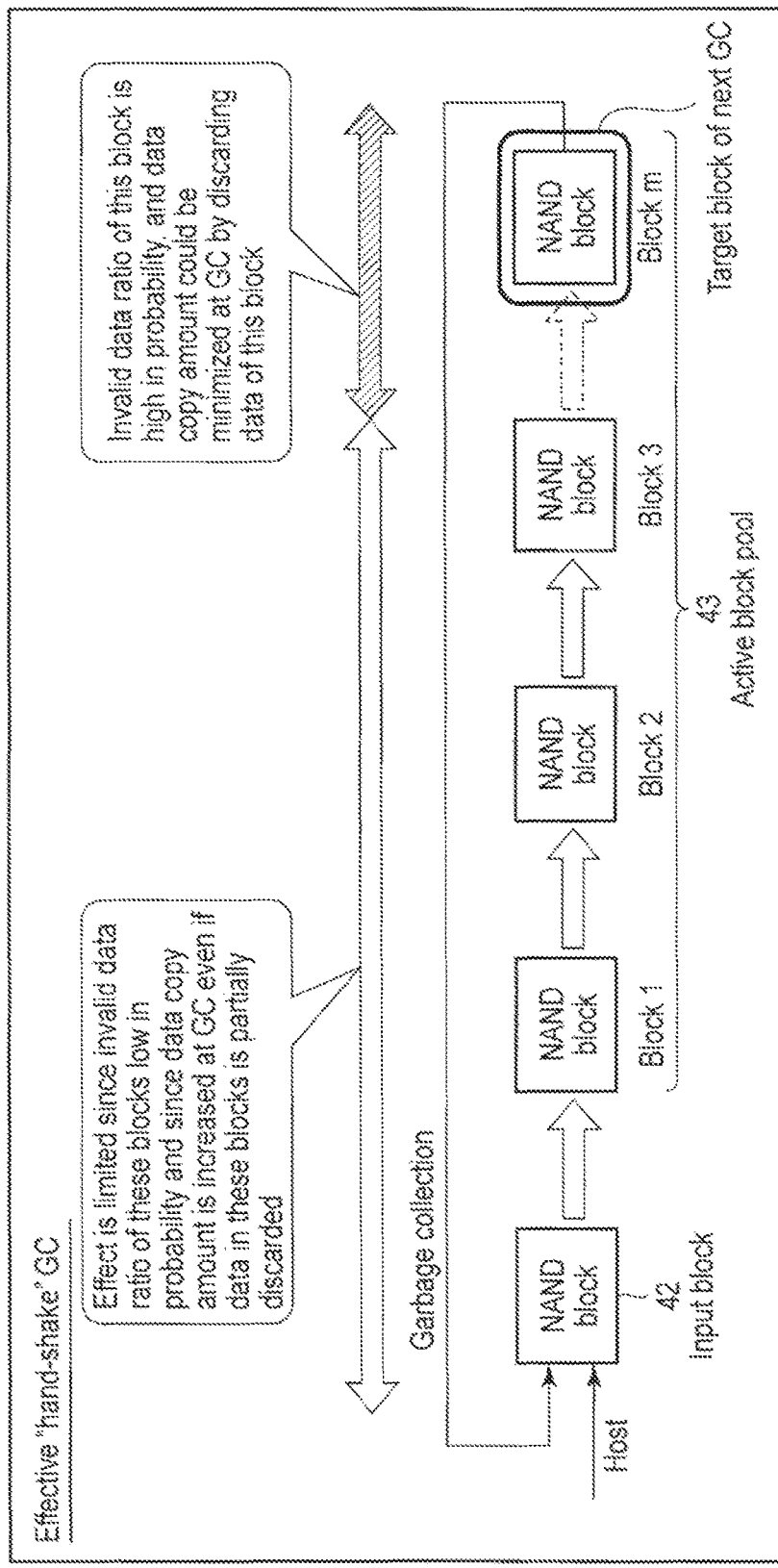
FIG. 36 illustrates an effective "hand-shake" GC executed by the storage device according to the embodiment.

FIG. 36 shows a summary of a function of the effective "Hand-Shake" GC.

As described above, the function of the effective "hand-shake" GC provides the host 3 with an LBA list corresponding to valid data in a target block for the next garbage collection. The host 3 does not blindly discard the data, but can discard the data that can contribute to minimize a data copy amount in the garbage collection at optimum timing, by selecting discardable data from the LBA list.

Various methods can be used to select the target block for the next garbage collection.

In FIG. 36, the active block pool 43 is assumed to have a FIFO buffer structure. Every time a new active block is allocated in the active block pool 43, each of active blocks in the active block pool 43 is moved to a next stage of the active block pool 43.

If the active block pool 43 has the FIFO buffer structure, the active block on the last stage of the active block pool 43 may be selected as the target block for the next garbage collection. This is because the active block on the last stage is likely to have a high invalid data ratio and the data copy amount can be minimized when valid data in the blocks is discarded during the garbage collection.

By using a command (get logical address list to be collected command) for the effective "hand shake" GC, the host 3 can request the controller 14 of the storage device 2 a list of the logical addresses corresponding to the valid data stored in the target block for a next garbage collection.

FIG. 37 shows an operation of the effective "hand-shake" GC.

When the controller 14 receives the get logical address list to be collected command from the host 3, the controller 14 selects a target block for the next garbage collection. The controller 14 may specify an active block having the biggest invalid data ratio by referring to the lookup table 19, and select the block as the target block for the next garbage collection. Alternately, if the active block pool 43 has the FIFO buffer structure, the controller 14 may select the active block on the last stage of the active block pool 43 as the target block for the next garbage collection.

The number of target blocks for the garbage collection selected from the active block pool 43 is not necessarily one. Several active blocks may be selected as target blocks for the garbage collection.

The controller 14 acquires information about the logical addresses corresponding to the valid data stored in the target block for the next garbage collection, by referring to the lookup table 19. Then, the controller 14 provides the host 3 with a list (LBA list) of the logical addresses corresponding to the valid data stored in the target block for the next garbage collection.

The host 3 additionally selects the discardable data such as unneeded data in the read cache data, temporary file data, and work file data from the list of the logical addresses, by referring to metadata of the file system 12, etc. The host 3 can transmit a command (trim command or umap command) designating a logical address range of the discardable data and requesting invalidating (unmapping) the discardable data, before the garbage collection operation of the target block for the next garbage collection is executed.

The controller 14 invalidates the discardable data in the valid data in the target block by updating the lookup table 19. The data copy amount in the garbage collection of the target block can be thereby minimized.

In the present embodiment, the valid data in the target block for the next garbage collection can be discarded, additionally and positively, by the function of the effective "hand-shake" GC. The active blocks other than the target block for the next garbage collection, and the input block are not handled as target blocks for additional data discarding. The discardable data such as the read cache data can be therefore maintained in the available state until the garbage collection of the data. The discardable data can be therefore discarded at optimum timing to minimize the data copy amount in the garbage collection.

Figure 38:
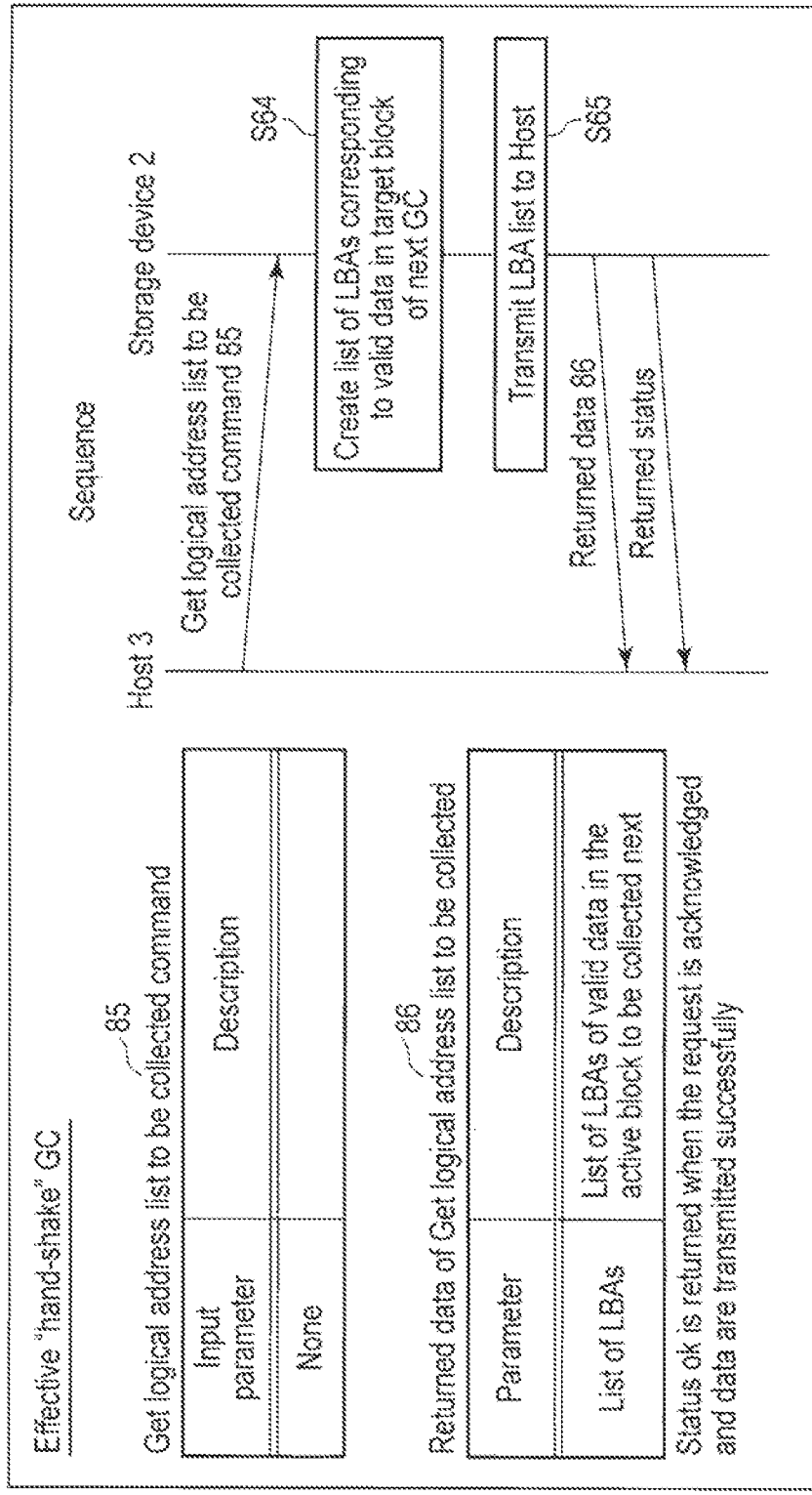
FIG. 38 illustrates data structure of a get logical address list to be collected command sent to the storage device and a return data of the get logical address list to be collected command, and a processing sequence of the get logical address to be collected command.

FIG. 38 shows a get logical address list to be collected command for the effective "hand-shake" GC, and return data of get logical address list to be collected command, and a processing sequence of the get logical address to be collected command.

The get logical address list to be collected command 85 is a command requesting a list of the logical addresses to be collected.

The get logical address list to be collected command 85 may not include an input parameter. Alternately, the get logical address list to be collected command 85 may include an input parameter indicating the namespace ID or ID of the target stream selected from opened streams.

Alternately, the get logical address list to be collected command 85 may include a parameter indicating the number of blocks to be listed.

The return data 86 of the get logical address list to be collected command includes a parameter below.

(1) List of LBAs

List of LBAs indicates a list of LBAs corresponding to the valid data in the active block to be next collected.

The host 3 transmits the get logical address list to be collected command 85 to the storage device 2. In response to the get logical address list to be collected command 85 from the host 3, the controller 14 of the storage device 2 selects at least one target block for the next garbage collection from the active block pool 43, and creates a list of LBAs corresponding to the valid data in the target block for the next garbage collection by referring to the lookup table 19 (step S64). When the number of blocks to be listed is designated by the get logical address list to be collected command 85, the controller 14 creates the list of LBAs using blocks corresponding to the designated number. In this case, the blocks are selected in order of blocks which could be the target candidate of the next garbage collection at a higher possibility.

The controller 14 transmits the return data 86 indicating the list of LBAs corresponding to the valid data in the target block for the next garbage collection to the host 3 (step S64).

FIG. 39 shows a series of processing sequences executed by the storage device 2 and the host 3 when the effective "hand-shake" GC is performed.

The host 3 periodically monitors the amount of the free space in the storage device 2 by transmitting to the storage device 2 a control command requesting for the amount of the free space of the storage device 2 (step S66). The amount of the free space may be represented by the number of free blocks in the storage device 2 or the ratio of the free blocks in the storage device 2.

When the amount of the free space of the storage device 2 is reduced to be equal to or lower than a threshold value, the host 3 starts a greedy data discarding process on its own (step S67).

The greedy data discarding process is processing for additionally discarding discardable data which could most contribute to improvement of WAF, at optimum timing, by performing the effective "hand-shake" GC. The host 3 may temporarily suspend issuing the write command during the greedy data discarding process.

The host 3 transmits the get logical address list to be collected command 85 to the storage device 2, during the greedy data discarding process. In response to the get logical address list to be collected command 85 from the host 3, the process proceeds to step S68.

In step S68, the controller 14 specifies the target active block for the next garbage collection. The controller 14 acquires the list of all LBAs mapped to the target active block for the next garbage collection, i.e., the list of LBAs corresponding to the valid data in the target active block, by searching for the lookup table 19. Then, the controller 14 notifies the host 3 of the list of LBAs by transmitting to the host 3 the return data 86 of the get logical address list to be collected command.

In response to the list of LBAs, the process proceeds to step S69.

In step S69, the host 3 selects unneeded data and data of less importance from the received list of LBAs, as discardable data, by referring to the metadata of the file system 12, management data of each application, etc. For example, the host 3 may select data of a low hit rate (i.e., data that is seldom requested to be read, etc.) as the discardable data, with respect to the above-described read cache data.

The host 3 creates a list of LBAs corresponding to the discardable data. The host 3 transmits to the storage device 2 a command (unmap command or trim command) which includes a parameter designating the LBA range corresponding to the discardable data and which requests unmapping (invalidation) of the LBA range.

In response to the unmap command or the trim command from the host 3, the process proceeds to step S70

In step S70, the controller 14 updates the lookup table 19 and invalidates the data corresponding to the LBAs designated by the unmap command or the trim command. Then, the controller 14 sends to the host 3 a notice of command completion.

When the garbage collection operation of the target active block for the next garbage collection is executed, the controller 14 specifies valid data of the target active block by referring to the lookup table 19. The controller 14 copies the valid data alone of the target active block to the other block (free block in the free block pool 44 or input block). The controller 14 updates the mapping information of the lookup table 19 and maps the LBA of the copied valid data to the physical address to which the valid data has been copied. The controller 15 creates a free block by erasing the target active block.

Since the free block is moved to the free block pool 44, the number of free blocks in the free block pool 44 is increased by the garbage collection. The free block may be allocated as the input block 42.

In the present embodiment, the discardable data (i.e., unneeded data and data of less importance) which could most contribute to improvement of WAF can be additionally discarded at optimum timing, through the effective "hand shake" GC.

Use Case 1: Read Cache

Read cache algorithm can be applied to an information processing system according to an embodiment. FIG. 70 shows a block diagram of a software layer structure of the information processing system 1 wherein read cache is used. In this embodiment, main data is stored in main storage device 130 such as Hard Disk Drive (HDD), tape, and TLC SSD, and LBA ranges of the storage device 2 are used as read cache of the main data.

Figure 71:
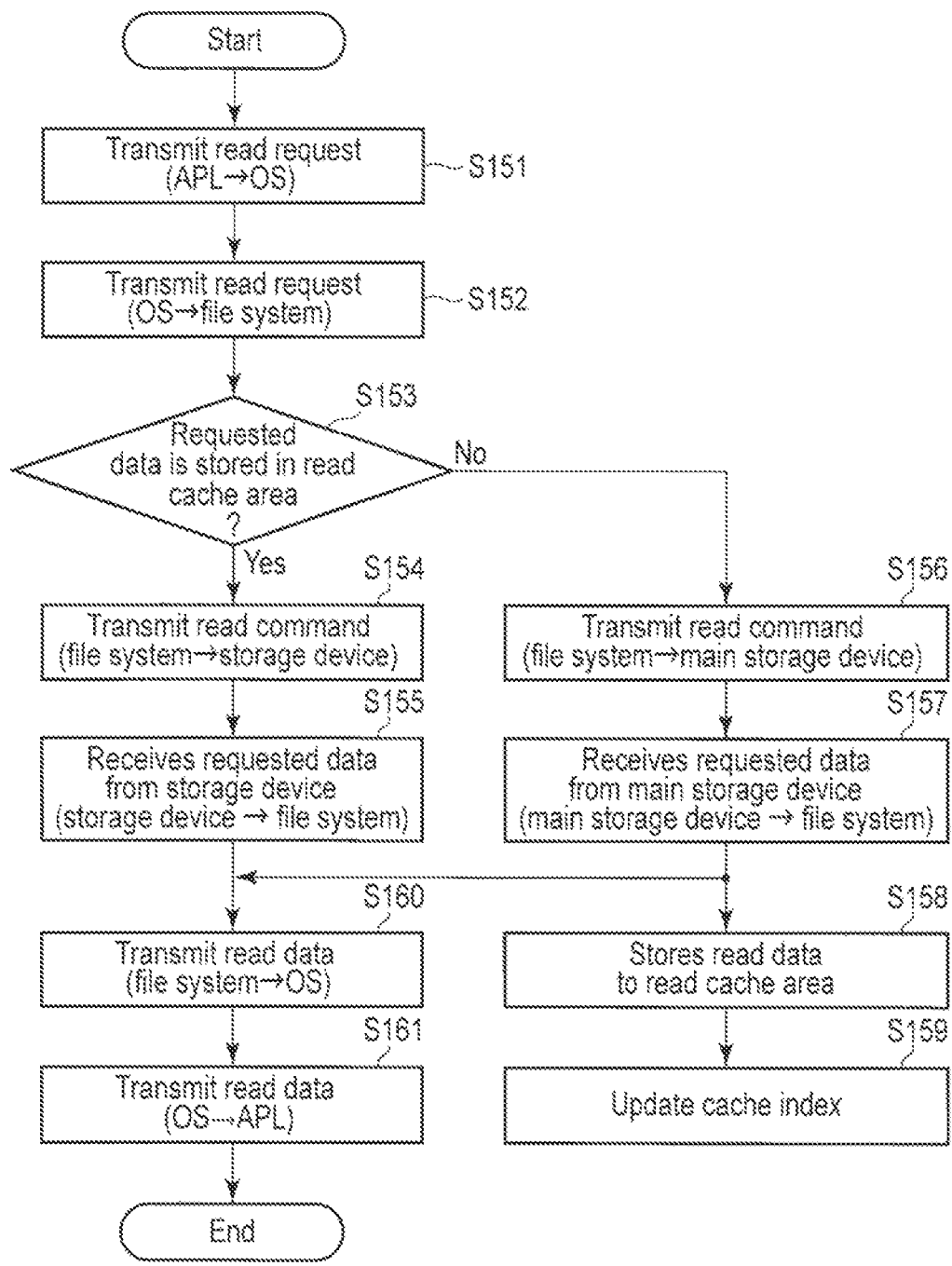
FIG. 71 is a flowchart of a read cache algorithm applied to the effective "hand-shake" GC.

FIG. 71 shows an example of read cache algorithm. When the application software layer 13 transmits a read request to OS 11 (step S151), OS 11 transmits a read request to the file system 12 (step S152). The file system 12 refers to cache index 132 and determines whether the requested data is stored in read cache area 133 of the storage device 2 (step S153). When the requested data is stored in the read cache area 133 (cache hit), the file system 12 transmits a read command to the storage device 2 (step S154) and receives the requested data from the storage device 2 (step S155). When the requested data is not stored in the read cache area 133, the file system 12 transmits a read command to the main storage device 130 (step S156), receives the requested data from the main storage device 130 (step S157), stores the read data to the read cache area 133 (step S158), and updates cache index 132 to register the read data as the cached data in the read cache area 133 (step S159). After step S155 or step S167, the file system 12 transmits the read data to OS 11 (step S160), and OS 11 transmits the read data to the application software layer 13 (step S161).

FIG. 72 shows a flow diagram of cache manager 131 in the file system 12. The cache manager 131 maintains cached data in the read cache area 133 to optimize read cache ratio and write amplification of the storage device 2. During normal mode wherein the file system 12 issues a write command 40 to the storage device 2 (step S171), the cache manager 131 periodically monitors amount of free blocks of the storage device 2 (step S172), and determines whether the amounts becomes less than a predetermined threshold or not (step S173). If it becomes less than the predetermined threshold (S173: yes), the cache manager 131 temporally enters into a greedy invalidation mode wherein the file system 12 does not issue a write command 40 to the storage device 2 (step S174). The cache manager 131 transmits the get logical address (LBA) list to be collected command 85 to the storage device 2 (step S175) and receives the LBA list (return data 86) from the storage device 2 (step S176). The cache manager 131 checks the LBA list (return data 86) to see which LBA ranges are to be collected in the next garbage collection by the storage device 2 (step S177). The cache manager 131 refers to cache index 132 (step S178) and determines unneeded LBA ranges out of the LBA ranges to be collected (step S179). For example, the cache manager 131 selects the cached data which has low cache hit ratio as unneeded data. The cache manager 131 updates the cache index 132 to invalidate entries of the unneeded data. The cache manager 131 transmits unmap command (or trim command) with LBA entries which are specifying the unneeded LBA ranges to the storage device 2 to invalidate mappings between unneeded LBA ranges and physical addresses in the storage device 2 (step S180). The cache manager 131 ends the greedy invalidation mode, and goes back to a normal mode.

Use Case 2: Tiering

Tier algorithm can be applied to the information processing system according to an embodiment. FIG. 73 shows a block diagram of a software layer structure of the information processing system 1 wherein the storage device 2 is used as an upper tier storage, and the storage device 140, such as Hard Disk Drive (HDD), tape, and TLC SSD, is used as lower tier storage.

FIG. 74 shows an example of tier algorithm. When the application software layer 13 transmits a read request to OS 11 (step S181), OS 11 transmits a read request to the file system 12 (step S182). The file system 12 refers to tier index 142 and determines whether the requested data is stored in an upper tier area 143 of storage device 2 or in a lower tier area 144 of the storage device 140 (step S183). When the requested data is stored in the upper tier area 143, the file system 12 transmits a read command to the storage device 2 (step S184) and receives the requested data from the storage device 2 (step S185). When the requested data is stored in lower tier area 144, the file system 12 transmits a read command to lower tier storage device 140 (step S186), receives the requested data from lower tier storage device 140 (step S187). After step S185 or step S187, the file system 12 transmits the read data to OS 11 (step S188), and OS 11 transmits the read data to the application software layer 13 (step S189).

FIG. 75 shows a flow diagram of the tier manager 141 in the file system 12. The tier manager 141 maintains data location in the upper tier or the lower tier depending on temperature of the data. During a normal mode wherein the file system 12 issues a write command 40 to the storage device 2 (step S191), the tier manager 141 periodically monitors amount of free blocks of the storage device 2 as upper tier (step S192) and determines whether or not the amounts becomes less than a predetermined threshold (step S193). If it becomes less than the predetermined threshold (S193: yes), the tier manager 141 temporally enters into the greedy invalidation mode wherein the file system 12 does not issues a write command 40 to the storage device 2 (step S194). The tier manager 141 transmits a get logical address (LBA) list to be collected command 85 to the storage device 2 (step S195) and receives a LBA list (return data 85) from the storage device 2 (step S196). The tier manager 141 checks the LBA list 48 to see which LBA ranges are to be collected in the next garbage collection by the storage device 2 (step S197). The tier manager 141 refers to the tier index 142 (step S198) and determines LBA ranges storing data to be moved to the lower tier out of the LBA ranges to be collected (step S199). For example, the tier manager 141 selects the data which is least frequently accessed by the host 3 (cold data) as data to be moved to the lower tier. The tier manager 141 copies cold data to the lower tier storage device 140. The tier manager 141 updates the tier index 142 to validate mappings of the cold data to the lower tier storage device 140. The tier manager 141 transmits an unmap command (or trim command) with LBA entries which specify the LBA ranges which stores the cold data in the storage device 2 to the storage device 2, in order to invalidate mappings between the LBA ranges and physical addresses of the storage device 2 (step S200). The tier manager 141 ends the greedy invalidation mode and goes back to the normal mode.

<5. In-Drive Tiering Control>

Next, In-drive tiering control will be described in detail with reference to FIG. 40 to FIG. 43.

FIG. 40 shows a summary of a function of in-drive tiering control.

A tier of the nonvolatile storage device can be divided into a tier of MRAM, a tier of SSD, and a tier of HDD as shown by a triangle in FIG. 40. The tier of MRAM is a tier of a storage device of the highest performance and the highest unit price per bit. The tier of HDD is a tier of a storage device of the lowest performance and the lowest unit price per bit. The tier of SSD corresponds to a middle tier between the tier of MRAM and the tier of HDD. In accordance with development of technology on SSD, the tier of SSD is expected to extend upwardly and downwardly and become a very wide tier.

The function of the in-drive tiering control enables a tier storage (first tier) having a characteristic of writing or reading data at a high speed and another tier storage (second tier) having a characteristic of storing a large amount of data at a low cost, to exist together in the same SSD, as shown in the enlarged portion of the triangle in FIG. 40.

The host 3 can designate a tier attribute which should be applied to the write data, in accordance with the type/attribute of the write data, using a command for the in-drive tiering control (extended write command or extended namespace (stream) control command).

For example, when (hot) data required to be written at a high speed is written, the host 3 can designate the tier attribute corresponding to the 1-bit/cell writing method (SLC), and when (cold) data required to be stored at a cost as low as possible is written, the host 3 can designate the tier attribute corresponding to the 2-bit/cell writing method (MLC), the 3-bit/cell writing method (TLC), or the 4-bit/cell writing method (QLC).

The controller 14 of the storage device 2 writes the data to the flash memory 16 by employing the writing method designated by the tier attribute. The write data can be thereby stored in the flash memory 16 using the method suitable to the type of the write data, under control of the host 3.

FIG. 41 shows an extended write command for the in-drive tiering control and a processing sequence of the command.

The extended write command 87 is a write command capable of designating a tier attribute. More specifically, the extended write command 87 requires the data designated by the extended write command 87 to be written with the tier attribute designated (writing method designated) by the extended write command 87.

The extended write command 87 includes input parameters listed below.
(1) Tier attribute
(2) Starting LBA
(3) Sector count
(4) Stream ID (optional)
(5) Namespace ID (optional)

Tier attribute indicates a writing method which should be applied to the write data. In the present embodiment, the host 3 can designate any one of the SLC writing method (1 bit/cell writing method) for writing 1-bit data to each memory cell, the MLC writing method (2 bits/cell writing method) for writing 2-bit data to each memory cell, and the TLC writing method (3 bits/cell writing method) for writing 3-bit data to each memory cell. In another embodiment, the host 3 may designate the QLC writing method for writing 4-bit data to each memory cell, besides the SLC writing method, the MLC writing method, or the TLC writing method.

Relationships between the tier attribute values and the applied writing are described below.
00b: Default
01b: SLC
10b: MLC
11b: TLC The writing method corresponding to Default is the writing method predetermined by the storage device 2. The writing method corresponding to Default may be, for example, the MLC writing method or the SLC writing method.

In the SLC writing method, binary data is stored in a single page. For this reason, the number of program-verify steps necessary in the SLC writing method is smaller than the number of program-verify steps necessary in the MLC/TLC/QLC writing method. The SLC writing method can therefore write the data at a higher speed than the MLC/TLC/QLC writing method.

The host 3 transmits the extended write command 87 which designates the tier attribute to the storage device 2. The host 3 transmits the write data to the storage device 2. The controller 14 of the storage device 2 holds the tier attribute value, writes the write data to the write buffer (WB) 20 (step S71), and sends to the host 3 the notice of command completion. After that, the controller 14 writes the write data to the block in the flash memory 16 in the writing method designated by the tier attribute value (step S72). The controller 14 updates the lookup table 19 and maps the LBA of the write data to the physical address of the physical storage location at which the write data is written.

For each block (physical block) in the storage device 2, the controller 14 can preset the writing method which should be applied to the block. Furthermore, after the block is erased, the controller 14 can change the writing method which should be applied to the block. In other words, the flash memory 16 includes a plurality of blocks; each of blocks is configurable as the SLC block storing 1-bit data to each memory cell, the MLC block storing 2-bit data to each memory cell, or the TLC block storing 3-bit data to each memory cell.

If the tier attribute value is 01b, the write data is written in the block (SLC block) which is set to store the data by the SLC writing method. If the tier attribute value is 10b, the write data is written in the block (MLC block) which is set to store the data by the MLC writing method.

Figure 42:
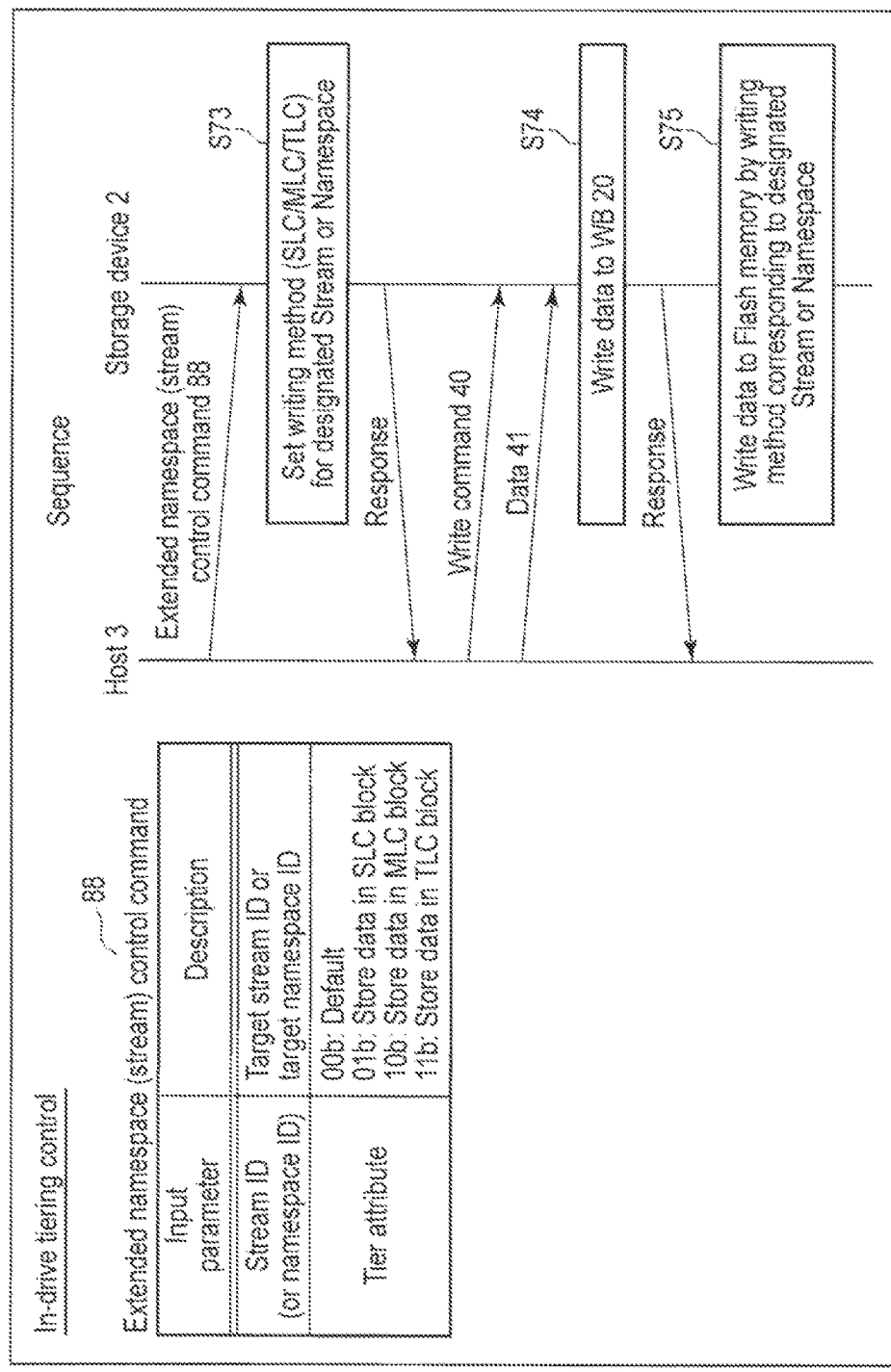
FIG. 42 illustrates data structure of an extended namespace (stream) control command sent to the storage device and a processing sequence of the command.

FIG. 42 shows an extended namespace (stream) control command for the in-drive tiering control and a processing sequence of the command.

The extended namespace (stream) control command 88 is a control command capable of designating a tier attribute. More specifically, the extended namespace (stream) control command 88 designates the tier attribute to be applied in units of not write data, but stream or namespace.

The extended namespace (stream) control command 88 may be, for example, an open stream command or a create namespace command.

The extended namespace (stream) control command 88 includes input parameters listed below.
(1) Stream ID (or Namespace ID)
(2) Tier attribute Stream ID (or Namespace ID) indicates a stream ID of the target stream or a namespace ID of the target name space.

Tier attribute indicates the writing method which should be employed for the target stream or the target namespace.

Relationships between the values of the tier attribute and the employed writing methods are described below.
00b: Default
01b: SLC
10b: MLC
11b: TLC The host 3 transmits the extended namespace (stream) control command 88 to the storage device 2. The controller 14 of the storage device 2 sets the writing method (SLC/MLC/TLC) for the designated target stream or target namespace (step S73). The controller 14 sends to the host 3 a notice of command completion.

The host 3 transmits the write command 40 including the namespace ID or the stream ID to the storage device 2 and also transmits the write data 41 to the storage device 2. The controller 14 writes the write data to the write buffer (WB) 20 (step S74), and sends to the host 3 the notice of command completion. After that, the controller 14 writes the write data to the block in the flash memory 16 by the writing method for the designated target stream or target namespace (step S75). The controller 14 updates the lookup table 19 and maps the LBA of the write data to the physical address of the physical storage location at which the write data has been written.

FIG. 43 shows a change command for the in-drive tiering control and two processing sequences related to the command.

The change command 89 is a command for changing the tier attribute of the data stored in the flash memory 16. The host 3 can request the storage device 2 to move, for example, the data in the SLC block to the MLC block or the TLC block, or the data in the MLC block to the SLC block or the TLC block, using the change command 89.

The change command 89 includes input parameters listed below.

(1) Stream ID (or Namespace ID)
(2) Tier attribute

Stream ID (or Namespace ID) indicates a stream ID of the target stream or a namespace ID of the target name space.

Tier attribute indicates a tier from which tier attribute block (source block) data of the target stream or the target namespace should be moved and to which tier attribute block (destination block) data of the target stream or the target namespace should be moved.

Relationships between the tier attribute values and the data movements are described below.

00b: Move data from SLC block to MLC block
01b: Move data from SLC block to TLC block
10b: Move data from MLC block to SLC block
10b: Move data from TLC block to SLC block For example, when the host 3 transmits to the storage device 2 the change command 89 including stream ID=0 and the Tier attribute of 00b and the data associated with stream #0 of stream ID=0 is stored in the SLC block, the controller 14 moves the data in the SLC block in which the data corresponding to stream #0 is stored, to the MLC block, and thereby changes the tier attribute of the data associated with stream #0 from SLC to MLC.

When the host 3 transmits to the storage device 2 the change command 89 including stream ID=0 and the Tier attribute of 10b and the data associated with stream #0 of stream ID=0 is stored in the MLC block, the controller 14 moves the data in the MLC block in which the data corresponding to stream #0 is stored, to the SLC block, and thereby changes the tier attribute of the data associated with stream #0 from MLC to SLC.

Two processing sequences are applicable to the change command 89.

The first processing sequence is shown at a lower left portion of FIG. 43.

The host 3 transmits the change command 89 to the storage device 2. In response to reception of the change command 89 from the host 3, the controller 14 of the storage device 2 moves the data in the source block corresponding to the target stream to the SLC block, the MLC block, or the TLC block (step S76). For example, when the source block is the SLC block and the destination block is the MLC block, the controller 14 executes processing for reading the data from the SLC block and writing the data to the MLC block using the MLC writing method.

This processing sequence enables the tier attribute of the data to be changed immediately. However, a data copy operation for moving the data is necessary.

The second processing sequence is shown at a right portion of FIG. 43.

The host 3 transmits the change command 89 to the storage device 2. In response to reception of the change command 89 from the host 3, the controller 14 of the storage device 2 sets the tier attribute information indicating the contents of the change command 89 (step S77), and sends to the host 3 a response of the command completion. When the garbage collection of the source block in which the data to be moved is stored is executed (YES in step S78), the controller 14 moves the valid data in the source block to the SLC block, the MLC block, or the TLC block (step S79).

In the second processing sequence, the processing for moving the data in the source block to the destination block is thus executed during the garbage collection of the source block. Increase in the data copy amount which results from the change of the tier attribute of data can be thereby suppressed.

In the present embodiment, the tier attribute of data is changed in units of stream or namespace. Alternatively, the tier attribute of data may be changed in units of data or the LBA range.

In general, the data temperature drops as the time elapses. Thus, the controller 14 may automatically move the data in the SLC block to the MLC block of a lower tier and may further automatically move the data in the MLC block to the TLC block of a lower tier.

For example, when the garbage collection of the SLC block is executed, the controller 14 selects the MLC block as the block of copy destination and moves the valid data in the SLC block to the MLC block.

<6. NAND Program Control>

Next, NAND program control will be described in detail with reference to FIG. 44 to FIG. 50.

As described above, the function of the NAND program control enables the host 3 to designate the tier attribute giving a higher priority to the write speed than to data retention or the tier attribute giving a higher priority to the data retention than to the write speed. The controller 14 tunes the number of the program-verify steps which should be executed to program the write data to the flash memory 16 in accordance with the designated tier attribute.

In other words, the controller 14 can selectively execute two writing methods, i.e., the writing method giving a higher priority to the write speed than to the data retention and the writing method giving a higher priority to the data retention than to the write speed, by tuning the number of program-verify steps.

Furthermore, the function of the NAND program control enables the host 3 to designate the tier attribute giving a higher priority to data reliability than to a read speed or the tier attribute giving a higher priority to the read speed than to the data reliability. The controller 14 tunes the ratio between the reliability assurance capability of ECC which should be added to the write data and the reliability assurance capability of the code for data shaping which should be added to the write data, in accordance with the designated tier attribute.

In other words, the controller 14 can selectively execute two writing methods, i.e., the writing method giving a higher priority to the write speed than to the data retention and the writing method giving a higher priority to the data retention than to the write speed, by tuning the ratio of the reliability assurance capability of ECC which should be added to the write data to the reliability assurance capability of the code for data shaping which should be added to the write data.

When the ratio of the reliability assurance capability of ECC to the reliability assurance capability of the code for data shaping is set to be great, i.e., when a strong ECC is applied to assure the data reliability, the read speed is lowered, but high data reliability can be obtained by the strong ECC. The reason why the read speed is lowered is that load on ECC decoding (error detection/correction) applied to the read data is increased.

When the ratio of the reliability assurance capability of the code for data shaping to the reliability assurance capability of ECC is set to be great, i.e., when a strong code for data shaping is applied to assure the data reliability, the write speed is slightly lowered, but the read speed is not lowered. In contrast, the data reliability is degraded as compared with that in a case of using the strong ECC.

Figure 44:
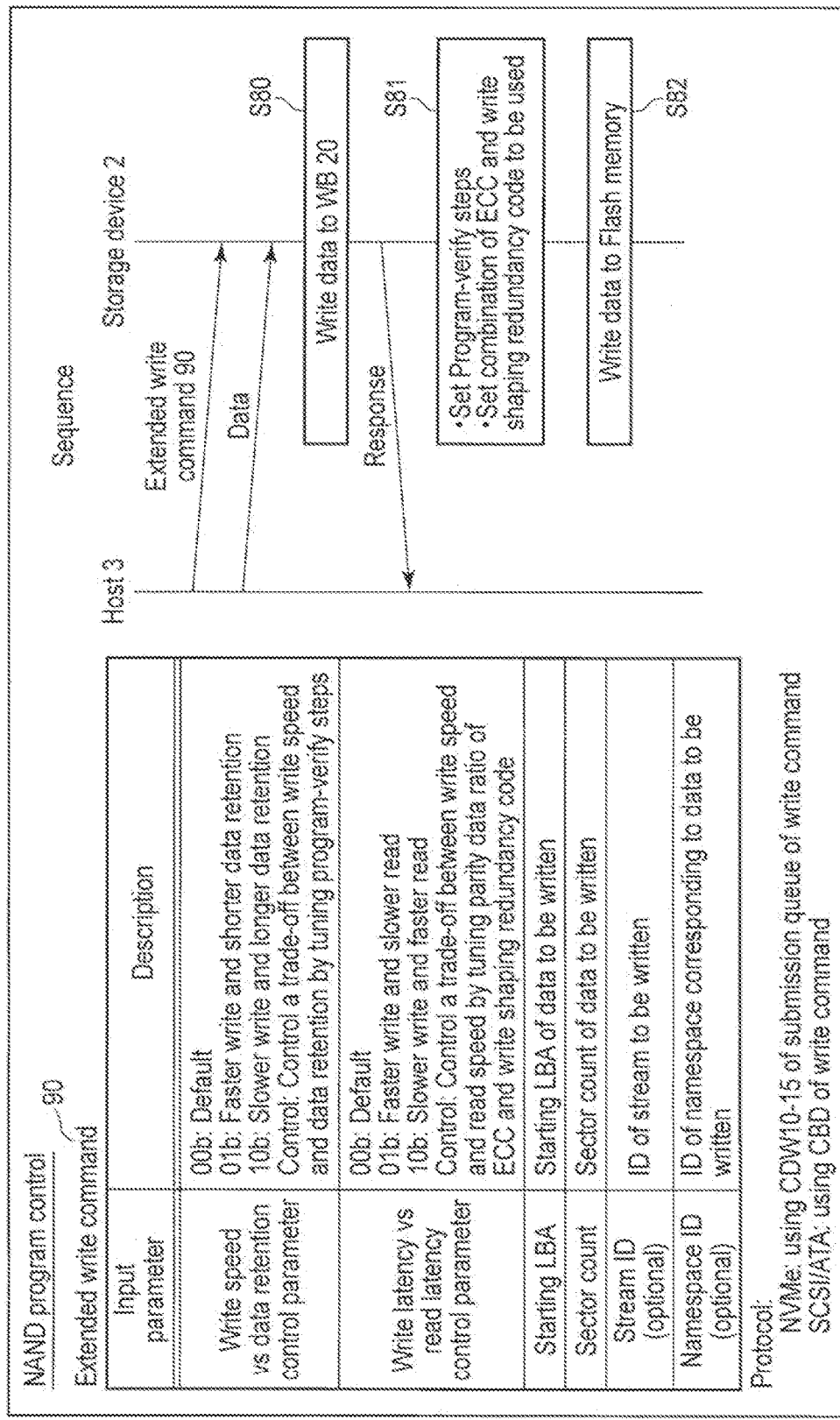
FIG. 44 illustrates data structure of an extended write command sent to the storage device for NAND program control and a processing sequence of the command.

FIG. 44 shows the extended write command for the NAND program control and a processing sequence of the command.

The extended write command 90 includes input parameters listed below.
(1) Write speed vs data retention control parameter
(2) Write latency vs read latency control parameter
(3) Starting LBA
(4) Sector count
(5) Stream ID (optional)
(6) Namespace ID (optional)

Write speed vs data retention control parameter is a parameter relating to control of tradeoff between a write speed and data retention.

Write speed vs data retention control parameter is used to designate the writing method to be executed.

Relationships between the Write speed vs data retention control parameter and the writing methods are described below.
00b: Default
01b: Faster write and shorter data retention
10b: Slower write and longer data retention The Faster write and shorter data retention (01b) designates the tier attribute giving a higher priority to the write speed than to the data retention. The Slower write and longer data retention (10b) designates the tier attribute giving a higher priority to the data retention than to the write speed. The host 3 can execute the In-drive tiering control by designating the Faster write and shorter data retention (01b) or the Slower write and longer data retention (10b). As shown in FIG. 45, for example, when (hot) data which is required to be written at a high speed and a high update frequency is written, the host 3 may designate the tier attribute (Faster write and shorter data retention) giving a higher priority to the write speed than to the data retention. In contrast, when (cold) data which has a low update frequency and which is required to be stored for a long time is written, the host 3 may designate the tier attribute (Slower write and longer data retention) giving a higher priority to the data retention than to the write speed.

Default is the writing method predetermined by the storage device 2. The writing method corresponding to Default may be, for example, the writing method giving a higher priority to the write speed than to the data retention or the writing method giving a higher priority to the data retention than to the write speed.

Write latency vs read latency control parameter is a parameter relating to control of tradeoff between the read speed and the data reliability, i.e., tradeoff between the write speed and the read speed.

Write latency vs read latency control parameter is used to designate the writing method to be executed.

Relationships between the Write latency vs read latency control parameter and the writing methods are described below.
00b: Default
01b: Faster write and slower read
10b: Slower write and faster read The Faster write and slower read (01b) designates the tier attribute giving a higher priority to data reliability than to the read speed. The Slower write and faster read (10b) designates the tier attribute giving a higher priority to the read speed than to the data reliability. The host 3 can execute the In-drive tiering control by designating the Faster write and slower read (01b) or the Slower write and faster read (10b).

Default is the writing method predetermined by the storage device 2. The writing method corresponding to Default may be the writing method giving a higher priority to data reliability than to the read speed or the writing method giving a higher priority to the read speed than to the data reliability.

The host 3 transmits the extended write command 90 to the storage device 2 and also transmits the write data to the storage device 2. The controller 14 of the storage device 2 writes the write data to the write buffer (WB) 20 (step S80), and sends to the host 3 the notice of command completion. After that, the controller 14 executes setting of the writing method to be executed (i.e., setting of program-verify steps, and setting of combination between ECC to be used and the code for data shaping to be used) (step S81), and writes the write data to the flash memory 16 using the set writing method (step S82), in accordance with the extended write command 90. The controller 14 updates the lookup table 19 and maps the LBA of the write data to the physical address of the physical storage location at which the write data is written.

FIG. 46 shows program-verify steps tuning processing executed based on a Write speed vs Data Retention control parameter.

When the data is written to the memory cell transistor, program-verify steps are repeatedly executed to raise the threshold voltage of the memory cell transistor up to a target voltage. The program operation and the verify operation are executed by one program-verify step. As explained above, the verify operation is an operation of confirming whether or not the target data is programmed in the memory cell transistor, by reading the data from the memory cell transistor.

If the Slower write and longer data retention is designated by the host 3, a threshold voltage of the memory cell transistor is raised up to a target voltage by repeatedly executing the program-verify steps, while raising the voltage applied to the memory cell transistor in units of first voltage width V1. For this reason, the first voltage width V1 is set at a comparatively small value. Therefore, the program-verify steps are executed at a comparatively large number of times until the threshold voltage of the memory cell transistor is raised up to the target voltage. Since a threshold voltage distribution of the memory cell transistor can be thereby optimized, margin between a threshold voltage distribution corresponding to a certain stored value and a threshold voltage distribution corresponding to another stored value becomes wide and, consequently, the data retention becomes long.

If the Faster write and shorter data retention is designated by the host 3, the threshold voltage of the memory cell transistor is raised up to the target voltage by repeatedly executing the program-verify steps, while raising the voltage applied to the memory cell transistor in units of second voltage width V2 greater than the first voltage width V1 applied to the memory cell transistor. For this reason, the threshold voltage of the memory cell transistor can be raised up to the target voltage by the program-verify steps at a smaller number of times than that in the Slower write and longer data retention. Since the program-verify steps are executed at a small number of times, the margin between a threshold voltage distribution corresponding to a certain stored value and a threshold voltage distribution corresponding to another stored value becomes narrow and, consequently, the data retention becomes short.

Figure 47:
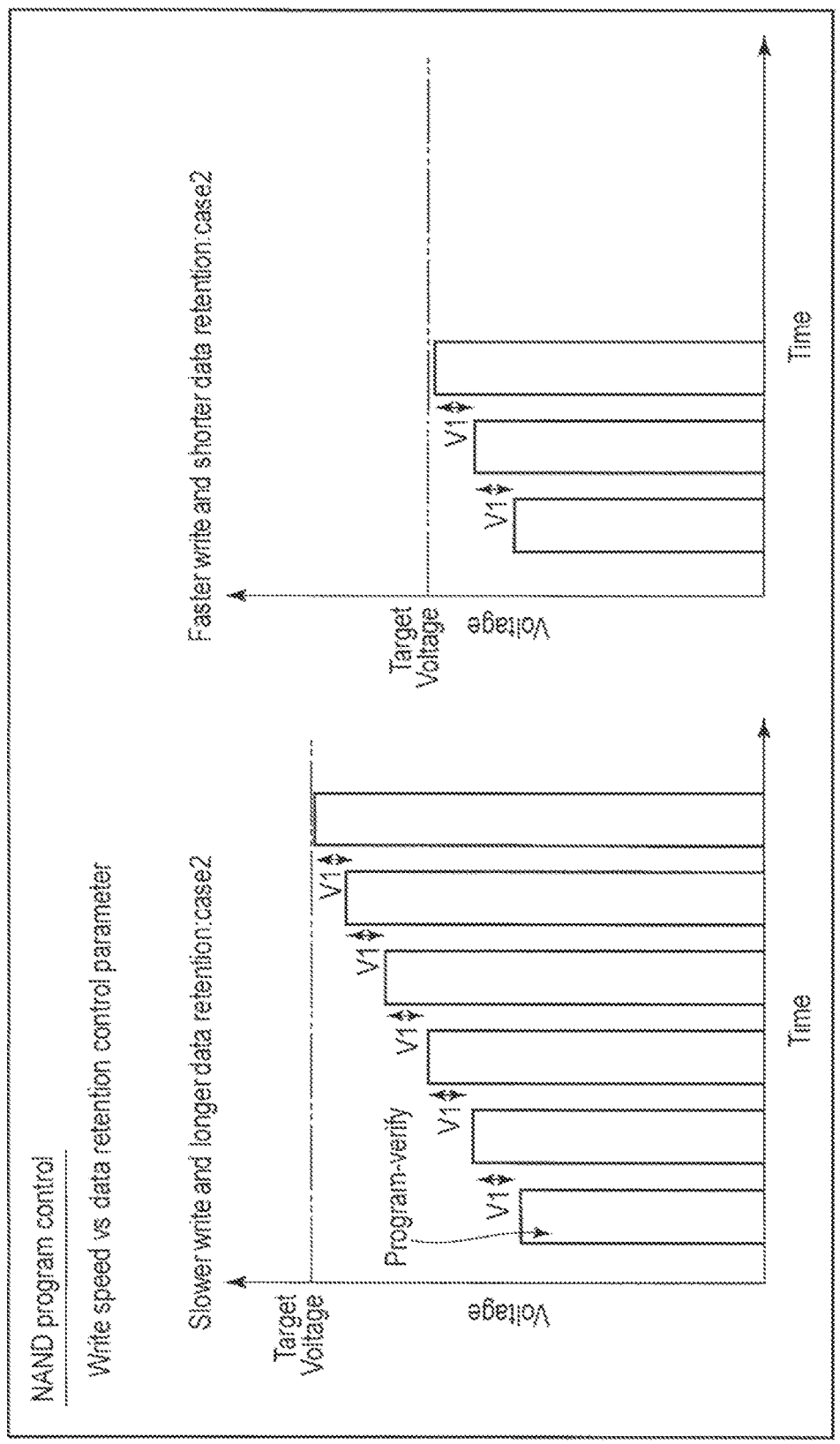
FIG. 47 illustrates another program-verify steps tuning processing executed by the storage device according to the embodiment.

FIG. 47 shows another program-verify steps tuning.

In the program-verify steps tuning shown in FIG. 47, a target voltage lower than the target voltage used in the Slower write, and longer data retention is used in the Faster write and shorter data retention. In this case, too, the number of program-verify steps that should be executed can be changed between the Faster write and shorter data retention and the Slower write and longer data retention.

FIG. 48 shows yet another program-verify steps tuning.

In the program-verify steps tuning shown in FIG. 48, a program-verify step time w2 shorter than a program-verify step time w1 used in the Slower write and longer data retention is used in the Faster write and shorter data retention. The program-verify step time is the time during the control voltage is applied to the memory cell transistor. By the program-verify steps tuning shown in FIG. 48, too, the number of program-verify steps that should be executed can be changed between the Faster write and shorter data retention and the Slower write and longer data retention.

Figure 49:
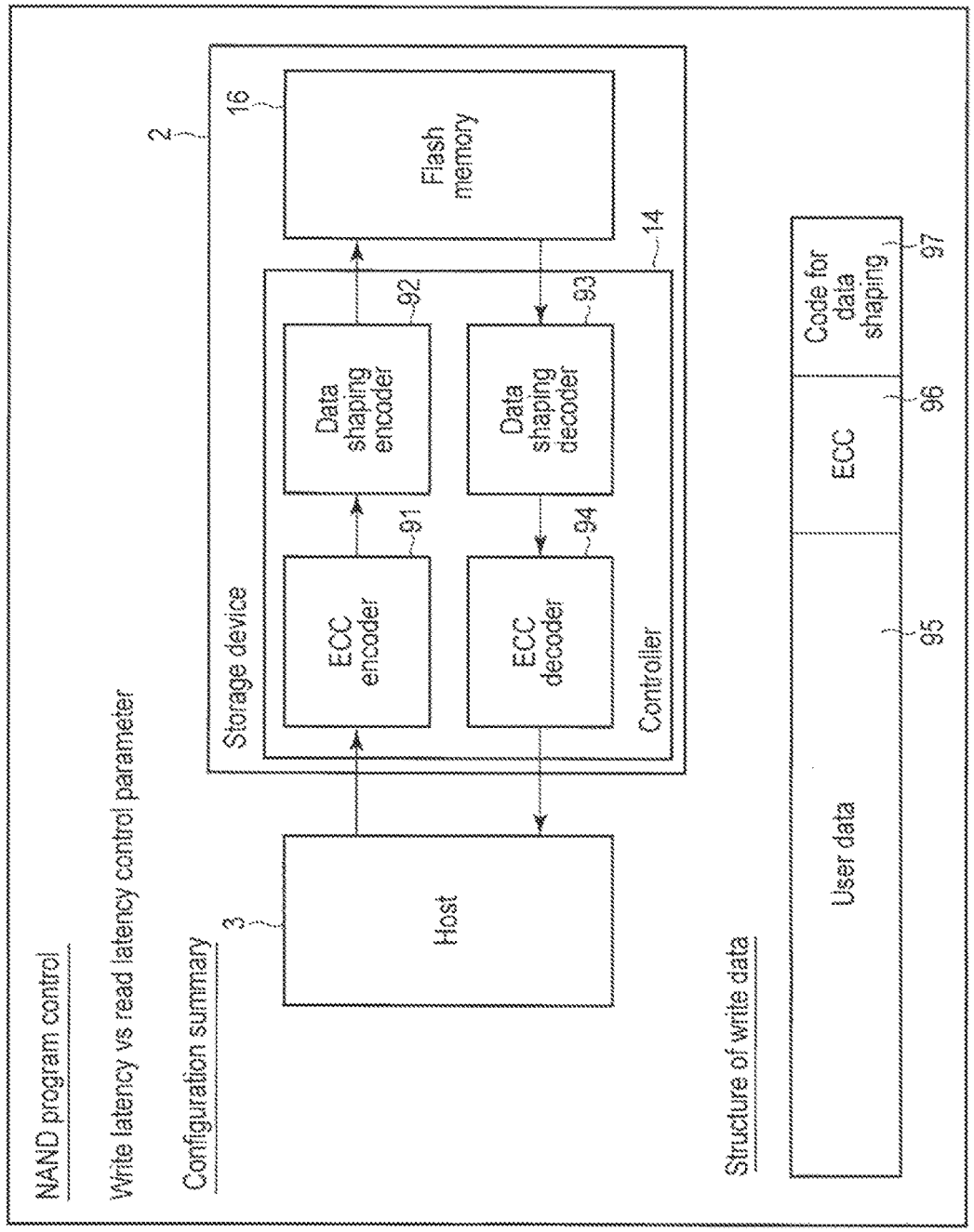
FIG. 49 illustrates ECC/Write shaping redundancy code tuning processing executed by the storage device according to the embodiment, based on a Write latency vs read latency control parameter in the extended write command shown in FIG. 44.

FIG. 49 shows ECC/Write shaping redundancy code tuning executed by the storage device of the embodiment, based on the Write latency vs read latency control parameter in the extended write command shown in FIG. 44.

The controller 14 includes an ECC encoder 91, a data shaping encoder 92, a data shaping decoder 93, and an ECC decoder 94. The ECC encoder 91 and the ECC decoder 94 execute encoding for producing the ECC, and ECC decoding for error correction, respectively. The data shaping encoder 92 and the data shaping decoder 93 execute encoding for producing a code for data shaping, and decoding for the code for data shaping, respectively. User data 95, which is the write data, is written to the flash memory 16 in a state in which ECC 96 and a code 97 for data shaping are added to the data. The code 97 for data shaping (write shaping redundancy code) is a code for preventing the conflict between memory cells. Codes applicable to the code 97 for data shaping are a constraint code, an endurance code, etc. The constraint code is a code for limiting a data pattern of the write data so as to avoid a worst data pattern in which the conflict between memory cells can easily occur. The endurance code is a code for producing a data pattern having little wear in the memory cells.

In the present embodiment, in the Faster write and slower read, the data reliability is primarily secured by the ECC. For this reason, combination of the ECC (for example, LDPC, etc.) having a high reliability assurance capability and the code for data shaping having a comparatively low reliability assurance capability is used in the Faster write and slower read. In this case, high data reliability can be achieved by the ECC, but the read speed is lowered due to the increase in processing time of the ECC decoder 94. In addition, since the processing time of the data shaping encoder 92 can be reduced by the code for data shaping having a comparatively low reliability assurance capability, a comparatively high write speed can be achieved.

In contrast, in the Slower write and faster read, the data reliability is primarily secured by the code for data shaping. For this reason, in the Slower write and faster read, combination of the ECC (for example, BCH, etc.) having a low reliability assurance capability than the ECC in the Faster write and slower read, and the code for data shaping having a high reliability assurance capability than that in the Faster write and slower read, is used. In this case, since a high error correction capability of the ECC cannot be obtained, the data reliability is lower than the reliability in the Faster write and slower read. Since the processing time of the ECC decoder 94 is not increased, the read speed of SSD is not lowered. The processing time of the data shaping encoder 92 is increased, but the increase in processing time of the data shaping encoder 92 hardly influences the lowering of the read speed. This is because the SSD has a characteristic that the read speed is remarkably higher than the write speed and a rate of write latency of the data shaping encoder 92 to the entire write latency of the SSD is small.

A flowchart of FIG. 50 shows steps of the program-verify steps tuning and ECC/Write shaping redundancy code tuning.

The controller 14 checks a value of the Write speed vs data retention control parameter in the extended write command 90, and determines which of the Faster write and shorter data retention (01b) and the Slower write and longer data retention (10b) is designated by the extended write command 90 (step S83).

When the Faster write and shorter data retention (01b) is designated by the extended write command 90, the controller 14 determines programming at a smaller number of program-verify steps (step S84). In step S84, the controller 14 may determine using the writing method of repeatedly executing the program-verify steps while raising the voltage applied to the memory cell transistor in units of the second voltage width V2.

When the Slower write and longer data retention (10b) is designated by the extended write command 90, the controller 14 determines to program at a greater number of program-verify steps (step S85). In step S85, the controller 14 may determine to employ the writing method of repeatedly executing the program-verify steps while raising the voltage applied to the memory cell transistor in units of the first voltage width V1 smaller than the second voltage width V2.

The controller 14 checks a value of the Write latency vs read latency control parameter in the extended write command 90, and determines which of the Faster write and slower read (01b) and the Slower write and faster read (10b) is designated by the extended write command 90 (step S86).

When the Faster write and slower read (01b) is designated by the extended write command 90, the controller 14 determines to use a combination of the code for data shaping having a low reliability assurance capability and the ECC having a high reliability assurance capability (step S87).

When the Slower write and faster read (10b) is designated by the extended write command 90, the controller 14 determines to use a combination of the code for data shaping having a high reliability assurance capability and the ECC having a low reliability assurance capability (step S88).

The controller 14 writes the data to the flash memory 16 by using the tuned number of program-verify steps, and the tuned ratio between the reliability assurance capability of ECC and the reliability assurance capability of the code for data shaping (step S89).

In the present embodiment, the extended write command 90 includes both the Write speed vs data retention control parameter and the Write latency vs read latency control parameter. However, the extended write command 90 may include either the Write speed vs data retention control parameter or the Write latency vs read latency control parameter.

<7. QoS in Namespace Level>

Next, QoS in namespace level will be described in detail with reference to FIG. 51 to FIG. 55.

FIG. 51 shows a summary of the function of the QoS in namespace level.

In the present embodiment, the controller 14 of the storage device 2 executes control for sharing a NAND block pool 98, which is the physical resource of the storage device 2, among a plurality of namespaces NS#0, NS#1, and NS#2, or a plurality of streams #0, #1 and #3. The NAND block pool 98 corresponds to the above-described free block pool 44.

A configuration that the NAND block pool 98 is shared among the namespaces NS#0, NS#1, and NS#2 or the streams #0, #1, and #3 enables the physical resource to be efficiently allocated to namespaces or streams that require the physical resource.

In the configuration that the NAND block pool 98 is shared among the namespaces NS#0, NS#1, and NS#2 or the streams #0, #1, and #3, if a write access to a certain namespace or stream is concentrated, a great amount of free block in the NAND block pool 98 which is the shared physical resource may be consumed by the namespace or stream. In this case, since the amount of the free space in the shared physical resource is reduced, sufficient performance cannot be assured for the other namespace or the other stream.

The function of QoS in namespace level enables a desired amount of exclusive free space to be allocated to the appropriate namespace or stream, in an environment in which the physical resource is shared among the namespaces NS#0, NS#1, and NS#2 or the streams #0, #1, and #3. The host 3 can designate the amount of exclusive free space which should be allocated, for each namespace or each stream. Different amounts of exclusive free space can be thereby reserved for each namespace or stream as a minimum amount of independent free space.

For example, a large amount of exclusive free space may be allocated to the namespace NS#1 and a small amount of exclusive free space may be allocated to the namespace NS#2.

The exclusive free space allocated to the namespace NS#1 is a minimum amount of exclusive free space which is available without conflict between the namespaces. Therefore, even if much free block is consumed by the other namespaces, minimum QoS can be guaranteed for the namespace NS#1 no matter.

Similarly, the exclusive free space allocated to the namespace NS#2 is also a minimum amount of exclusive free space which is available without conflict between the namespaces. Therefore, even if much free block is consumed by the other namespaces, minimum QoS can be guaranteed for the namespace NS#2.

The host 3 can designate the namespace (or stream) for which certain minimum QoS is to be assured and cause the storage device 2 to assure the designated amount of free space for the designated namespace (or stream). Therefore, even if write access to a certain namespace (or stream) is concentrated, writing at least the data of the amount corresponding to the designated amount of free space, at a stable rate, can be guaranteed.

As a result, a necessary minimum performance can be guaranteed for each stream (or namespace) while using the architecture in which the physical resource is shared by the streams or namespaces.

Figure 52:
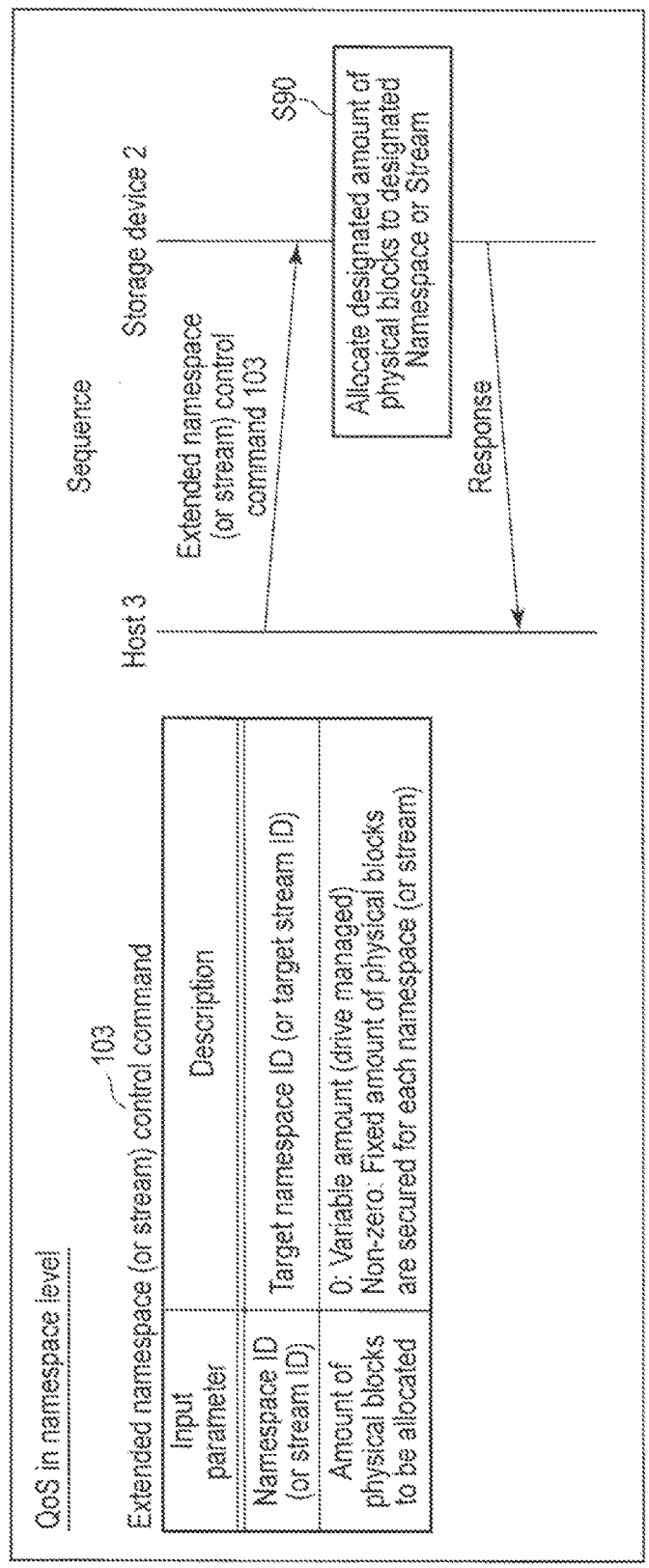
FIG. 52 illustrates data structure of the extended namespace (or stream) control command applied to the storage device and a processing sequence of the command.

FIG. 52 shows an extended namespace (or stream) control command for the QoS in namespace level and a processing sequence of the command.

The extended namespace (or stream) control command 103 is a control command for controlling the namespace (or stream). The extended namespace (or stream) control command 103 may be the create namespace command or the open stream command.

The extended namespace (or stream) control command 103 includes input parameters listed below.

(1) Namespace ID or Stream ID
(2) Amount of physical blocks to be allocated

Namespace ID or Stream ID indicates a target namespace to which the minimum mount of exclusive free space should be allocated or a target stream to which the minimum amount of exclusive free space should be allocated.

Amount of physical blocks to be allocated indicates an amount of physical blocks (amount of free space) which should be allocated to the target namespace (or the target stream).

If Amount of physical blocks to be allocated is zero, the controller 14 may allocate a predetermined amount of (drive managed) physical blocks to the target namespace (or the target stream). Alternatively, the controller 14 may not allocate the physical blocks to the target namespace (or the target stream).

If Amount of physical blocks to be allocated id not zero, the physical blocks of the amount designated by the input parameter are secured for the target namespace (or the target stream).

For example, the host 2 transmits the extended namespace (or stream) control command 103 to the storage device 2, at creating the namespace or opening the stream. The controller 14 of the storage device 2 allocates the physical block of the amount designated by the extended namespace (or stream) control command 103 to the target namespace (or the target stream) designated by the extended namespace (or stream) control command 103. The physical block of the designated amount is used as a minimum amount of free space (reserved free space) exclusive for the target namespace (or the target stream).

FIG. 53 shows the reserved free space secured for each namespace. The free block pool 44 includes a plurality of reserved free spaces corresponding to a plurality of namespaces. A reserved free space 67 for NS #0 is a minimum amount of free space exclusive for the namespace #0. A reserved free space 67 for NS #1 is a minimum amount of free space exclusive for the namespace #1. A reserved free space 67 for NS #2 is a minimum amount of free space exclusive for the namespace #2.

Each of the amounts of the reserved free space 67 for NS #0, the reserved free space 67 for NS #1, and the reserved free space 67 for NS #2 can be increased by a desired amount as needed, by performing the advanced garbage collection (GC) control (the host initiated garbage collection control command 74 or the idle garbage collection control command 75).

FIG. 54 shows the reserved free space secured for each stream. The free block pool 44 includes a plurality of reserved free spaces corresponding to a plurality of streams. A reserved free space 66 for stream #0 is a minimum amount of free space exclusive for the stream #0. A reserved free space 66 for stream #1 is a minimum amount of free space exclusive for the stream #1. A reserved free space 66 for stream #2 is a minimum amount of free space exclusive for the stream #2.

Each of the amounts of the reserved free spaces 66 can be increased by a desired amount as needed, by performing the advanced garbage collection (GC) control (the host initiated garbage collection control command 74 or the idle garbage collection control command 75).

<8. Advanced Multi Stream Control>

Next, the advanced multi stream control will be described in detail with reference to FIG. 55 to FIG. 58.

FIG. 55 shows a function of the advanced multi stream control.

As described above, the advanced multi stream control enables a plurality of namespaces and a plurality of streams to be present together in the storage device 2.

A horizontal axis in FIG. 55 indicates a logical address space of the storage device 2 while a vertical axis in FIG. 55 indicates the physical resource of the storage device 2.

In the present embodiment, the logical address space of the storage device 2 is divided into a plurality of logical address spaces corresponding to a plurality of namespaces NS#0, NS#1, NS#2, and NS#3.

In the present embodiment, the lookup table for managing the mapping between the LBAs and the physical addresses is divided for the respective namespaces to enable each of the namespaces NS#0, NS#1, NS#2, and NS#3 to operate as a completely independent logical drive. In other words, the controller 14 manages each mapping between the logical addresses (LBAs) and the physical addresses in units of namespaces, by using the lookup tables (LUT#0, LUT#1, LUT#2, and LUT#3) corresponding to the namespaces NS#0, NS#1, NS#2, and NS#3. The controller 14 can execute the independent garbage collection operation for each namespace, using the LUT#0, LUT#1, LUT#2, and LUT#3.

In the present embodiment, the physical resource is divided into a plurality of streams. Each stream is associated with at least one namespace.

In FIG. 55, the stream #0 is associated with the namespace NS#0 alone. Therefore, the blocks allocated to the stream #0 are referred to by the namespace NS#0 alone, and conflict between the namespaces does not occur in the blocks allocated to the stream #0.

The stream #1 is associated with four namespaces NS#0, NS#1, NS#2, and NS#3. The blocks allocated to the stream #1 are therefore shared among the namespaces NS#0, NS#1, NS#2, and NS#3. In each of the blocks allocated to the stream #1, data corresponding to four namespaces NS#0, NS#1, NS#2, and NS#3 can exist together.

The stream #2 is associated with the namespace NS#0 alone. Therefore, the blocks allocated to the stream #2 are referred to by the namespace NS#0 alone, and conflict between the namespaces does not occur in the blocks allocated to the stream #0.

The stream #3 is associated with two namespace NS#1 and NS#2. The blocks allocated to the stream #3 are therefore shared by the namespaces NS#1 and NS#2. In each of the blocks allocated to the stream #3, data corresponding to two namespaces NS#1 and NS#2 can exist together.

As for the namespace NS#0, the data associated with the stream #0, the data associated with the stream #1, and the data associated with the stream #2 are written to different blocks, respectively. In contrast, the data corresponding to the namespace NS#0 and the data corresponding to the other namespaces NS#1, NS#2, and NS#3 are allowed to be written to the blocks allocated to the stream #1.

FIG. 56 shows relationships between the namespaces NS#0, NS#1, NS#2, and NS#3, and the lookup tables LUT#0, LUT#1, LUT#2, and LUT#3.

The lookup table LUT#0 manages mapping information between the logical addresses (LBAs) and the physical addresses, of the namespace NS#0. The lookup table LUT#1 manages mapping information between the logical addresses (LBAs) and the physical addresses, of the namespace NS#1. The lookup table LUT#2 manages mapping information between the logical addresses (LBAs) and the physical addresses, of the namespace NS#2. The lookup table LUT#3 manages mapping information between the logical addresses (LBAs) and the physical addresses, of the namespace NS#3.

FIG. 57 shows an extended open stream command for the advanced multi stream control, return data of extended open stream command, and a processing sequence of the extended open stream command.

The extended open stream command 111 is a control command for designating the tier attribute corresponding to the stream, a minimum amount of exclusive free space which should be allocated to the stream, and namespace ID(s) to which the stream should be allocated.

The extended open stream command 111 includes input parameters listed below.

(1) Tier attribute
(2) Amount of physical blocks to be allocated
(3) Namespace ID Tier attribute indicates the tier attribute which should be applied to the stream to be opened.

The tier attribute applicable to the stream may be any one of the tier attribute for designating the SLC/MLC/TLC writing method, the tier attribute for designating the Faster write and shorter data retention/Slower write and longer data retention, and the tier attribute for designating the Faster write and slower read/Slower write and faster read.

The example of using the tier attribute for designating the SLC/MLC/TLC writing method will be described here.

Relationships between the values of the Tier attribute and the applied writing methods are described below.

00b: HOT (allocate SLC block)
01b: Cold (allocate MLC block)

When the value of the Tier attribute is 00b, the controller 14 allocates the SLC block to the opened stream, and writes the data associated with the stream to the SLC block by the SLC writing method. In contrast, when the value of the Tier attribute is 01b, the controller 14 allocates the MLC block to the opened stream, and writes the data associated with the stream to the MLC block by the MLC writing method.

Amount of physical blocks to be allocated indicates the amount of physical blocks (amount of free space) which should be allocated to the opened stream.

If Amount of physical blocks to be allocated is zero, the controller 14 may allocate a predetermined amount of (drive managed) physical blocks to the stream. Alternatively, the controller 14 may not allocate the physical blocks to the stream.

If Amount of physical blocks to be allocated is not zero, the physical blocks of the amount designated by the input parameter are secured for the stream.

Namespace ID indicates ID of at least one namespace which should be associated with the stream.

The return data 112 of extended open stream command includes a parameter below.

(1) Stream ID

Stream ID indicates a stream ID of the opened stream.

The host 2 transmits the extended open stream command 111 to the storage device 2. The controller 14 of the storage device 2 executes processing of opening a new stream. In this case, the controller 14 allocates a new stream ID different from the stream ID of each of the currently opened streams, to a newly opened stream (step S92).

The controller 14 allocates an input block (SLC block or MLC block) to the newly opened stream, and further allocates the physical block (SLC block or MLC block) of the amount designated by the extended open stream command 111 to the newly opened stream (step S93). The physical block of the designated amount is used as a minimum amount of free space (reserved free space) exclusive for the stream.

FIG. 58 shows the extended write command for the advanced multi stream control and a processing sequence of the command.

The extended write command 113 includes input parameters listed below.
(1) Starting LBA
(2) Sector count
(3) Stream ID
(4) Namespace ID The host 3 transmits the extended write command 113 including the Stream ID and the Namespace ID to the storage device 2. The host 3 transmits the write data to the storage device 2. The controller 14 of the storage device 2 writes the write data to the write buffer (WB) 20 (step S94), and sends to the host 3 a notice of command completion. After that, the controller 14 writes the write data to the block allocated to the Stream ID, in the writing method corresponding to the tier attribute of the Stream ID (step S95). In step S95, the controller 14 updates the lookup table corresponding to the Namespace ID and maps the LBAs corresponding to the write data to the physical address corresponding to the physical storage location at which the write data has been written.

<9. Data Compression Control>

Next, data compression control will be described in detail with reference to FIG. 59 to FIG. 65.

FIG. 59 shows a function of the Data Compression Control.

As shown in FIG. 59, the controller 14 includes a compression engine 118 and a de-compression engine 119 besides the ECC encoder 91, the data shaping encoder 92, the data shaping decoder 93, and the ECC decoder 94. The compression engine 118 and the de-compression engine 119 may be implemented by the same hardware circuit or different hardware circuits.

The compression engine 118 executes processing for lossless-compressing the write data. The de-compression engine 119 executes processing for de-compressing the compressed data.

The write data is compressed by the compression engine 118, and the compressed data is written to the flash memory 16. A certain type of write data, for example, write data having the size of 50 MB or 100 MB can be compressed to data of the size of several KB by the compression engine 118. The data read from the flash memory 16 is de-compressed by the de-compression engine 119.

The write latency and the read latency increase in a case of writing the write data via the compression engine 118. Furthermore, since the compression engine 118 generally consumes much power, the power consumption of the storage device 2 is also increased.

An effect of the data compressing function is greatly varied depending on the data type. When the write data is data encrypted by the host 3 or data which has been compressed by the host 3, the effect of the data compressing function of the compression engine 118 is small. Therefore, if the data compressing function is applied to such data, the size of the data cannot be reduced, and the write latency and the read latency may increase and the power consumption may result.

The function of the data compression control enables the host 3 to designate any one of (1) the writing method of compressing the data and writing the compressed data to the block of the flash memory 16, (2) the writing method of writing the write data to the block without compressing the data, and (3) the writing method of writing the data to the block without compressing the data and of compressing the data at the garbage collection of the block.

Figure 60:
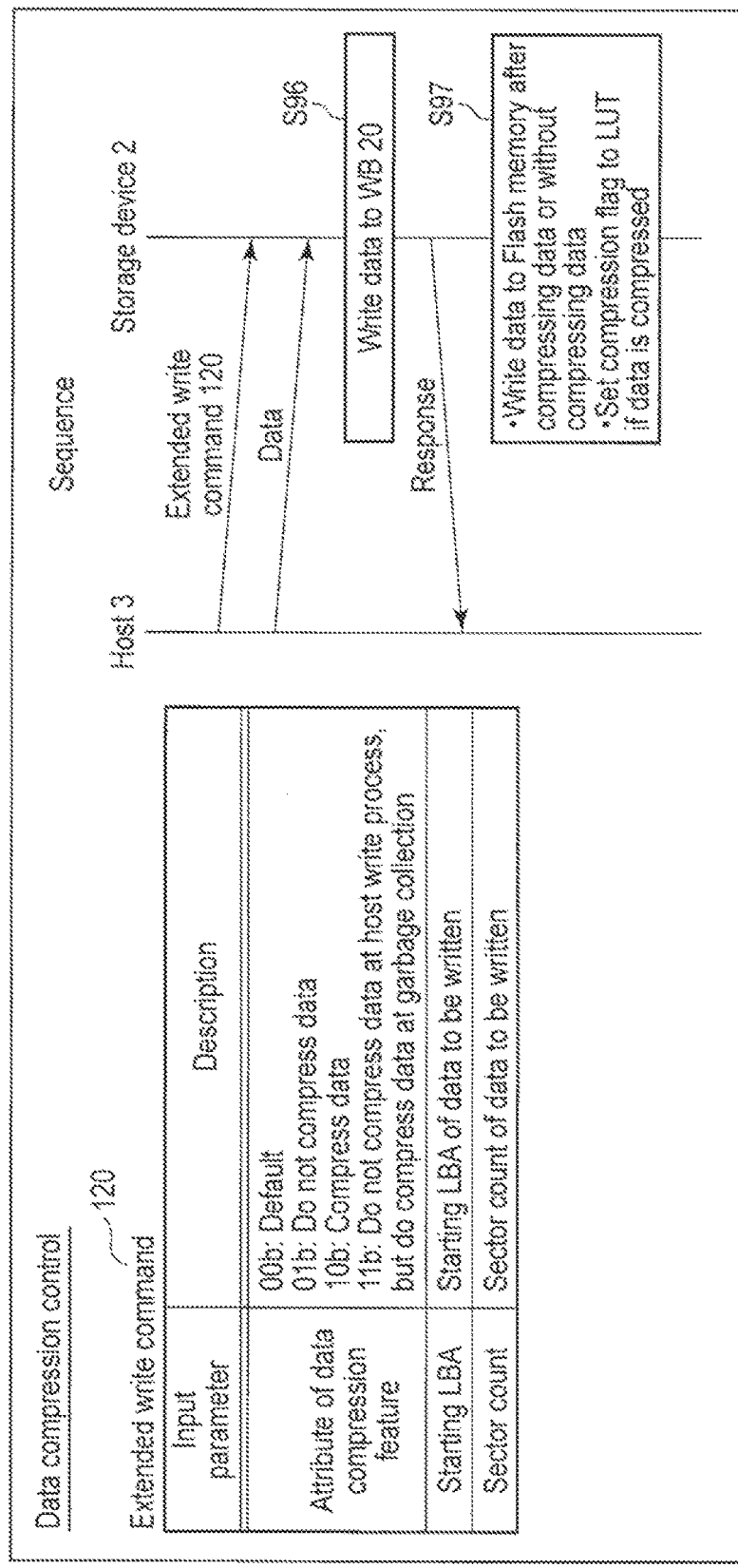
FIG. 60 illustrates data structure of the extended write command sent to the storage device for data compression control and a processing sequence of the command.

FIG. 60 shows the extended write command for the data compression control and a processing sequence of the command.

The extended write command 120 includes input parameters listed below.
(1) Attribute of data compression feature
(2) Starting LBA
(3) Sector count Attribute of data compression feature indicates a writing method which should be used for the write data. Relationships between the input parameter values of the Attribute of data compression feature and the applied writing methods are described below.
00b: Default
01b: Do not compress data
10b: Compress data
11b: Do not compress data at host write process, but do compress data at garbage collection 00b designates the writing method corresponding to Default. The writing method corresponding to Default is the writing method predetermined by the storage device 2. The writing method corresponding to Default may be any one of (1) the writing method of compressing the data and writing the compressed data to the block of the flash memory 16, (2) the writing method of writing the write data to the block without compressing the data, and (3) the writing method of writing the data to the block without compressing the data and of compressing the data during the garbage collection of the block.

01b designates the writing method of writing the data to the block without compressing the data.

10b designates the writing method of compressing the data and writing the compressed data to the block of the flash memory 16.

11b designates the writing method of writing the data to the block without compressing the data and of compressing the data at the garbage collection of the block.

The host 3 transmits the extended write command 120 which designates the Attribute of data compression feature, to the storage device 2. The host 3 transmits the write data to the storage device 2. The controller 14 of the storage device 2 holds the value of the Attribute of data compression feature, writes the write data to the write buffer (WB) 20 (step S96), and sends to the host 3 a notice of command completion.

After that, the controller 14 writes the write data to the block in the flash memory 16 using the writing method designated by the value of the Attribute of data compression feature (step S97).

When the value of the Attribute of data compression feature is 01b or 11b, the controller 14 writes the write data in the write buffer (WB) 20 to the block without compressing the write data. The controller 14 updates the lookup table 19 and maps the LBA of the write data to the physical address of the physical storage location at which the write data has been written.

When the value of the Attribute of data compression feature is 10b, the controller 14 compresses the write data in the write buffer (WB) 20 and writes the compressed data to the block. The controller 14 updates the lookup table 19, maps the LBA of the write data to the physical address of the physical storage location at which the write data has been written, and further associates a compression flag to the LBA of the write data.

FIG. 61 shows a configuration example of the lookup table 19 configured to hold the compression flag. When the controller 14 receives the read command from the host 3, the controller 14 determines whether or not the data requested to be read is compressed, by referring to the lookup table 19. If the data requested to be read is compressed, the compressor 14 de-compresses the data read from the flash memory 16 and transmits the de-compressed data to the host 3.

FIG. 62 shows the data compression control operation for compressing the data during the garbage collection operation.

When the value of the Attribute of data compression feature is 01b or 11b, the controller 14 writes the write data to the block (input block) without compressing the write data. The block is selected later as the target block for the garbage collection. During the garbage collection of the block, the controller 14 compresses the data and copies the compressed data to the other block. The controller 14 updates the lookup table 19, maps the LBA of the compressed data to the physical address corresponding to the physical storage location of the block to which the compressed data is moved, and further associates the compression flag to the LBA of the compressed data.

Figure 63:
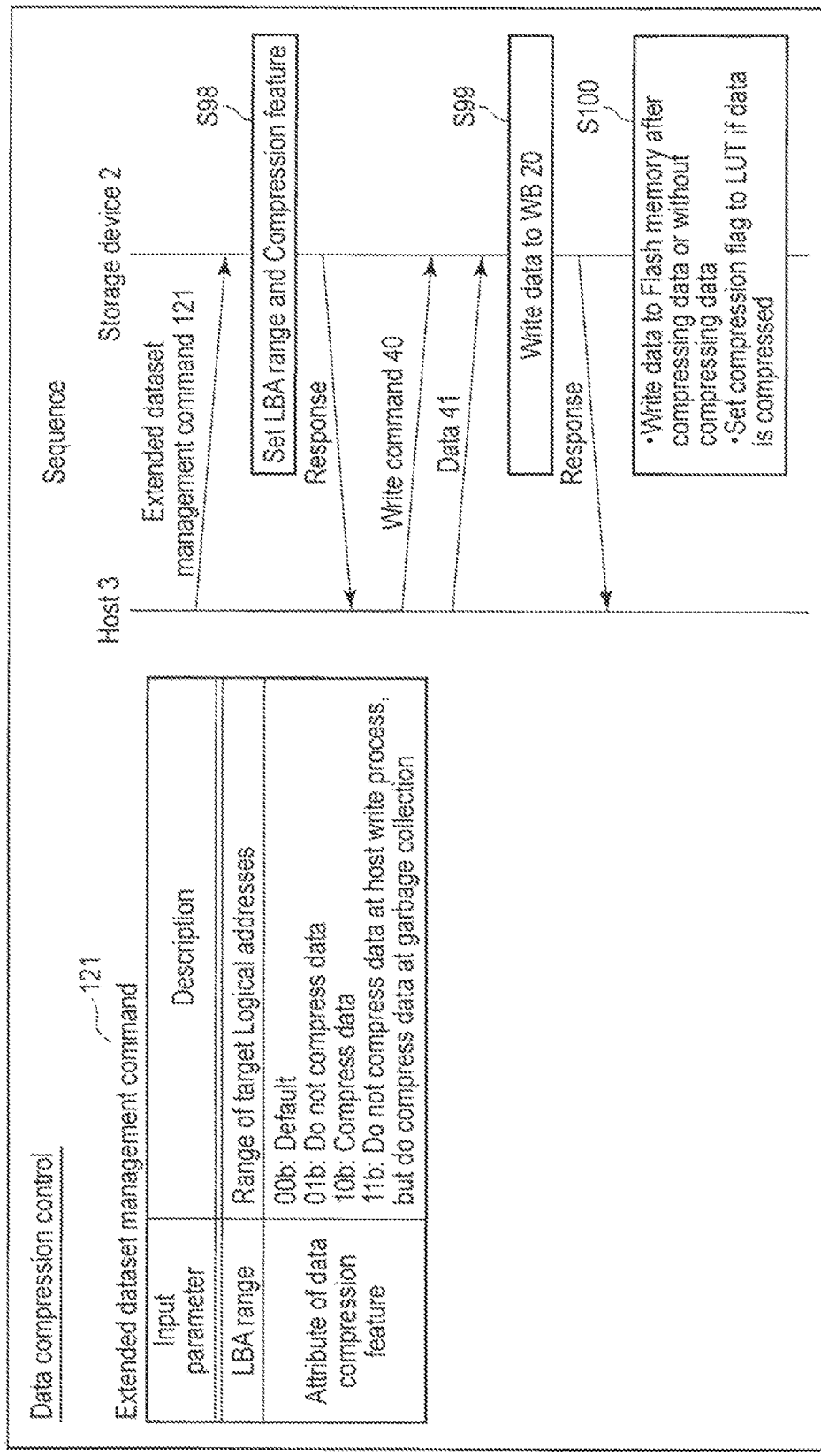
FIG. 63 illustrates data structure of an extended dataset management command sent to the storage device and a processing sequence of the command.

FIG. 63 shows the extended dataset management command for the data compression control and a processing sequence of the command.

The extended dataset management command 121 designates the LBA range and then designates the data compression control which should be performed for the write data corresponding to the LBA range.

The extended dataset management command 121 includes input parameters listed below.

(1) LBA range
(2) Attribute of data compression feature

LBA range indicates a logical address range which should be a target of the data compression control.

Attribute of data compression feature indicates the writing method which should be employed for the write data, similarly to the extended write command 120. Relationships between the input parameter values of the Attribute of data compression feature and the applied writing methods are described below.

00b: Default
01b: Do not compress data
10b: Compress data
11b: Do not compress data at host write process, but do compress data at garbage collection The host 3 transmits to the storage device 2 the extended dataset management command 121 which designates the LBA range and the Attribute of data compression feature. The controller 14 of the storage device 2 sets the LBA range and the Attribute of data compression feature corresponding to the LBA range (step S98), and sends to the host 3 the notice of command completion.

The host 3 transmits the write command 40 to the storage device 2 and also transmits the write data 41 to the storage device 2. The controller 14 writes the write data 41 to the write buffer (WB) 20 (step S99), and sends to the host 3 the notice of command completion.

When the LBA(s) of the write data belongs to the set LBA range, the controller 14 writes the write data to the block in the flash memory 16 using the writing method designated by the value of the Attribute of data compression feature corresponding to the set LBA range (step S100). When the LBA(s) of the write data does/do not belong to the set LBA range, the controller 14 writes the write data to the block in the flash memory 16 using the writing method of Default.

FIG. 64 shows the extended stream (namespace) control command for the data compression control and a processing sequence of the command.

The extended stream (namespace) control command 122 designates the target stream (or the target namespace) and then designates the data compression control which should be applied to the write data corresponding to the target stream (or the target namespace). The extended stream (namespace) control command 122 may be an open stream command or a create namespace command.

The extended stream (namespace) control command 122 includes input parameters listed below.

(1) Stream ID or Namespace ID
(2) Attribute of data compression feature

Stream ID or Namespace ID indicates the ID of the stream which should be a target of the data compression control or the ID of the namespace which should be a target of the data compression control.

Attribute of data compression feature indicates the writing method which should be applied to the write data, similarly to the extended write command 120. Relationships between the input parameter values of the Attribute of data compression feature and the applied writing methods are described below.

00b: Default
01b: Do not compress data
10b: Compress data
11b: Do not compress data at host write process, but do compress data at garbage collection The host 3 transmits to the storage device 2 the extended stream (namespace) control command 122 which designates both the ID of the target stream (or the ID of the namespace) and the Attribute of data compression feature. The controller 14 of the storage device 2 sets both the ID of the target stream (or the ID of the namespace) and the Attribute of data compression feature corresponding to the target stream (or the target namespace) (step S101), and sends to the host 3 the notice of command completion.

The host 3 transmits the write command 40 including the stream ID or the namespace ID to the storage device 2 and also transmits the write data 41 to the storage device 2. The controller 14 writes the write data 41 to the write buffer (WB) 20 (step S102), and sends to the host 3 the notice of command completion.

When the stream ID or the namespace ID designated by the write command 40 matches the ID of the set target stream or the ID of the set target namespace, the controller 14 writes the write data to the block in the flash memory 16 using the writing method designated by the value of the Attribute of data compression feature corresponding to the ID of the set target stream or the ID of the set target namespace (step S103).

When the stream ID or the namespace ID designated by the write command 40 does not match the ID of the set target stream or the ID of the set target namespace, the controller 14 writes the write data to the block in the flash memory 16 using the writing method of Default.

A flowchart of FIG. 65 shows process of compressing the data (target data) written without being compressed during the garbage collection.

When the controller 14 starts the garbage collection operation of the block in which the target data is stored (YES in step S111), the controller 14 determines whether or not the target data has been compressed by the previous garbage collection operation, by referring to the compression flag of the lookup table 19 (step S112).

If the target data is compressed (YES in step S112), the controller 14 copies the target data to the other block without passing the target data through the compression engine 118, i.e., without compressing the target data (step S113). The controller 14 updates the lookup table 19 and maps the LBA of the target data to the physical address of the physical storage location at which the target data is copied.

If the target data is not compressed (NO in step S112), the controller 14 compresses the target data by the compression engine 118, and copies the compressed target data to the other block (step S114). The controller 14 updates the lookup table 19, maps the LBA of the target data to the physical address of the physical storage location at which the target data is copied, and further associates a compression flag to the LBA of the target data.

If copying all valid data in this block is completed (YES in step S115), the controller 14 erases the block and set the block to be a free block (step S116).

<10. Data Lifetime Timer Control>

Next, data lifetime timer control will be described in detail with reference to FIG. 66 to FIG. 69.

The data lifetime timer control enables for the storage device 2 unneeded data and data of small importance to be positively invalidated, similarly to the effective "hand shake" GC.

As described above, examples of such data include data having original data stored in the other storage, such as read cache data, temporary files, work files, and data used only for a certain period of time such as temporary data. Even if such data is positively erased after a certain period of time elapses, no problems occur.

The function of the data lifetime timer control enables the host 3 to preliminarily notify the storage device 2 of the lifetime of the data, and enables the data to be automatically invalidated when a period of time corresponding to the lifetime elapses. Thus, WAF can be improved by reducing the data copy amount in the garbage collection, and the performance and lifetime of the storage device 3 can be improved by increasing the over-provisioning area.

Figure 66:
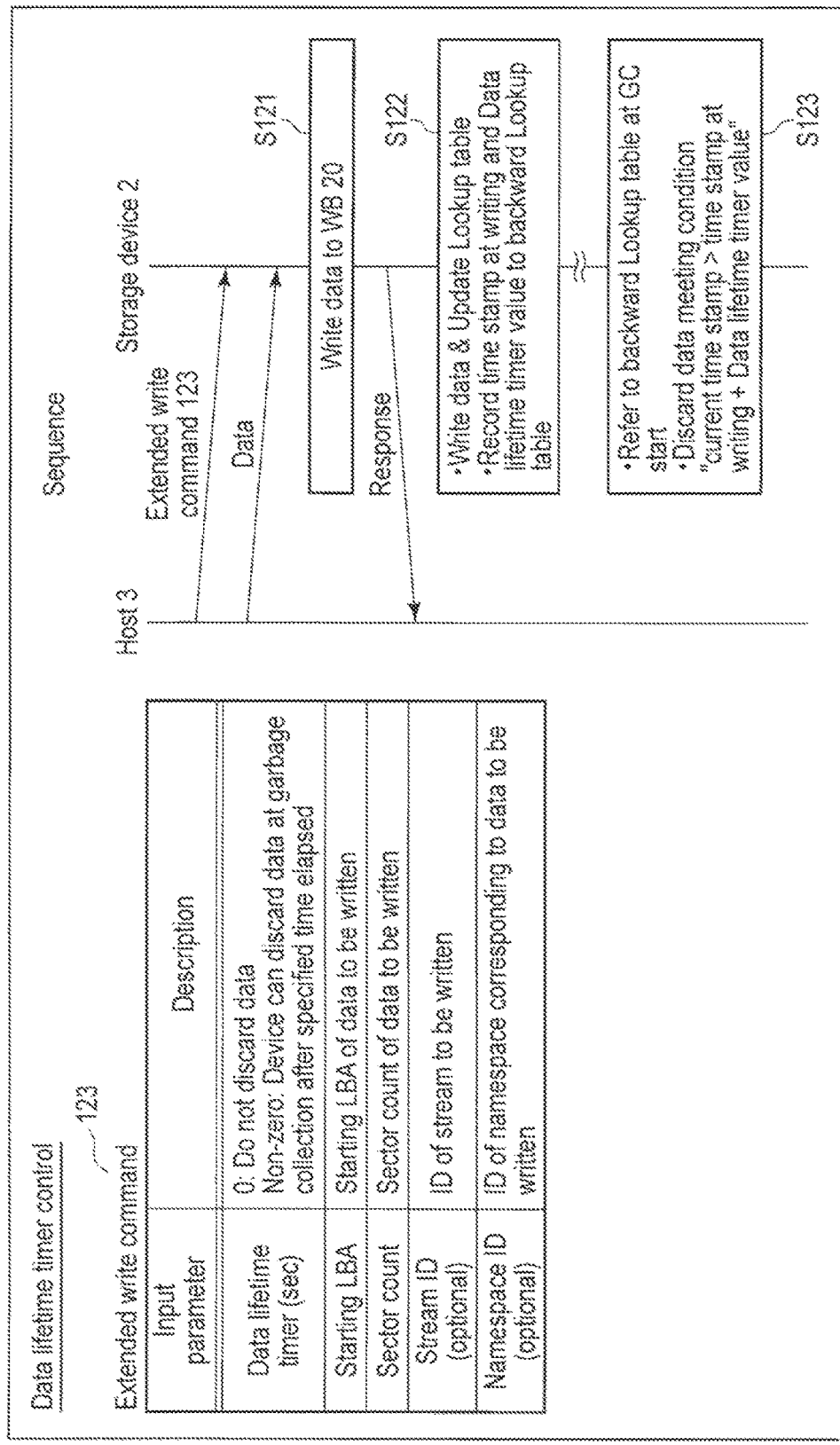
FIG. 66 illustrates data structure of the extended write command sent to the storage device for data lifetime timer control and a processing sequence of the command.

FIG. 66 shows the extended write command for the data lifetime timer control and a processing sequence of the command.

The extended write command 123 is a write command capable of designating a lifetime of the write data.

The extended write command 123 includes input parameters listed below.

(1) Data lifetime timer (sec)
(2) Starting LBA
(3) Sector count
(4) Stream ID (optional)
(5) Namespace ID (optional)

Data lifetime timer indicates a lifetime (expected lifetime) of the write data designated by Sector count and Starting LBA in the extended write command 123. The lifetime of the write data indicates a period in which the write data is considered to be used effectively.

The host 3 transmits the extended write command 123 which designates the lifetime of the write data to the storage device 2. The host 3 transmits the write data to the storage device 2. The controller 14 of the storage device 2 writes the write data to the write buffer (WB) 20 (step S121), and sends to the host 3 the notice of command completion. After that, the controller 14 writes the write data to the block in the flash memory 16, updates the lookup table 19, and maps the LBA of the write data to the physical address of the physical storage location at which the write data has been written (step S122). In step S122, the controller 14 further records both a time stamp at the data write and a lifetime (DLT: Data lifetime timer) of the write data, or a sum of the time stamp at the data write and the lifetime (DLT: Data lifetime timer) of the write data, in the backward lookup table 19A in the lookup table 19 (step S122). FIG. 67 shows an example of the backward lookup table 19A corresponding to a case of writing both a time stamp at the data write and the lifetime (DLT: Data lifetime timer) of the write data.

The time stamp at the data write indicates the time when the write data has been written.

A sum of the time stamp at the data write and the lifetime (DLT: Data lifetime timer) of the write data is hereinafter called a life end time (LET).

When the controller 14 starts the garbage collection operation, the controller 14 selects the target block for the garbage collection from the active block pool 43. Then, the controller 14 executes processing for discarding (invalidating) data in the target block, which meets a condition "current time stamp>LET (=time stamp at the data write+ Data lifetime timer)", by referring to the backward lookup table 19A (step S123). More specifically, in step S123, the controller 14 executes the garbage collection operation for collecting from the target block the only valid data which meets the condition "current time stamp<LET (=time stamp at the data write+Data lifetime timer)".

FIG. 68 shows the extended open stream command for the data lifetime timer control and a processing sequence of the command.

The extended open stream command 124 is a control command for designating the lifetime of the data associated with a target stream which should be opened.

The extended open stream command 124 includes an input parameter below.

(1) Data Lifetime Timer (Sec)

Data lifetime timer indicates a lifetime (expected lifetime) of the write data associated with the stream required to be opened by the extended open stream command 124.

The host 2 transmits the extended open stream command 124 to the storage device 2. The controller 14 of the storage device 2 executes processing of opening a new stream. In this case, the controller 14 allocates a new stream ID different from the stream ID of each of currently opened streams, to the newly opened stream (step S131). The controller 14 allocates an input block to the newly opened stream (step S132). In step S132, the controller 14 further executes setting of the data lifetime timer corresponding to the new stream ID.

The host 3 transmits the write command 40 to the storage device 2. The host 3 transmits the write data to the storage device 2. The controller 14 of the storage device 2 writes the write data to the write buffer (WB) 20 (step S133), and sends to the host 3 the notice of command completion. After that, the controller 14 writes the write data to the block corresponding to the stream designated by the stream ID in the write command 40, updates the lookup table 19, and maps the LBA of the write data to the physical address of the physical storage location at which the write data has been written (step S133). In step S133, the controller 14 further records both the time stamp at the data write and the lifetime (DLT: Data lifetime timer) of the write data, or the life end time (LET), in the backward lookup table 19A in the lookup table 19 (step S134).

When the controller 14 starts the garbage collection operation, the controller 14 selects the target block for the garbage collection from the active block pool 43. Then, the controller 14 executes processing for discarding (invalidating) the data in the target block, which meets the condition "current time stamp>LET (=time stamp at the data write+Data lifetime timer)", by referring to the backward lookup table 19A (step S135). More specifically, in step S135, the controller 14 executes the garbage collection operation for collecting, from the target block, only valid data which meets the condition "current time stamp<LET (=time stamp at the data write+Data lifetime timer)".

Figure 69:
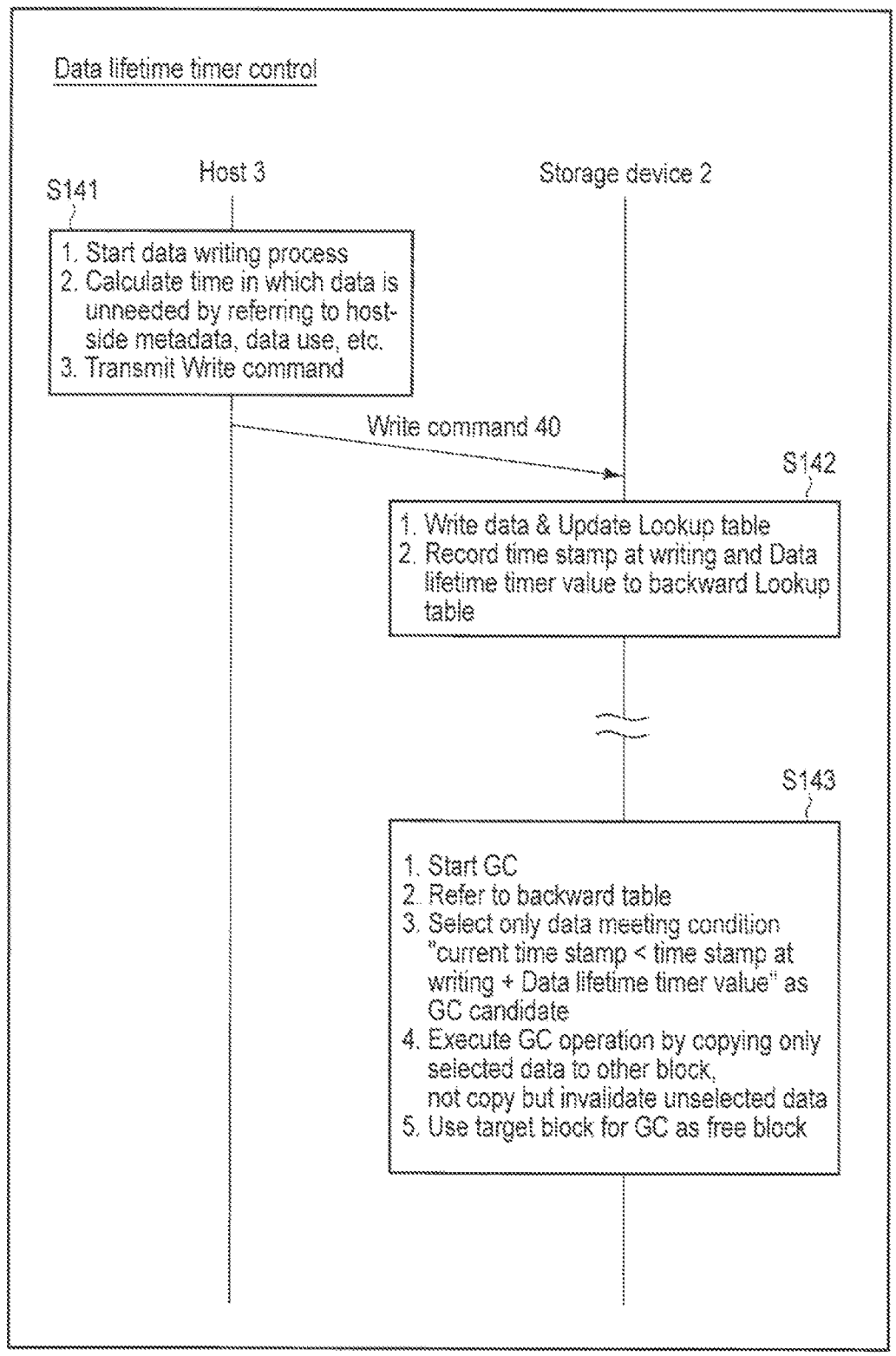
FIG. 69 illustrates a series of processing sequences of the data lifetime timer control executed by the host and the storage device according to the embodiment.

FIG. 69 shows a series of processing sequences executed by the storage device 2 and the host 3.

The host 3 calculates (estimates) the lifetime (Data lifetime timer) of the write data by referring to the metadata of the file system 12, etc., in a date write process (step S141). The host 3 transmits the write command 40 including a parameter designating the lifetime (Data lifetime timer) to the storage device 2.

When the controller 14 of the storage device 2 receives the write command 40 from the host 3, the controller 14 writes the write data to the block in the flash memory 16, updates the lookup table 19, and maps the LBA of the write data to the physical address of the physical storage location at which the write data has been written (step S142). In step S142, the controller 14 records both the time stamp at the data write and the lifetime (DLT: Data lifetime timer) of the write data in the backward lookup table 19A or calculates the life end time (LET) and records the life end time (LET) in the backward lookup table 19A (step S134).

When the controller 14 starts the garbage collection operation, the controller 14 selects the target block for the garbage collection from the active block pool 43. Then, the controller 14 selects the only valid data which meets the condition "current time stamp<LET (=time stamp at the data write+Data lifetime timer)" as data of GC candidate, by referring to the backward lookup table 19A, and copies only the selected valid data to the other block (step S143). In step S143, the controller 14 updates the mapping information in the lookup table 19 and maps the LBAs of the valid data to the physical address corresponding to each physical storage location to which the valid data is copied. In step S143, unselected data is not copied, but invalidated.

In the present embodiment, a NAND flash memory is described as an example of the nonvolatile memory. However, the functions of the present embodiment can be applied to, for example, nonvolatile memories of the other types such as MRAM (Magnetoresistive Random Access Memory), PRAM (Phase change Random Access Memory), ReRAM (Resistive Random Access Memory), and FeRAM (Ferroelectric Random Access Memory).

Each of the various functions described in the present embodiment may be implemented by a circuit (processing circuit). Examples of the processing circuit include a programmed processor such as a central processing unit (CPU). The processor executes each of the explained functions by executing a computer program (instruction group) stored in the memory. The processor may be a microprocessor including an electric circuit. Examples of the processing circuit include a digital signal processor (DSP), an application specific integrated circuit (ASIC), a microcomputer, a controller, and other electric circuit components. Each of the components other than the CPU described in the present embodiment may also be implemented by a processing circuit.

In addition, since various types of the processing of the host 3 can be implemented by the computer programs, the same advantages as those of the present embodiment can easily be obtained by installing the computer programs in a computer and executing the computer programs by a computer-readable storage medium which stores the computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:

1. A storage device, comprising:
a nonvolatile semiconductor memory device including a plurality of physical blocks including first and second physical blocks; and
a memory controller configured to:
associate one or more physical blocks with a first stream ID and one or more physical blocks with a second stream ID, such that the one or more physical blocks associated with the first stream ID are reserved for data associated with the first stream ID, and that the one or more physical blocks associated with the second stream ID are reserved for data associated with the second stream ID,
and
carry out garbage collection in response to a command including the first stream ID, by transferring valid data stored in the first physical block that stores valid data and invalid data to the second physical block, and associating the first physical block from which the valid data have been transferred with the first stream ID, such that the first physical block is reserved for data associated with the first stream ID.

2. The storage device according to claim 1, wherein after the valid data have been transferred from the first physical block and before the first physical block is subjected to a write operation, the memory controller performs an erase operation on the first physical block.

3. The storage device according to claim 1, wherein after the first physical block is associated with the first stream ID, the first physical block is not used for writing data associated with a stream ID other than the first stream ID.

4. The storage device according to claim 1, wherein the first physical block is not associated with the first stream ID at the time the command is received.

5. The storage device according to claim 4, wherein the memory controller is configured to associate the second physical block with a stream ID with which the first physical block was associated at the time the command was received.

6. The storage device according to claim 1, wherein the command includes a data size and the memory controller is configured to select at least one physical block, including the first physical block, on which to perform the garbage collection in response to the command.

7. The storage device according to claim 6, wherein the command further includes a time limit and the memory controller is configured to terminate the garbage collection when an elapsed time from start of execution of the command exceeds the time limit.

8. A storage device, comprising:
a nonvolatile semiconductor memory device including a plurality of physical blocks including first and second physical blocks; and
a memory controller configured to:
associate a first namespace ID with a first logical address space, and a second name space ID with a second logical address space different from the first logical address space,
and
carry out garbage collection in response to a command including the first namespace ID, by transferring valid data stored in the first physical block that stores valid data and invalid data to the second physical block, and associating the first physical block from which the valid data have been transferred with the first namespace ID, such that the first physical block is reserved for data associated with the first namespace ID.

9. The storage device according to claim 8, wherein after the valid data have been transferred from the first physical block and before the first physical block is subjected to a write operation, the memory controller performs an erase operation on the first physical block.

10. The storage device according to claim 8, wherein after the first physical block is associated with the first namespace ID, the first physical block is not used for writing data associated with a namespace ID other than the first namespace ID.

11. The storage device according to claim 8, wherein the first physical block is not associated with the first namespace ID at the time the command is received.

12. The storage device according to claim 11, wherein the memory controller is configured to associate the second physical block with a namespace ID with which the first physical block was associated at the time the command was received, in response to the command.

13. The storage device according to claim 8, wherein the command includes a data size and the memory controller is configured to select at least one physical block, including the first physical block, on which to perform the garbage collection, based on the data size, in response to the command.

14. The storage device according to claim 13, wherein the command further includes a time limit and the memory controller is configured to terminate the garbage collection when an elapsed time from start of execution of the command exceeds the time limit.

15. A system comprising:
a storage device; and
a host configured to send commands to write data to or read data from the storage device, wherein
the storage device includes:
a nonvolatile semiconductor memory device including a plurality of physical blocks including first and second physical blocks; and
a memory controller configured to:
associate one or more physical blocks with a first ID, and one or more physical blocks with a second ID, such that the one or more physical blocks associated with the first ID are reserved for data associated with the first ID and that the one or more physical blocks associated with the second ID are reserved for data associated with the second ID,
carry out garbage collection in response to a command including the first stream ID from the host, by transferring valid data stored in the first physical block that stores valid data and invalid data to the second physical block, and associating the first physical block from which the valid data have been transferred with the first ID, such that the first physical block is reserved for data associated with the first ID.

16. The system according to claim 15, wherein after the first physical block is associated with the first ID, the first physical block is not used for writing data associated with an ID other than the first ID.

17. The system according to claim 15, wherein the first physical block is not associated with the first ID at the time the command is received from the host.

18. The system according to claim 15, wherein the ID is one of a stream ID and a namespace ID.

* * * * *